(12) United States Patent
Moffat

(10) Patent No.: US 9,500,176 B2
(45) Date of Patent: Nov. 22, 2016

(54) WAVE ENERGY APPARATUS HAVING A VENTURI SHROUD

(71) Applicant: Brian L. Moffat, Simi Valley, CA (US)

(72) Inventor: Brian L. Moffat, Simi Valley, CA (US)

(*) Notice: Subject to any disclaimer, the term of this patent is extended or adjusted under 35 U.S.C. 154(b) by 140 days.

(21) Appl. No.: 14/266,763

(22) Filed: Apr. 30, 2014

(65) Prior Publication Data

US 2014/0230427 A1    Aug. 21, 2014

Related U.S. Application Data

(60) Division of application No. 12/777,409, filed on May 11, 2010, now abandoned, which is a continuation-in-part of application No. 12/389,928, filed on Feb. 20, 2009, now Pat. No. 8,925,313.

(60) Provisional application No. 61/066,702, filed on Feb. 22, 2008, provisional application No. 61/278,327, filed on Oct. 5, 2009.

(51) Int. Cl.
*F03B 13/22* (2006.01)

(52) U.S. Cl.
CPC .......... *F03B 13/22* (2013.01); *F05B 2240/242* (2013.01); *F05B 2250/25* (2013.01); *Y02E 10/38* (2013.01)

(58) Field of Classification Search
CPC ................ F03B 13/22; F03B 2240/242; F03B 2250/25; Y02E 10/38
See application file for complete search history.

(56) References Cited

U.S. PATENT DOCUMENTS

| 1,502,511 A | 7/1924 | Marvin |
| 2,782,321 A | 2/1957 | Fischer |
| 3,064,137 A | 11/1967 | Corbett et al. |
| 3,619,632 A | 11/1971 | Labombarde |

(Continued)

FOREIGN PATENT DOCUMENTS

| GB | 745084 (A) | 7/1954 |
| GB | 1 447 758 | 9/1976 |

(Continued)

OTHER PUBLICATIONS

"Making Waves for a Cleaner Future", Product Technical web page, Retrieved from the Internet on May 1, 2014, Retrieved from URL:<http://www.sperboy.com/page002.ht>.

(Continued)

*Primary Examiner* — Audrey K Bradley
(74) *Attorney, Agent, or Firm* — Brooks Acordia IP Law, P.C.; Douglas N. Larson

(57) ABSTRACT

By optimizing the degree to which water is accelerated through a venturi device, the amount of power that an energy device extracts from the ocean is maximized. Prior venturi-based wave energy devices have proven to be inefficient because of the relatively small amount of power that they generate relative to their size and cost. By optimizing the venturi effect created within the submerged venturi components of such devices, the speed of the water moving through the narrowest portions of such a devices is maximized with respect to the wave environments in which they operate, and a maximal amount of energy is extracted from the ocean. This optimization of a wave energy device's power is sufficient to render such devices cost effective. The method of extracting energy from the accelerated flow of water moving through such venturi devices is not limited, and many alternatives exist, each with its own potential benefits.

60 Claims, 29 Drawing Sheets

(56) References Cited

U.S. PATENT DOCUMENTS

| | | |
|---|---|---|
| 3,664,189 A | 5/1972 | Weinstein |
| 3,870,893 A | 3/1975 | Mattera |
| 3,912,938 A | 10/1975 | Filipenco |
| 4,213,734 A | 7/1980 | Lagg |
| 4,221,538 A | 9/1980 | Wells |
| 4,313,711 A | 2/1982 | Lee |
| 4,359,868 A | 11/1982 | Slonim |
| 4,447,740 A | 5/1984 | Heck |
| 4,462,211 A | 7/1984 | Linderfelt |
| 4,545,726 A | 10/1985 | Hollinger |
| 4,599,041 A | 7/1986 | Stricker |
| 4,631,921 A | 12/1986 | Linderfelt |
| 5,136,173 A | 8/1992 | Rynne |
| 5,770,893 A | 6/1998 | Youiton |
| 6,140,712 A | 10/2000 | Fredriksson et al. |
| 6,216,455 B1 | 4/2001 | Dolch et al. |
| 6,291,904 B1 | 9/2001 | Carroll |
| 6,756,695 B2 | 6/2004 | Hibbs et al. |
| 6,772,592 B2 | 8/2004 | Gerber et al. |
| 6,791,205 B2 | 9/2004 | Woodbridge |
| 7,132,758 B2 | 11/2006 | Rochester et al. |
| 7,150,149 B2 | 12/2006 | Rochester et al. |
| 7,607,862 B2 | 10/2009 | Thorsbakken |
| 2005/0001432 A1 | 1/2005 | Drentham Susman et al. |
| 2005/0081517 A1 | 4/2005 | Rochester et al. |
| 2005/0099010 A1 | 5/2005 | Hirsch |
| 2005/0285407 A1 | 12/2005 | Davis et al. |
| 2009/0087301 A1 | 4/2009 | Krouse |
| 2009/0179425 A1 | 7/2009 | Van Drentham Susman et al. |
| 2009/0211241 A1 | 8/2009 | Moffat |
| 2010/0111610 A1 | 5/2010 | Dick |
| 2010/0171313 A1 | 7/2010 | Cook |

FOREIGN PATENT DOCUMENTS

| | | |
|---|---|---|
| JP | 51-86639 | 7/1976 |
| JP | 55-104575 | 8/1980 |
| JP | 57-70959 | 5/1982 |
| JP | 58-104371 | 6/1983 |
| JP | 53-134133 | 1/1985 |
| JP | 61-261677 | 11/1986 |
| JP | 2002-310054 | 10/2002 |
| JP | 2005-502821 | 1/2005 |
| JP | 2005-504227 | 2/2005 |
| WO | WO 89/11036 | 11/1989 |
| WO | WO 2005/045243 A1 | 5/2005 |
| WO | WO 2005/075818 | 8/2005 |
| WO | WO 2008/065684 A1 | 6/2008 |

OTHER PUBLICATIONS

Drew, B. et al. "A review of wave energy converter technology," Retrieved from Internet on May 1, 2014, URL:<http://abs-5.me.washington.edu/pub/tidal_wave/a_rewiew_of_WEC_tech.pdf.

Puharic et al., "Hydro Turbine in a Venturi Tube", Strojarstvo; Journal for Theory etc. (2009) 51(5), 441-448, Google Translation (two parts).

International Search Report for PCT/US2010/034307, published Nov. 3, 2011.

International Preliminary Report on Patentability (and Written Opinion) for Serial No. PCT/US2009/038581, issued Sep. 27, 2011.

International Search Report and Written Opinion for Serial No. PCT/US2010/034307 mailed Sep. 9, 2011.

Puharic et al., "Hydro Turbine in a Venturi Tube", Strojarstvo; Journal for Theory and Appln. in Mech Engr. (2009) 51(5), 441-448.

Written Opinion for Serial No. PCT/US2009/038581 mailed Dec. 28, 2009.

Scarr et al., "Wave Energy: Technology Transfer & Generic R&D Recommendations," ETSU V/06/00187//REP, First Published 2001, Crown Copyright.

Notification of Reasons for Refusal for Japanese Patent Application No. 2012-501981, Draft Jul. 30, 2013, dispatched Aug. 5, 2013, English translation.

Notification of Reasons for Refusal for Japanese Patent Application No. 2012-501981, dispatched Aug. 5, 2013.

"Making Waves for a Cleaner Future", Product web page, Retrieved from the Internet on May 1, 2014, Retrieved from URL:<http://www.sperboy.com/index.html?_ret_=return>.

Japanese Office action for patent application No. 2012-501981, dispatched Jul. 8, 2014.

English translation of Japanese Office action for patent application No. 2012-501981, dispatched Jul. 8, 2014.

European Search Report for Application No. EP 09 84 2427 completed Jun. 4, 2014.

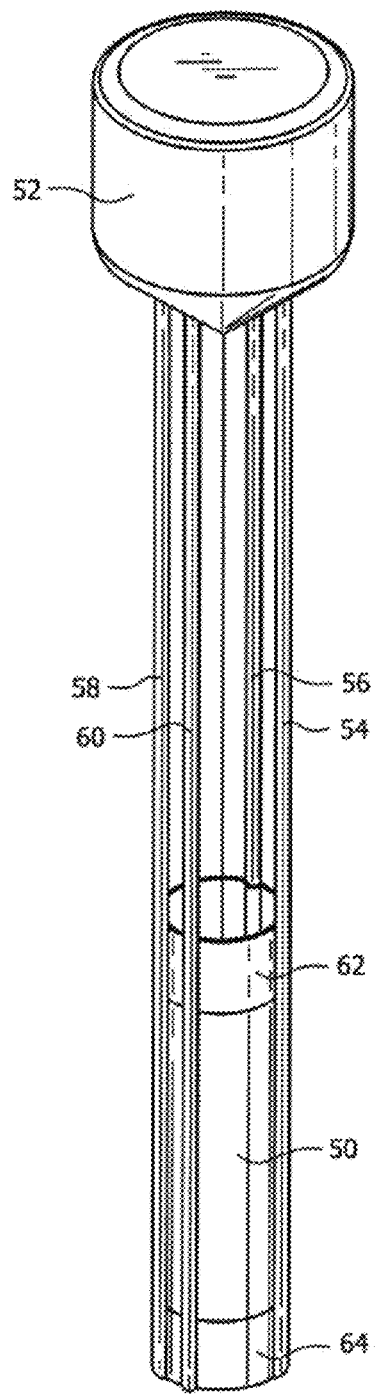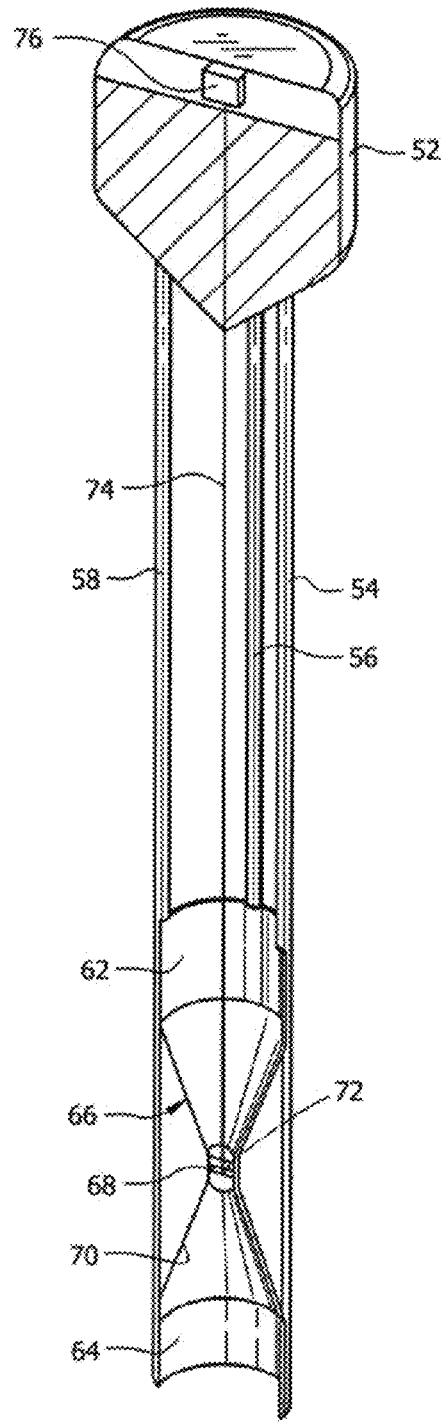
*FIG. 4A*  *FIG. 4B*

|  | Heck device | Optimized device |
|---|---|---|
| Venturi throat diameter (m) | 6.0 | 1.6 |
| Venturi mouth cross-sectional area (m²) | 38.5 | 38.5 |
| Venturi throat cross-sectional area (m²) | 28.3 | 2.01 |
| Venturi factor (i.e. speed amplification factor) | 1.36 | 19.2 |
| Average available power (kW) | 60 | 9,000 |
| Average extracted power (kW) | 30 | 4,500 |
| Relative increase in power due to venturi | 1.8x | 280x |

*FIG. 18*

WAVE ENERGY APPARATUS HAVING A VENTURI SHROUD

RELATED APPLICATIONS

Cross-Reference to Related Applications

This application is a divisional of U.S. patent application Ser. No. 12/777,409, filed May 11, 2010, (whose entire contents are hereby incorporated by reference) and which is a continuation-in-part of U.S. patent application Ser. No. 12/389,928, filed Feb. 20, 2009 (whose entire contents are hereby incorporated by reference) and the Ser. No. 12/777, 409 application also claims the benefit of the prior filing date of provisional patent application Ser. No. 61/278,327 filed Oct. 5, 2009, entitled "Venturi, Chambered Venturi and Optimized Venturi-Based Ocean Wave Energy Device" and incorporated herein by reference in its entirety.

BACKGROUND OF THE INVENTION

1. Field of the Invention

This invention relates, generally, to wave-driven energy conversion devices that convert the abundant natural energy present in the oceans and other bodies of water into electrical or chemical energy.

2. Description of Prior Art

2a. Overview

2a1. Water Turbines

Water turbines have been used to extract useful energy from moving water, or water under pressure, for thousands of years. Many different types of water turbines have been invented and used in the past to extract energy from water under a variety of circumstances, e.g., Francis turbines, Pelton turbines, Kaplan turbines, etc.

The design of water turbines is a mature discipline. Most modern water turbines convert the kinetic and/or potential energies of water into rotary motion that can be used to create electricity. The efficiencies of these mature turbine technologies can be quite high, often exceeding 90%. And it is relatively easy to find an existing water turbine design that will optimally harvest the kinetic and/or potential energy available in almost any river or dam.

2a2. Wave Energy Devices

Attempts to extract energy from waves moving across the surface of an ocean are relatively new. Some devices of this type have been built, described in prior patents and proposed in the literature.

There are many good reasons to engage in such research and development efforts. Ocean waves represent a renewable energy source whose harvesting would not degrade the environment and ecology of the earth. Ocean waves also represent a very concentrated energy source, offering the potential for the harvesting of large amounts of energy using relatively small devices.

Most wave energy devices are constrained to use in relatively shallow ocean waters where they may be anchored in some manner to the ocean floor. When anchored to the ocean floor, a wave energy device may create and exploit a tension between the immovable ocean bed and the vertical oscillations of the waves. These types of devices are generally not capable of operating in the deeper parts of the ocean.

Among the many wave energy devices proposed or built, some are able to operate in the deeper parts of the ocean. Many of these devices utilize a buoy at the surface of the ocean, and a submerged component, which, in one way or another, exploits the relatively motionless waters which are found a short distance below the ocean's surface to facilitate the extraction of energy. Some of these devices utilize submerged turbines that are moved through the still waters by the action of waves above causing the turbines to rotate and generate power.

2a3. Energy in Waves

Waves traversing the surface of the ocean represent a repository of a large fraction of the total energy imparted to the earth by the sun. The sun heats the land and the oceans and much of this heat energy passes into the atmosphere. Differential heating of the atmosphere across the surface of the earth, in conjunction with the rotation of the earth, causes the atmosphere to move across the Earth's surface, sometimes at relatively high speeds.

When the atmosphere moves over the surface of the earth's lakes and oceans, it imparts some of its kinetic energy to the waters at the surfaces of those lakes and oceans, thereby creating waves on the surfaces of such bodies of water. The amplitudes of those waves increase as long as the wind blows parallel to the direction in which the waves are propagating. The uninterrupted distance over which the wind blows in a direction parallel to a wave's propagation, and over which it imparts increasing amounts of energy to that wave, is called the "fetch" of the wave.

Typical ocean waves range in height from three-tenths of a meter (0.3 m) to five meters (5.0 in). At higher (i.e. more polar) latitudes, ten-meter (10.0 m) waves are not uncommon.

2a4. The "Wave Base"

Water molecules and other particles contributing to the propagation of "deep-water" waves (i.e. those moving across waters with depths of about 50 feet or more) have circular orbits. (These orbits become elliptical as the water becomes shallower.) In deep-water waves, the radii of the orbits of the water molecules decrease exponentially with increasing depth. The radii become vanishingly small as the depth approaches one-half the wavelength of the waves. This special depth is called the "wave base." A wave in the ocean does not move the water located below the wave base to any significant degree. The water below this depth and any objects floating in it are substantially stationary, even as waves move across the surface overhead.

It is possible to use the motion of waves at the surface of the ocean to move a submerged component up-and-down through the relatively still waters beneath the waves, e.g. beneath the wave base.

2a5. Extracting Power From the "Still" Water Beneath the Waves

The prior art includes a type of wave-energy device capable of extracting power by leveraging the motion of waves at the surface of the ocean against the still waters located beneath the waves UK Patent 45018/72 by J. Bichard, 1973. See FIG. 1. It includes a unidirectional or bi-directional propeller suspended from a buoy by a shaft or cable. As the buoy moves up and down in response to passing waves, the propeller is moved up and down through the relatively still waters below the surface. This up-and-down motion of the propeller through relatively still waters compels the propeller to spin. The propeller spins in a constant direction if the propeller is bi-directional but its direction of rotation reverses if the propeller is unidirectional. Such a device does not generate much power.

Even though the force driving the water back and forth through such a suspended turbine would be great, the speed of the water's movement though the turbine would be relatively slow. When driven by waves with a height of 4 meters and a period of 8 seconds, the maximum speed of a suspended turbine relative to the water around it would be about 1.6 meters per second. At this speed, it would be difficult to extract a significant amount of energy from the flowing water with a simple turbine because the amount of power that can be extracted from a flowing stream of water by a turbine is proportional to the cube of its speed. In other words, Power available for extraction=0.5 A $v^3$
Power actually extracted=0.5 k A $v^3$ Where "A" is the cross-sectional area of the stream of water from which power is extracted (in this case, the cross-sectional area swept by the rotating blades of the turbine), "v" is the speed of the water moving through the turbine, and "k" is a constant that equals the efficiency of the turbine.

A reasonably sized device of the kind illustrated in FIG. 1 (e.g. a turbine diameter of 7 meters), with a turbine of reasonable efficiency (e.g. k=0.5), would only produce an average of about 16 kW when driven by waves with a height of 4 meters and a period of 8 seconds.

Since ocean waves rise and fall with a relatively slow speed (the maximum of which is generally only one or two meters per second), it is difficult to extract much energy from the water constrained to flow through a propeller at that same slow speed.

2b. Device Proposed by Heck

In "Wave Responsive Generator" (U.S. Pat. No. 4,447,740) Heck claimed a wave energy device that also suspended a turbine beneath a buoy like the one discussed above. However, Heck proposed surrounding his device's submerged turbine with a cylindrical housing designed to shield the turbine from damage from under-water debris. Heck further proposed (although he did not claim) a modification to his wave energy device in which frusto-conical sections would be added to the ends of the submerged cylindrical turbine housing. The effect of these frusto-conical sections would be to accelerate the speed of the water which entered the cylindrical turbine housing and which passed through, and powered, the enclosed turbine. Although Heck did not provide any specifics about the implementation of this modification, his illustrations provide some information.

According to the drawings, e.g. FIG. 1 of U.S. Pat. No. 4,447,740, which is duplicated in FIG. 2 of this patent, the frusto-conical extensions on the ends of the cylinder in Heck's device ($D_t$=1.16 $D_h$) would be rather small, and would be expected to increase the speed of the water passing through the associated turbine by 1.3× (a 30% increase) and to increase the power generated by the associated turbine by 1.8× (an 80% increase). (See Section 2c below.)

2c. Heck Device Water Speed and Power

Refer to FIG. 2.

Dt=diameter of the opening of frusto-conical section appended to the cylindrical turbine housing, i.e. the diameter of the mouth of the Heck device.
Dh=diameter of the cylindrical turbine housing, i.e., the diameter of the throat of the Heck device, and of the turbine enclosed therein.
At=cross-sectional area of the mouth of the Heck device.
Ah=cross-sectional area of the throat of the Heck device, and of the water flowing the enclosed turbine.
Vt=speed of the water entering the mouth of the Heck device.
Vh=speed of the water flowing through the Heck device, and through the enclosed turbine.

Pt=power available for extraction from the water entering the mouth of the Heck device.
Ph=power available for extraction from the water flowing through the throat of the Heck device.
k=efficiency with which the turbine of the Heck device extracts power from flowing water.
p=density of ocean water (i.e. 1025 kg/m3)

Pixel measurements of an image of FIG. 1 of Heck's U.S. Pat. No. 4,447,740, which shows the embodiment of his device that incorporates the frusto-conical sections, yield the following relative measurements:

$D_t$=304 pixels $D_h$=262 pixels $D_h$=(262/304)$D_t$ $D_h$=0.862 $D_t$

Assume $D_t$=1.0 [a relative point of reference], therefore:

$D_h$=0.862

$A_t$=Π$D_t^2$/4=Π/4=0.25 Π

$A_h$=Π$D_h^2$/4=Π0.862²/=0.186 Π

$V_h$=($A_t$/$A_h$)$V_t$=(0.25 Π/0.186Π)$V_t$=1.3 $V_t$

The speed of the water passing through the turbine of Heck's wave energy device would be expected to increase by a factor of 1.3, or by 30%, as a result of the frusto-conical extensions appended to both ends of the cylindrical turbine housing, as illustrated in Heck's drawings.

$P_t$=k 0.5 ρ$A_t V_t^3$=k0.5ρ(0.25Π)$V_t^3$=0.125 k ρ$V_t^3$ $P_h$=k 0.5 ρ$A_h V_h^3$=k0.5ρ(0.186Π)(1.3 $V_t^3$)=0.204 k ρΠ$V_t^3$ $P_h$/$P_t$=(0.204 k ρΠ$V_t^3$)/0.125 k ρΠ$V_t^3$)=1.8

The 30% increase in the speed of the water passing through Heck's turbine would be expected to result in an 80% increase in the power available for extraction, and in the power which would ultimately be extracted.

In keeping with the example offered in section 2a5 (paragraphs 00019-00024), a reasonably sized Heck device of the kind illustrated in FIG. 2 (e.g. a venturi mouth with a diameter of 7 meters), with a turbine of reasonable efficiency (e.g. k=0.5) would produce an average of about 30 kW when driven by waves with a height of 4 meters and a period of 8 seconds (an 80% increase over the earlier power level of 16 kW—produced in the absence of any venturi device). However, the cost of constructing and maintaining a 7-meter diameter buoy and venturi device, including a 6-meter turbine, is unacceptably high for a device with an output of only 30 kW in rather energetic 4-meter oceans.

2d. Problems with the Heck device

The Heck device fails to generate enough power to justify its cost of construction, deployment and maintenance.

Another problem with the Heck device is its use of a single central pipe which encloses the turbine shaft and is also responsible for maintaining the attachment, and fixing the position (in a rigid manner), of the turbine and the cylindrical housing. The stress on this single central support would be much greater than necessary and introduce serious concerns regarding the ability of the device to survive the rigors of its time at sea.

Therefore a need exists for an apparatus which is capable of utilizing the energy of ocean waves to generate electrical energy which has the capability of accelerating the water flowing through a submerged component of the power generation system to the degree that sufficient power is generated to justify cost of construction, deployment and maintenance of the device and at the same time the device is sufficiently robust to withstand the stresses imparted thereto by the wave motion at the surface of the ocean.

SUMMARY OF INVENTION

This invention provides an improved design for wave energy devices of the types proposed by Bichard and Heck, as well as an improved design for all other varieties of venturi-based wave energy devices. In addition, this invention provides a method for optimizing the design of the venturi component used in these types of devices. This optimization is made with respect to the degree to which the design's resulting venturi effect will accelerate the water flowing through the submerged component of the power-generation system, e.g. a turbine or suction device.

The preferred embodiment of this invention utilizes a venturi tube embedded within an outer cylindrical housing. The preferred embodiment of this invention rigidly connects the submerged venturi tube to the buoy above through multiple struts arranged about the periphery of the tube and the buoy. The preferred-embodiment of this invention incorporates a venturi throat whose cross-sectional area is specifically designed to optimize the amount of power extracted from a portion of ocean perturbed by waves with specific patterns of wave height.

This invention is an apparatus for generating electrical energy which includes a flotation member which is to be disposed adjacent to the ocean surface with a venturi having a mouth and throat disposed in the ocean beneath the flotation device by means connected therebetween so that the venturi moves responsive to wave action, the cross sectional area of the throat of the venturi relative to the cross sectional of the area of the mouth of the venturi causes water flowing through the throat of the venturi to have a speed of more than two times the speed of the water at the mouth of the venturi but no more than the choke speed of the venturi. A motion-generated means is disposed in the throat of the venturi and is connected to an electrical generator for producing electrical energy.

This invention also includes a method for optimizing a venturi device having a mouth and throat for generating electrical energy from ocean waves which includes selecting the height of the ocean waves, selecting the periodicity of the ocean waves, selecting the choke speed for the water flowing through the venturi device and establishing the relative cross-sectional area of the throat of the venturi device as compared to the cross-sectional area of the mouth of the venturi device so that speed of the ocean water flowing through the throat is at least two times the speed of the water at the mouth but no more than the choke speed.

BRIEF DESCRIPTION OF THE DRAWINGS

FIG. 4A is a side elevational view of a preferred embodiment of an apparatus constructed in accordance with the present invention;

FIG. 4B is a partial cross-sectional view of the device as shown in FIG. 4A;

FIG. 18 is a table comparing the prior art device of FIG. 2 to an equivalent device optimized according to the principles of the present invention;

DETAILED DESCRIPTION

This invention provides an improved design for wave energy devices of the types proposed by Bichard and Heck, as well as an improved design for all other varieties of venturi-based wave energy devices. In addition, this invention provides a method for optimizing the design of the venturi component used in these types of devices. This optimization is made with respect to the degree to which the design's resulting venturi effect will accelerate the water flowing through the submerged component of the power-generation system, e.g. a turbine or suction device.

The preferred embodiment of this invention utilizes a venturi tube embedded within an outer cylindrical housing. The preferred embodiment of this invention rigidly connects the submerged venturi tube to the buoy above through multiple struts arranged about the periphery of the tube and the buoy. The preferred embodiment of this invention incorporates a venturi throat whose cross-sectional area is specifically designed to optimize the amount of power extracted from a portion of ocean perturbed by waves with specific patterns of height and period, and with respect to the selected venturi throat depth.

Figure 1:
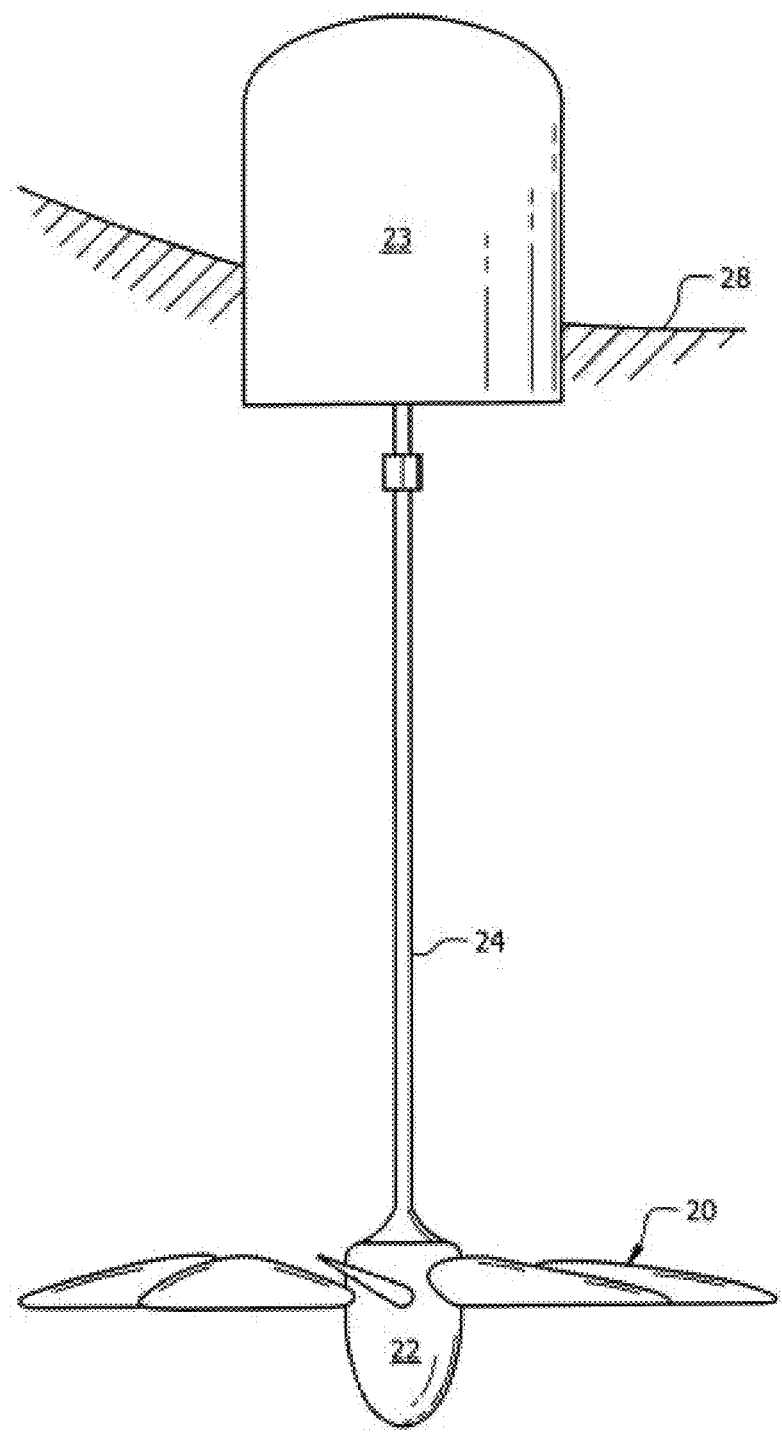
FIG. 1 is an illustration of a prior art turbine device.

For a fuller understanding of the nature and objects of the invention, reference should be made to the following detailed description, taken in connection with the accompanying drawings, in which:

FIG. 1 is an illustration of a wave-energy device proposed in the prior art, and comprises a turbine having a propeller 20 connected to a hub 22 mounted on a shaft 24 suspended beneath a buoy 23 disposed on the surface 28 of the ocean. This device seeks to exploit the diminution of wave motion with depth. As the buoy rises and falls, the submerged turbine is moved up-and-down through the relatively still waters beneath the waves, causing the turbine to rotate, and thus causing the shaft of an attached generator to rotate, thus generating electrical power.

Figures 2, 3A:
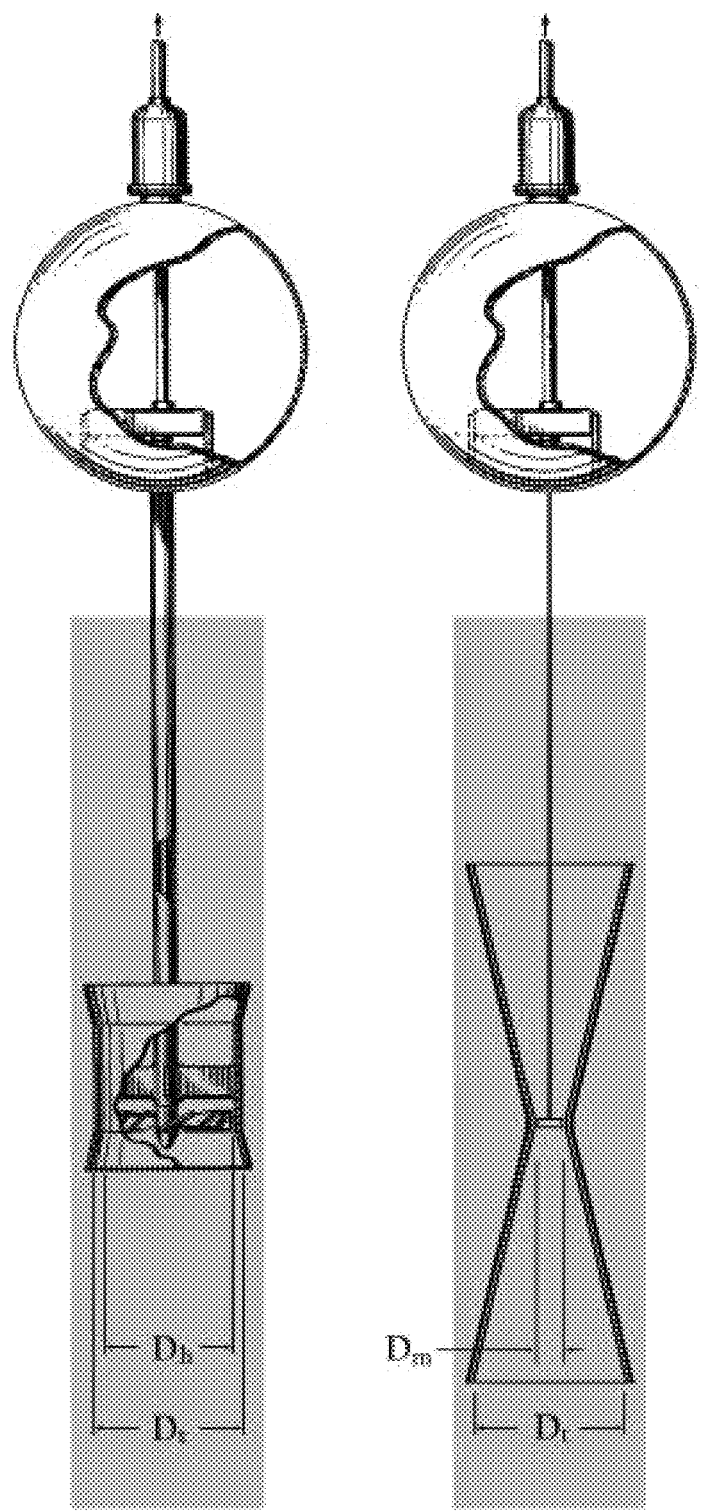
FIG. 2 is an illustration of an additional prior art turbine device.
FIG. 3A is a cross-sectional view of a structure similar to that of FIG. 2 but having a venturi designed in accordance with the principles of the present invention.

FIG. 2 shows a prior art device disclosed in U.S. Pat. No. 4,447,740. In this illustration, "$D_t$" denotes the diameter of the opening of the frusto-conical lip that Heck specifies as an optional addition to each end of the cylindrical shroud that surrounds the turbine. "$D_h$" denotes the diameter of the cylindrical shroud surrounding the turbine. "$D_h$" also denotes diameter of the turbine located within the shroud.

FIG. 3A shows one embodiment of the novel optimized, device of the present invention. This embodiment of the present invention is intended to generally resemble the Heck device except with respect to the construction of the venturi. In this illustration, "$D_t$" denotes the diameter of the mouth of the venturi tube and is equal to the "$D_t$" of FIG. 2. "$D_m$" denotes the diameter of the narrowest portion of the venturi tube, i.e. its "throat". "$D_m$" also denotes the diameter of the turbine located therein.

Figures 3B, 3C:
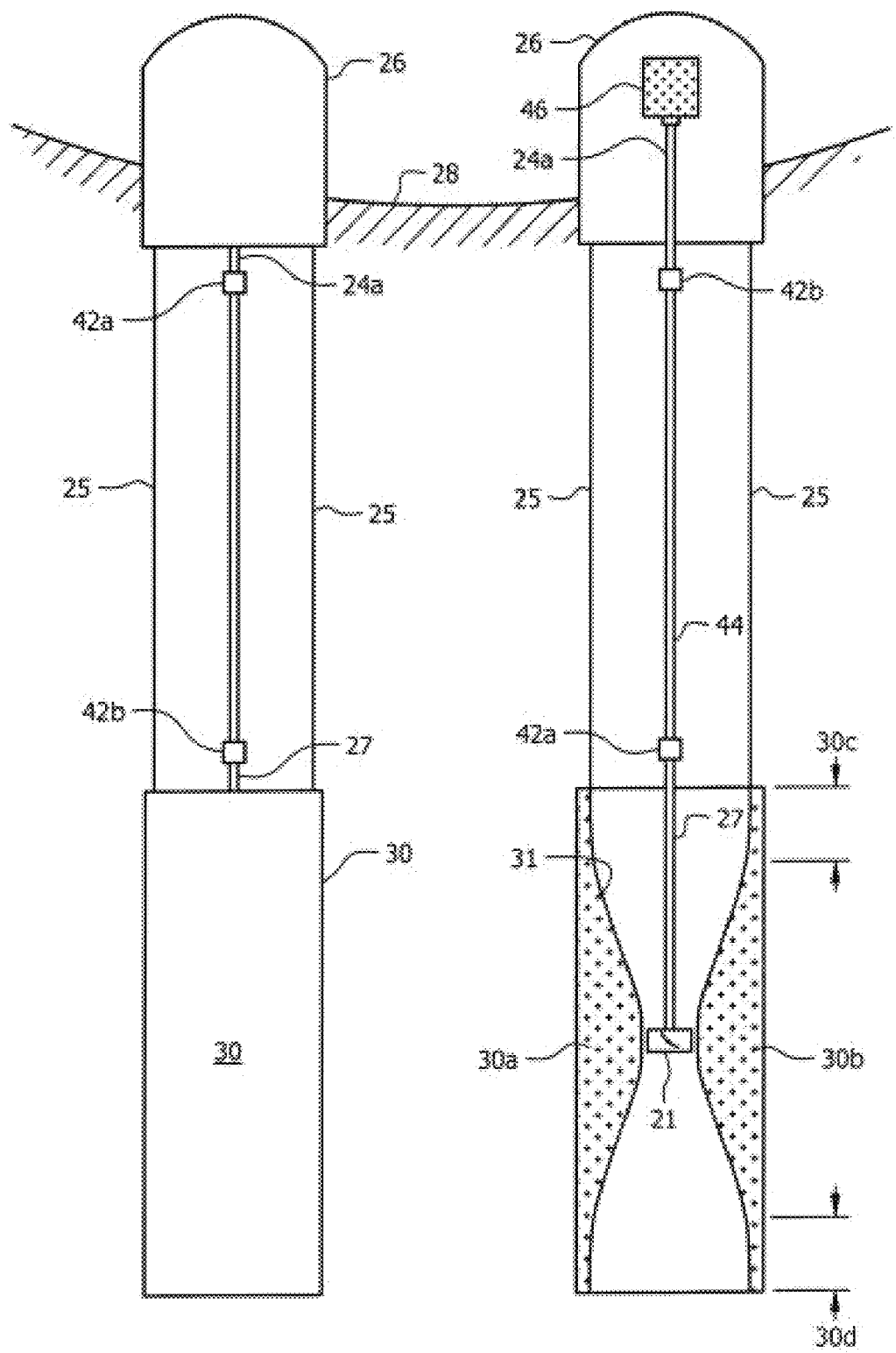
FIG. 3B is a side elevational view of alternative structure similar to that of FIGS. 3A, but with a housing there about.
FIG. 3C is a partial cross-sectional side view of the structure as shown in FIG. 3B.

FIGS. 3B and 3C are illustrations of another embodiment of the present invention, i.e. of a wave energy device utilizing a submerged venturi device which is optimized for the purpose of extracting a maximal amount of power from the ocean.

Venturi device 30 including a housing 30a and a venturi 31 disposed therein is suspended by cables 25 beneath a flotation module 26. The venturi device's distance beneath buoy 26 is held constant, and tension is maintained in cables 25 due to the weight of device 30 and of any optional attached supplemental weight suspended beneath it by cables. The cables may be flexible or rigid.

The venturi device's efficiency is maximized by suspending it below, or at least as near as possible to, the wave base characteristic of the longest wavelength of wave for which energy conversion is desired. This preferred depth would typically range from twenty (20) to one hundred (100) meters. FIGS. 3B and 3C are not drawn to scale.

As venturi device 30 rises, water flows through venturi 31 from top-to-bottom. As venturi 30 sinks, water flows through venturi 31 in the opposite direction. As the water flows through the venturi 31 its rate of axial flow (i.e. its speed) increases in proportion to the reduction in the cross-sectional area of the venturi. For example, as the cross-sectional area of the venturi 31 is halved, the speed of the water flow is doubled.

A type of turbine suitable for use within a venturi is the family of turbines known as free flow or kinetic turbines. Simple propeller 21 is indicated in FIG. 3C for convenience.

As water is constrained to flow through venturi 31 the turbine blades must rotate. The blades are joined to a hub (not shown) and the hub rotates conjointly with the turbine central shaft 24a. If the turbine blades are bi-directional, shaft 44 rotates in the same direction regardless of whether water is entering venturi 31 from the top or bottom. Only the angular speed of rotation varies as the tube moves up and down through the water—the angular direction of rotation does not vary.

As venturi device 30 rises and falls in the water beneath the surface, water enters the venturi 31 alternately from the top and bottom, and compels propeller 21 to spin. Shaft 27 is connected by connector 42a to flexible but non-stretchable cable 44, and the flexible cable is connected by connector 42b to central shaft 24a of buoy 26 which central shaft is connected to generator 46 or some other energy conversion device.

Accordingly, rotation of propeller 21 causes rotation of central shaft 27, cable 44, buoy shaft 24a and hence the generator 46.

In this manner, some of the energy of the deep-water waves which compel buoy 26 and its attached venturi device 30 to rise and fall is converted to mechanical energy. The potential energy of venturi device 30 increases with its height. Some of the venturi tube's potential energy that remains after a wave has passed is converted into additional mechanical energy as buoy 26 and its attached venturi 30 fall and again cause the rotation of propeller 21, central shaft 24, cable 44, buoy shaft 24a and generator 46. All or most of the mechanical energy created during the rising and falling of venturi device 30 is available for conversion into electrical energy.

FIGS. 4A and 4B are illustrations of the preferred embodiment of this invention. As is therein shown a venturi device 50 is disposed beneath a flotation member 52 by a plurality of rigid struts 54, 56, 58 and 60. The venturi device includes an upper section 62 and a lower section 64. The upper and lower sections define an entrance to a venturi tube 66 which is embedded within the venturi device 50. The venturi tube 66 has the cross-sectional area thereof reduced toward the mid point between the section 62 and 64 to define the throat 68 of the venturi tube 66. This construction is illustrated by the tapered wall 70 connecting the lower section 64 with the throat 68. Disposed at throat 68 of the venturi tube 60 is a means for generation of motion 72 such for example as a propeller or other similar device. The propeller 72 is connected by a rigid shaft 74 to an electrical generator 76. As the propeller moves responsive to up and down movement of the flotation member 52, the propeller rotates and through the connection 74 causes the generator 76 to rotate thereby generating electrical energy.

Figure 5:
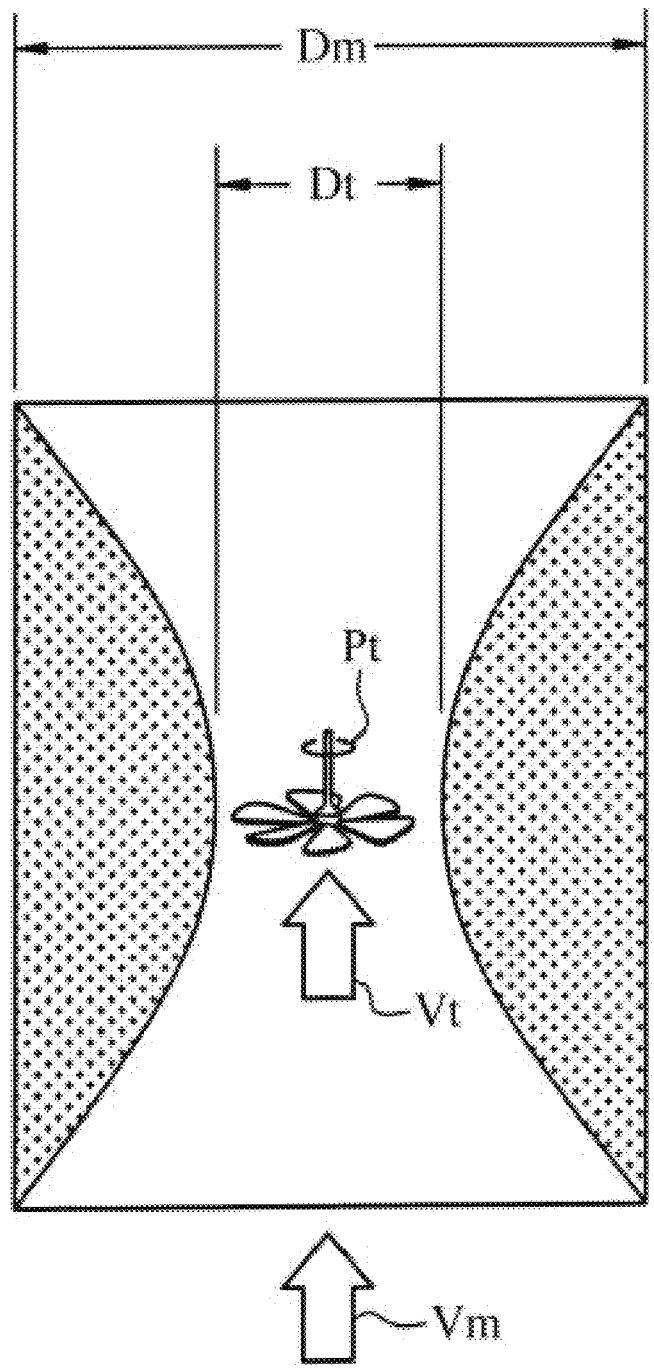
FIG. 5 is a partial cross-sectional view illustrating a turbine disposed at the throat of a venturi device.

FIG. 5 is an illustration of a turbine enclosed within a venturi device. The venturi device will accelerate the water flowing through the turbine by means of a venturi effect. FIG. 5 is an illustration of a representative venturi device (i.e. a venturi tube in this case) and of one possible power-extraction system (i.e. a turbine in this case) useful in the extraction of power from a moving fluid (e.g. like seawater). The venturi tube in this figure is not drawn to scale.

In this illustration, "Dm" denotes the diameter of the mouth of the venturi tube, while "Dt" denotes the diameter of the tube's throat. "Vm" denotes the speed of the water entering the tube (from below in this case) while "Vt" denotes the accelerated speed of the water flowing through the throat of the tube, and through the turbine located there. "Pt" denotes the power extracted by the turbine from the water flowing through the throat of the venturi tube.

Figure 6:
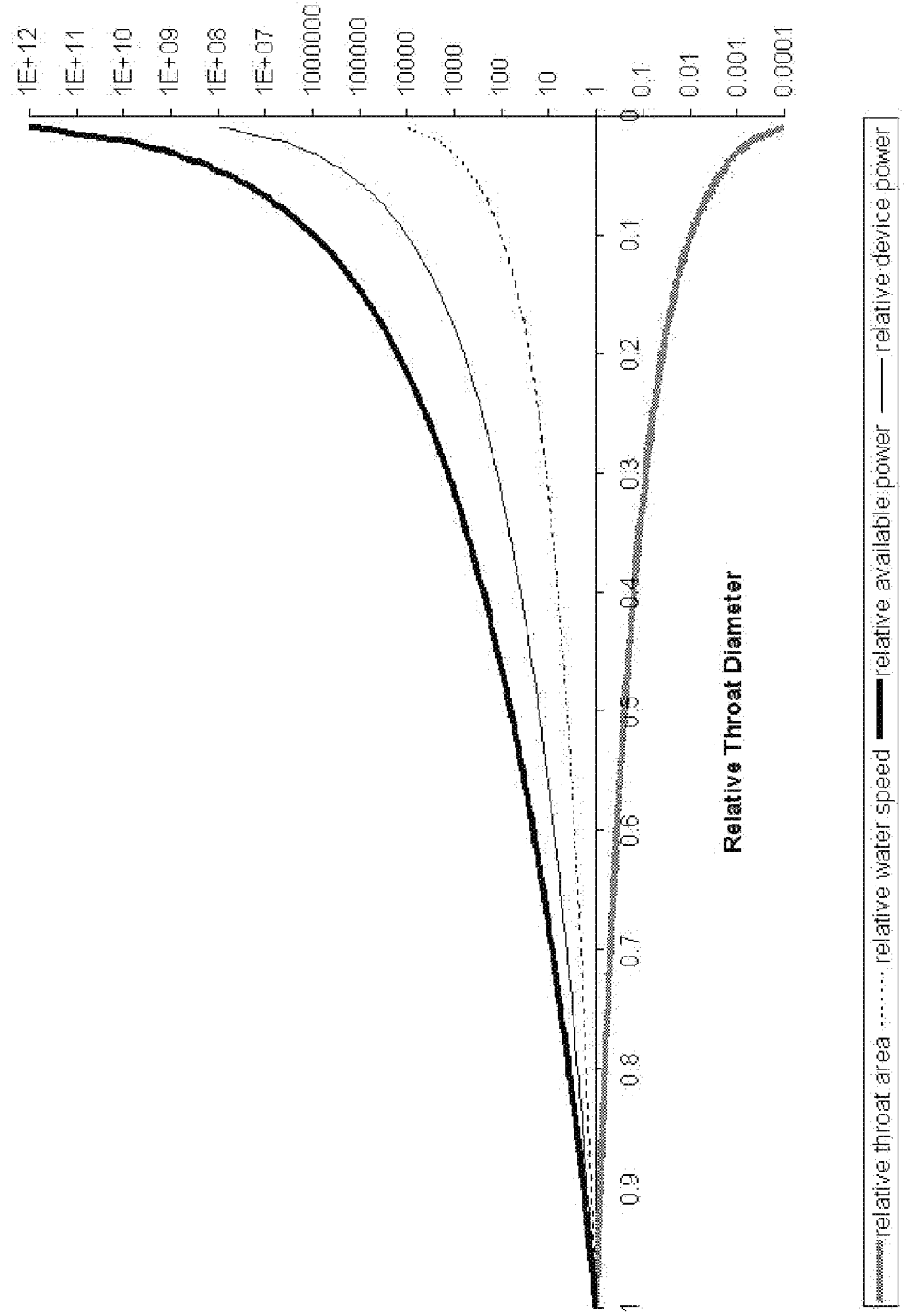
FIG. 6 is a graph illustrating the effect of reducing the throat diameter relative to the diameter of the mouth of a venturi device on the relative throat area, relative water speed, relative available power, and relative device power.

FIG. 6 illustrates the effect of reducing the diameter of a venturi device's throat, relative to the diameter of its mouth, on several important aspects of its behavior. Reducing the relative throat diameter (or, equivalently, reducing the cross-sectional area of the venturi throat relative to the cross-sectional area of the venturi mouth) increases the degree to which the speed of the water is amplified (i.e. the line labeled "relative water speed"). Also, since the amount of power which can be extracted from flowing water is proportional to the cube of the water's speed, reducing the relative throat diameter of the venturi device, and thus increasing the speed of the water passing through it, results in a substantial increase in the amount of power (i.e. kinetic energy) which is available for extraction within that water.

FIG. 6 does not impose any upper limit on the speed to which the water flowing through a venturi device can be accelerated. In truth, such an upper limit exists and is referred to as the "choke speed" of the water. The choke speed will vary primarily with the pressure of the water entering the venturi device, and will therefore tend to increase as the depth of the venturi device below the surface increases.

The data in FIG. 6, i.e. in the absence of a choke limit providing an upper bound on the degree to which the speed of the water can be accelerated, would suggest that with an infinitely small venturi throat, one might be able to extract an almost infinite amount of energy. Clearly, that would be absurd. A consideration of the role of the choke speed is vital in determining the optimal throat diameter in a practical venturi device, Another tradeoff to be considered in identifying an optimal venturi throat diameter is the fact that the amount of power that a turbine can extract from a flowing volume of water is proportional not only to the cube of the water's speed, but also to the cross-sectional area of the flowing water (for example, to the cross-sectional area of a turbine located in the throat of the venturi and used to extract the power). Thus, as the throat of a venturi grows smaller, the speed of the water increases (up to the choke speed), which increases the power available for extraction, but the cross-sectional area of the water flowing with that increased speed decreases, which reduces the amount of power for extraction.

Figure 7:
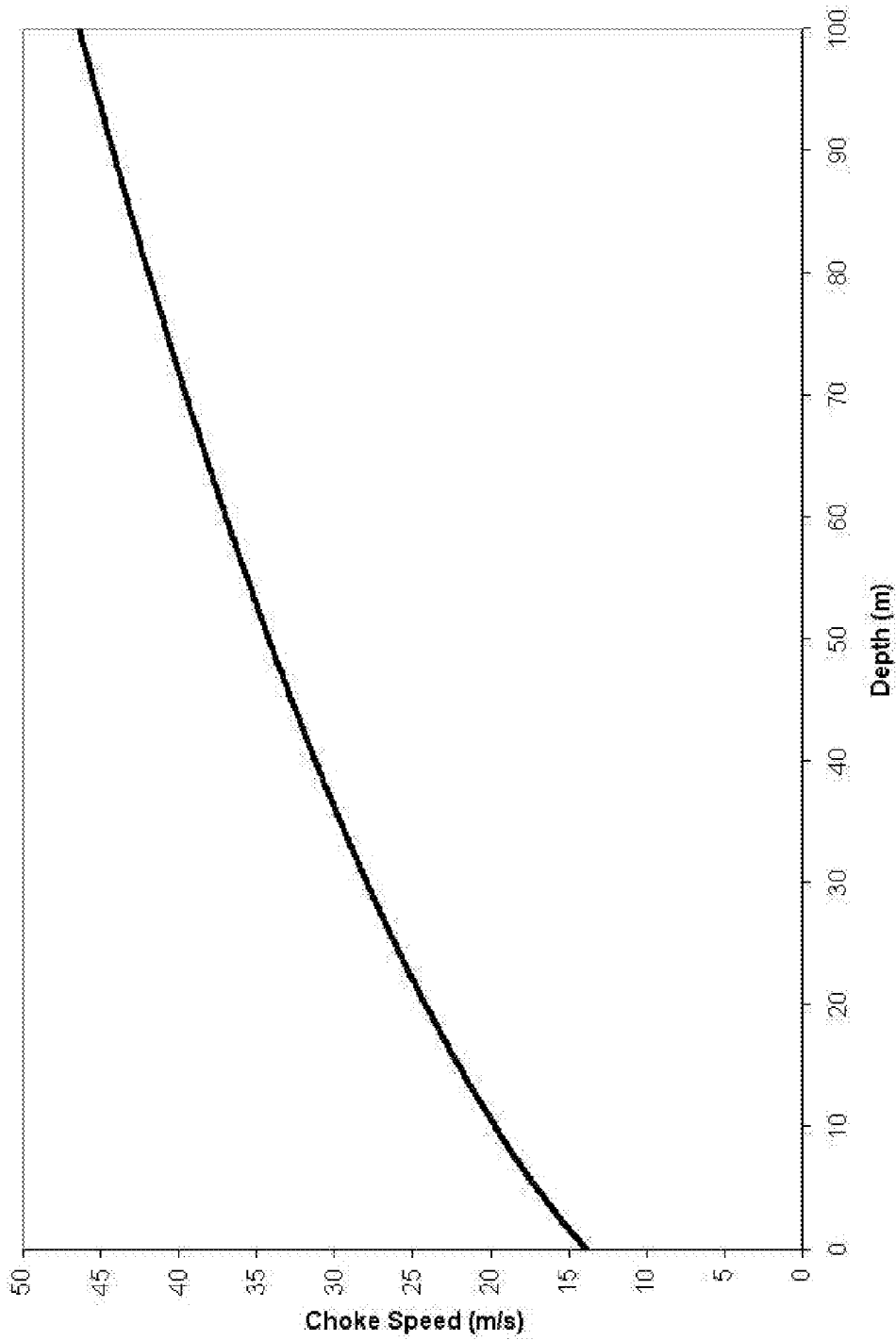
FIG. 7 is a graph illustrating the choke speed of a venturi device relative to the depth of the device as disposed in the ocean.

FIG. 7 is a graph illustrating the relationship between the depth of a venturi tube (i.e. the depth of a venturi tube's throat) and the venturi tube's choke speed. A venturi's choke speed increases with increasing depth due to a corresponding increase in water pressure.

The temperature of the seawater in which a venturi device will operate will typically range from $-2°$ C. to $30°$ C. Within this range of temperatures the vapor pressure of water, and hence the choke speed of a venturi device, will vary only slightly. Therefore, the choke speed of a venturi device will only vary to a minor, if not negligible, extent with respect to the temperature of the seawater entering a venturi device. Expected seawater temperature can be incorporated in to the optimization process described in this invention if so desired by those skilled in the art. However, for the sake of improved clarity, a seawater temperature of $20°$ C. has been assumed in the disclosure of this invention.

Figure 8:
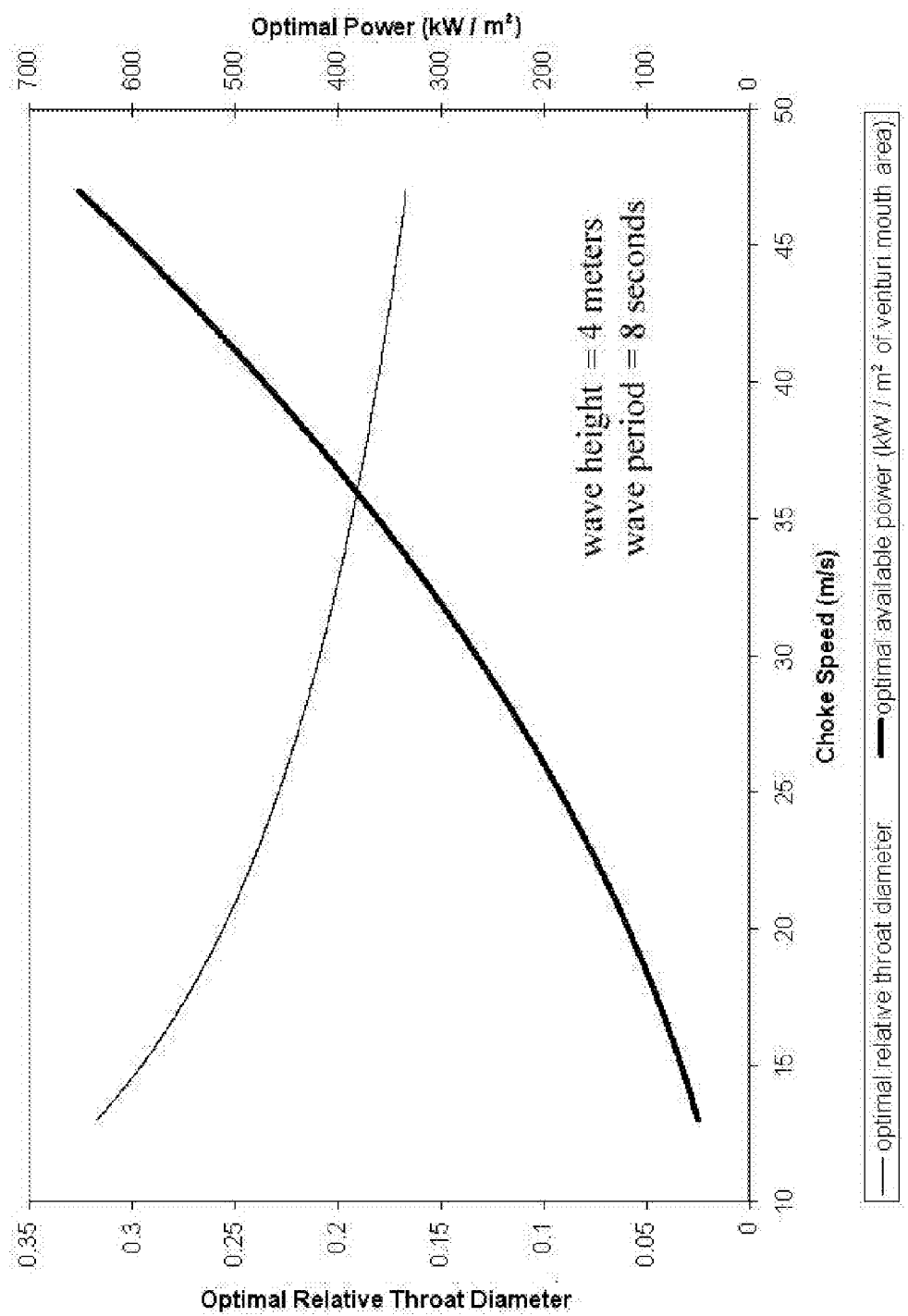
FIG. 8 is a graph which shows the optimal available power which can be made available for extraction within a venturi device through the selection of an optimal relative venturi throat cross-sectional area (expressed in the graph as the diameter of an equivalent circular area) with respect to a range of likely choke speeds with respect to a specific wave height and wave period.

FIG. 8 is a graph illustrating the maximum amount of available power (i.e. the line labeled "optimal available power"), which can be achieved through the selection of an optimal relative venturi throat cross-sectional area (relative to the cross-sectional area of the venturi mouth, and expressed in the graph as the diameter of an equivalent circular cross-sectional area), with respect to a range of likely choke speeds. Choke speed (m/s) is on the abscissa, optimal relative throat diameter on the left ordinate and optimal power in kilowatts per square meter ($kW/m^2$) on the right ordinate. As the choke speed increases, the optimal relative throat cross-sectional area decreases, because the degree to which the water can be accelerated increases. The optimal amount of power available, in the water flowing through a venturi device, with a suitably optimized venturi throat increases from 50 to 650 $kW/m^2$ (i.e. per $m^2$ of the cross-sectional area of the venturi device's mouth) over the indicated range of choke speeds. The actual amount of power available can be determined by multiplying the amount of power available per square meter, as specified in the graph, by the cross-sectional area of the mouth of a venturi device with the specified relative throat diameter (or the equivalent relative throat cross-sectional area).

As an example, let's consider the graph in FIG. 8. Let's assume that we want to know the optimal amount of power available to a submerged venturi device, and the corresponding relative venturi throat diameter needed to achieve that optimal level of available power, when our venturi device will operate in waters characterized by a choke speed of 30 m/s (i.e. at a depth of about 40 meters).

On the graph shown in FIG. 8, we find that the optimal available power corresponding to a choke speed of 30 m/s is about 265 kW/m². We also find that this optimal amount of power is associated with a relative venturi throat diameter of about 0.21.

If we want to calculate the actual throat diameter and available power for a specific venturi device, we need to scale each of the relative values specified in FIG. 8 by the appropriate attribute of the mouth of the actual venturi device. If we have a venturi device with a mouth possessing a cross-sectional area of 3 m², then the corresponding amount of available power when such a device operates in waters with a choke speed of 30 m/s is:

$$3\ m^2 * 265\ kW/m^2 = 795\ kW$$

The equivalent diameter (i.e. "Dm") of a venturi mouth with a cross-sectional area of 3 m² is:

$$(\Pi Dm^2)/4 = 3\ m^2,\ so\ Dm = 1.95\ meter$$

Therefore, remembering that the optimal relative throat diameter is 0.21, we may calculate the corresponding diameter of the throat of our actual venturi device ("Dt"):

$$Dt = 0.21 * 1.95\ m = 0.41\ meter$$

The corresponding optimal cross-sectional area (i.e. "At") of the venturi throat for our sample venturi device is:

$$At = \Pi(0.41\ m)^2/4 = 0.13\ m$$

Figure 9:
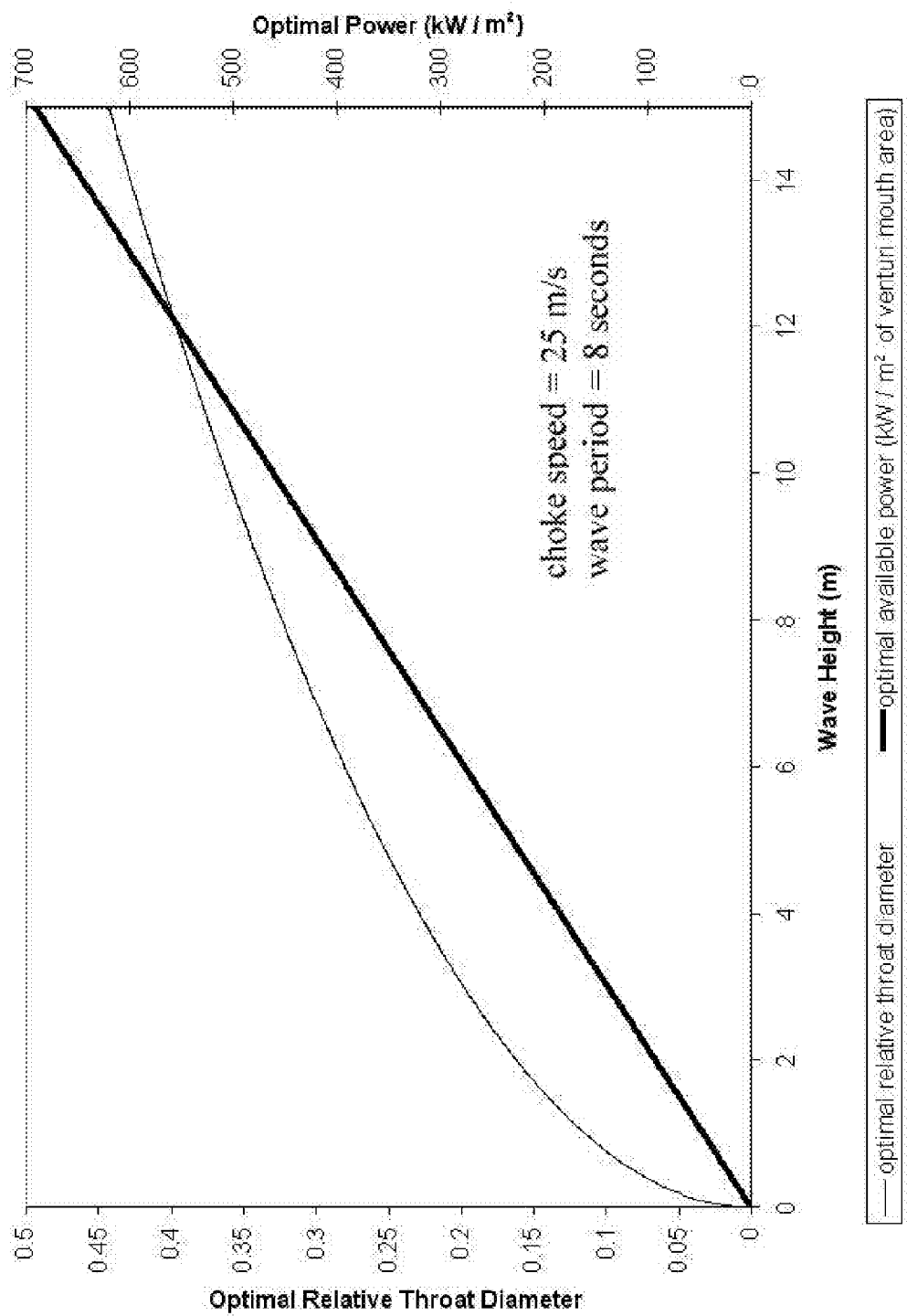
FIG. 9 is a graph which shows the optimal amount of power which can be made available for extraction within a venturi device through the selection of an optimal relative venturi throat cross-sectional area (expressed in the graph as the diameter of an equivalent circular area) with respect to a range of likely wave heights with respect to a specific choke speed and wave period.

FIG. 9 is a graph illustrating the optimal amount of available power, which can be achieved through the selection of an optimal relative venturi throat diameter (or a corresponding optimal venturi throat cross-sectional area), with respect to a range of likely wave heights. Wave height is shown on the abscissa, optimal relative throat diameter on the left ordinate and optimal power on the right ordinate. As the wave height increases, the optimal relative throat diameter (with respect to the diameter of the mouth in an equivalent venturi tube) increases. The optimal amount of power available per square meter of the cross-sectional area of the venturi mouth, in the water flowing through the throat of an optimized venturi device, increases from 0 (in the absence of waves) to 700 kW/m² (with respect to waves with a height of 15 meters). A more likely range of wave heights would be 3 to 6 meters, with respect to which the corresponding optimal amounts of available power would be 138 to 277 kW/m².

Figure 10:
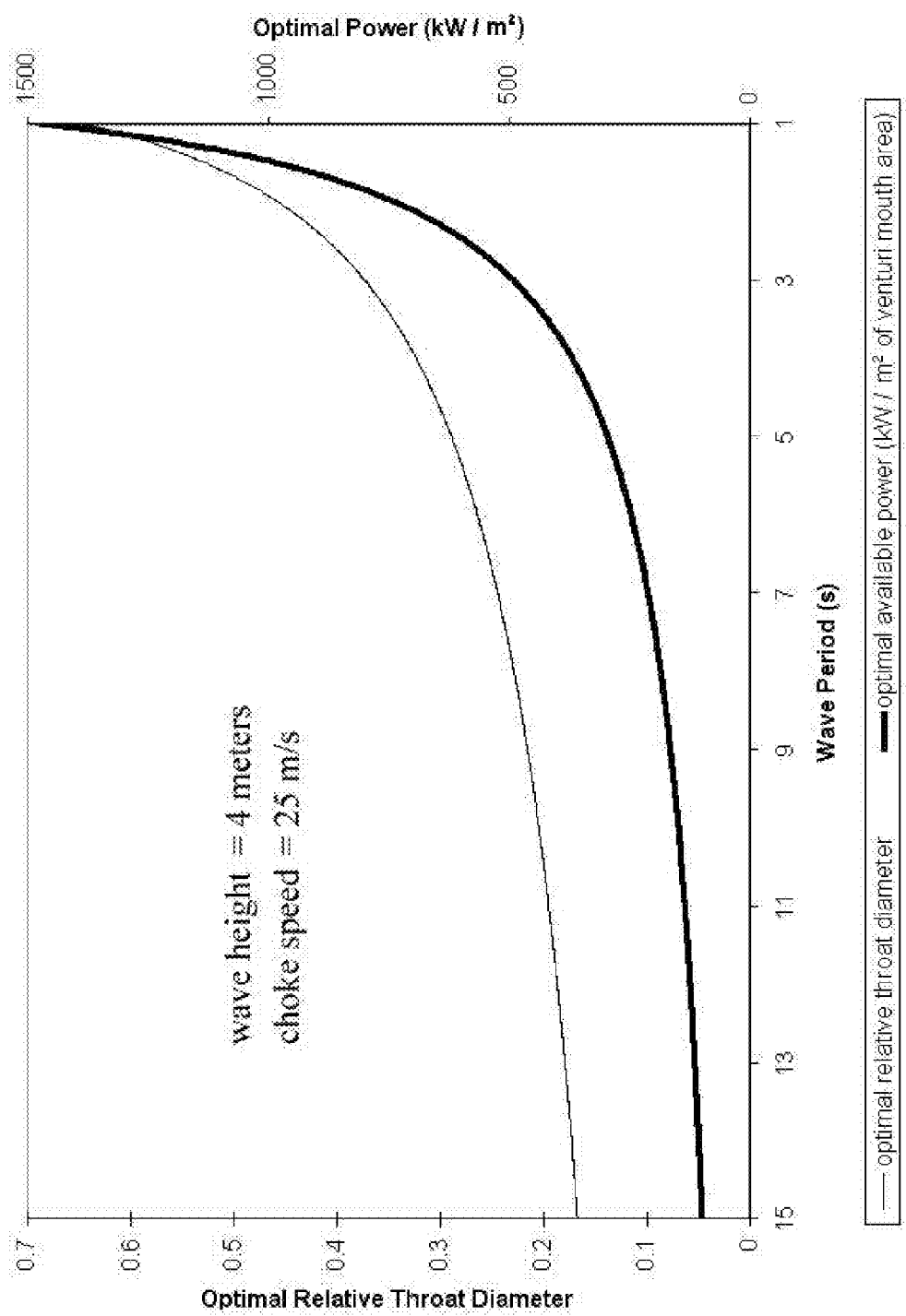
FIG. 10 is a graph which shows the optimal amount of power which can be made available for extraction within a venturi device through the selection of an optimal relative venturi throat cross-sectional area (expressed in the graph as the diameter of an equivalent circular area) with respect to a range of likely wave periods with respect to a specific choke speed and wave height.

FIG. 10 is a graph illustrating the optimal amount of available power, which can be achieved through the selection of an optimal ratio of the cross-sectional areas of venturi throats to mouths, with respect to a range of likely wave periods. Wave period is shown on the abscissa, optimal relative throat diameter on the left ordinate, and optimal power on the right ordinate. As the wave period decreases (and the energy of the waves therefore increases), the optimal relative throat diameter (with respect to the mouth diameter in an equivalent venturi tube) increases. The power available in the water flowing through the throat of an optimized venturi device increases from 100 to 1470 kW/m² as the wave period decreases from 15 seconds down to 1 second. A more likely range of wave periods would be 11 to 7 seconds, and the corresponding optimal amounts of available power would be 134 to 210 kW/m².

Figure 11:
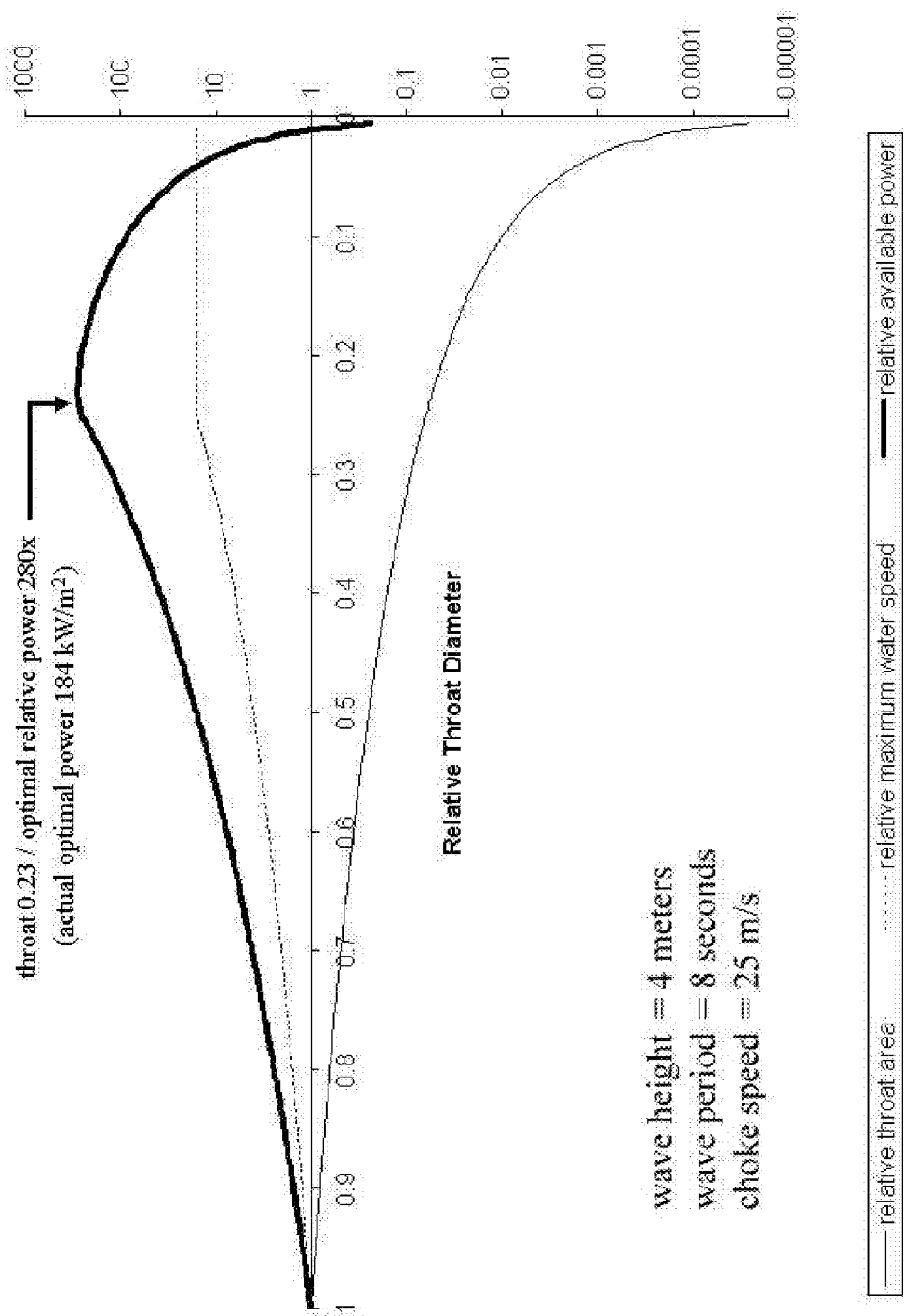
FIG. 11 is a graph illustrating the relationship of the power available within a venturi device with respect to a range of possible relative venturi throat diameters with respect to a specific wave height and wave period and choke speed.

FIG. 11 is a graph illustrating the relationship of the power available (i.e. the line labeled "relative available power") within a venturi device with respect to a range of possible relative venturi throat diameters (i.e. ranging from 1.0, i.e. a throat diameter equal to the diameter of the venturi mouth, down to 0, the absence of any throat at all). This graph illustrates the basic mechanism for selecting an optimal venturi throat diameter with respect to a specific set of wave conditions.

The relationships expressed in this graph apply not only to venturi tubes, but also to any venturi device. The square of the indicated "Relative Throat Diameter" provides the relative cross-sectional area of the throat of any venturi device relative to the cross-sectional area of the device's mouth. The graph's use of a "Relative Throat Diameter" is based on the assumption of a radially symmetrical venturi tube, but the data in the graph applies with equal force to venturi device of any form or design.

Note that FIG. 11 reveals an optimal relative diameter for the throat of the venturi device (and a corresponding optimal relative cross-sectional area) when driven by waves of the specified kind, in water characterized by the specified choke speed. This optimal throat diameter, and/or cross-sectional area, is a unique value with respect to the following combination of wave height, wave period and choke speed.

The graph in FIG. 11 is based on the following assumptions:
  a choke speed of 25 m/s,
  a wave height of 4 meters, and
  a wave period of 8 seconds.

With respect to these assumptions, the maximum available power occurs when the relative throat diameter is 0.23, which is equivalent to a relative throat area of 0.053. With respect to this optimal venturi device configuration, and with respect to the specified wave height, wave period, and choke speed, the available power in the water flowing through the throat of the venturi tube would be increased by a factor of 280× with respect to the amount of power available in the unaccelerated water outside the venturi device. With respect to the wave conditions specified above, the amount of power available in the unaccelerated water flowing in to the venturi device's mouth is 0.661 kW/m². Therefore, the actual amount of power available with respect to the optimal relative venturi throat diameter of 0.23 is:

$$0.661\ kW/m^2 * 280 = 183\ kW/m^2$$

183 kW/m² is the optimal, or maximal, amount of power which can be made available by a venturi device submerged in water characterized by the specified choke speed when the device is driven by waves with the specified height and period.

Figure 12:
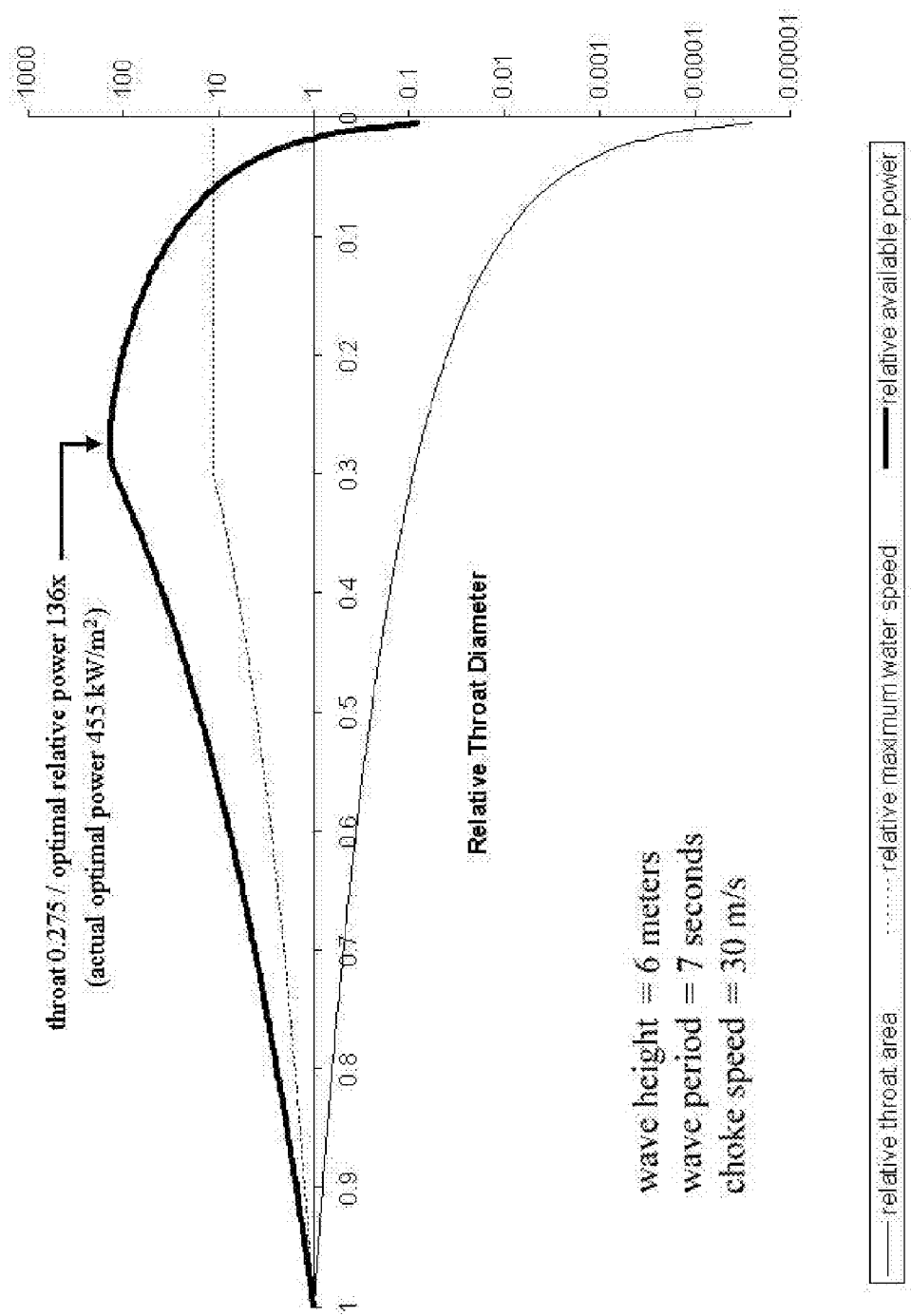
FIG. 12 is a graph similar to the one in FIG. 11 but with respect to a different wave height, period and choke speed.

FIG. 12 is a graph like the one in FIG. 11. However, this graph of the relationship of the power available with respect to the relative venturi throat diameter is with respect to a different set of wave conditions and choke speed.

Note that FIG. 12 reveals an optimal relative diameter for the throat of the venturi device (and a corresponding optimal relative cross-sectional area) when driven by waves of the specified kind, in water characterized by the specified choke speed. This optimal throat diameter, and/or cross-sectional area, is a unique value with respect to the following combination of wave height, wave period and choke speed.

The graph in FIG. 12 is based on the following assumptions:
  a choke speed of 30 m/s,
  a wave height of 6 meters, and
  a wave period of 7 seconds.

With respect to these assumptions, the maximum available power occurs when the relative throat diameter is 0.275, which is equivalent to a relative throat area of 0.076. With respect to this optimal venturi device configuration, and with respect to the specified wave height, wave period, and choke speed, the available power in the water flowing through the throat of the venturi tube would be increased by a factor of 136× with respect to the amount of power available in the unaccelerated water outside the venturi device. With respect to the wave conditions specified above, the amount of power available in the unaccelerated water flowing in to the venturi device's mouth is 3.33 kW/m². Therefore, the actual amount of power available with respect to the optimal relative venturi throat diameter of 0.275 is:

$$3.33 \text{ kW/m}^2 * 136 = 455 \text{ kW/m}^2$$

455 kW/m² is the optimal, or maximal, amount of power which can be made available by a venturi device submerged in water characterized by the specified choke speed when the device is driven by waves with the specified height and period.

Figure 13A:
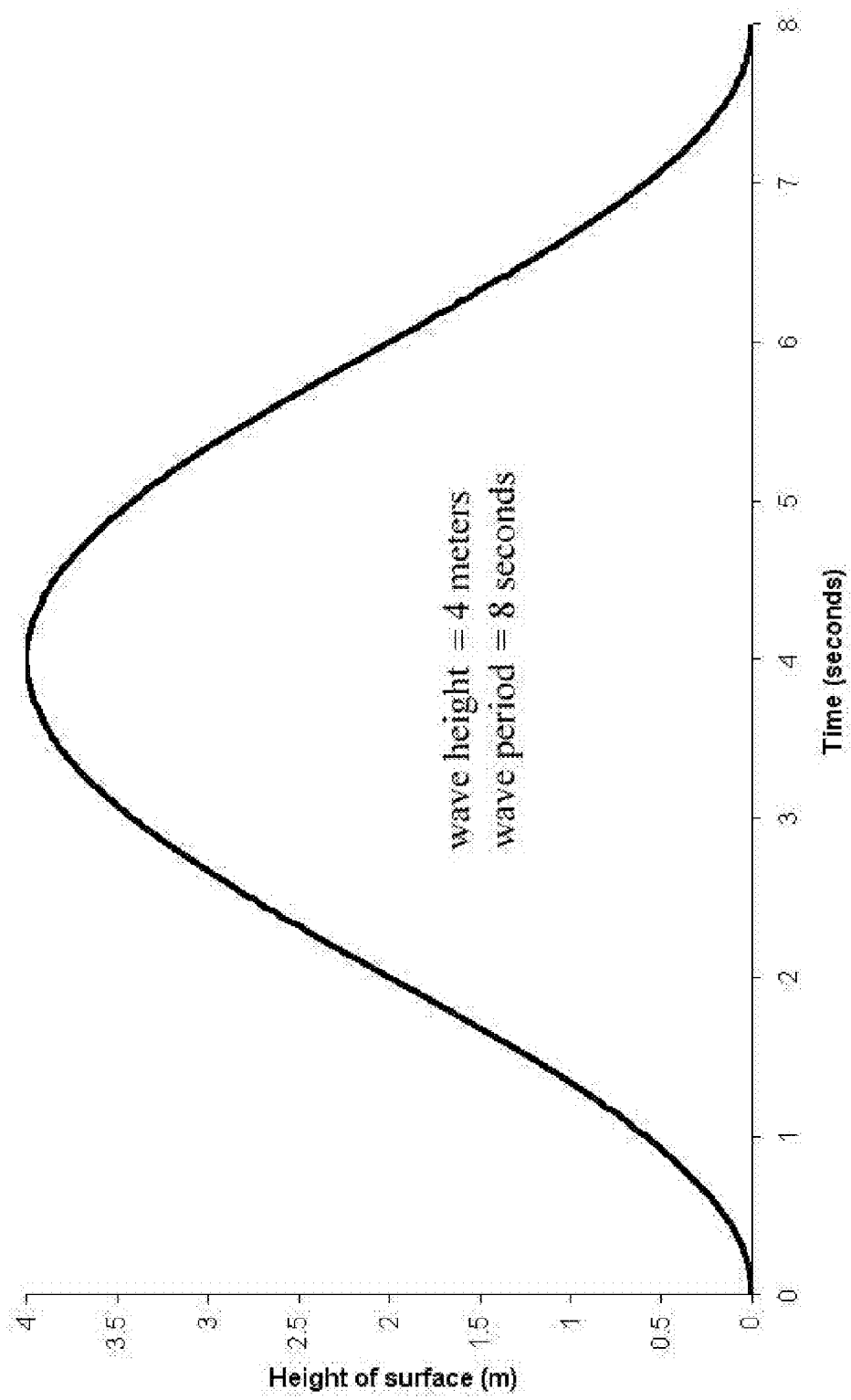
FIGS. 13A-13D are graphs illustrating the speed of the water at various portions along a wave as depicted in FIG. 13A as well as the water flowing through the throat of a venturi device as shown in FIG. 13C and the power available in the throat of the venturi device as shown in FIG. 13D.

FIG. 13A displays a cross-sectional profile of a typical deep-water wave, as it might appear if it were sliced along a plane parallel to its direction of propagation and normal to the surface of the ocean. The wave illustrated in this figure has a height of 4 meters and a period of 8 seconds. Note that the wave begins and ends at points described as "troughs" where the water is at its lowest level during the wave cycle. Also, note that the wave reaches a "peak" mid-way through its period. The vertical distance between the troughs and the peak is the measure of the height of a wave.

Figure 13B:
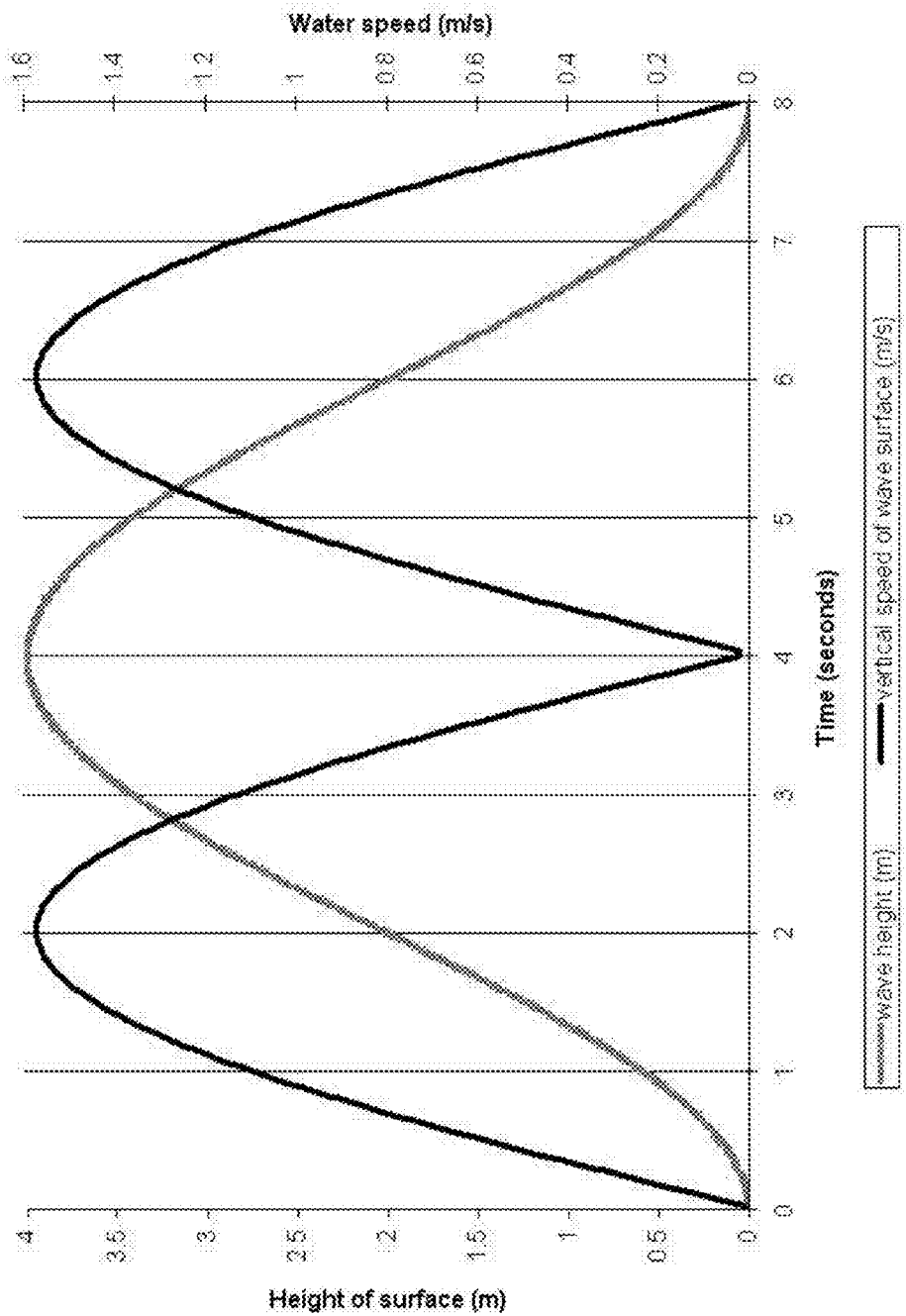

FIG. 13B displays the relationship of the vertical speed of the water at the surface of a wave to the height of that water along the wave's profile. The same wave height displayed in FIG. 13A is also shown this figure. However, FIG. 13B includes a line denoting the vertical speed of each point along the surface of the corresponding portion of the wave's profile. Note that the speed reaches it maximum at the points on the wave's surface that represent the vertical midpoints of the wave's profile. In the sample shown, the maximum speed of 1.57 meters per second occurs at 2 and 6 seconds after the wave's trough. These represent one- and three-quarters of the wave's progress towards its next trough.

Figure 13C:
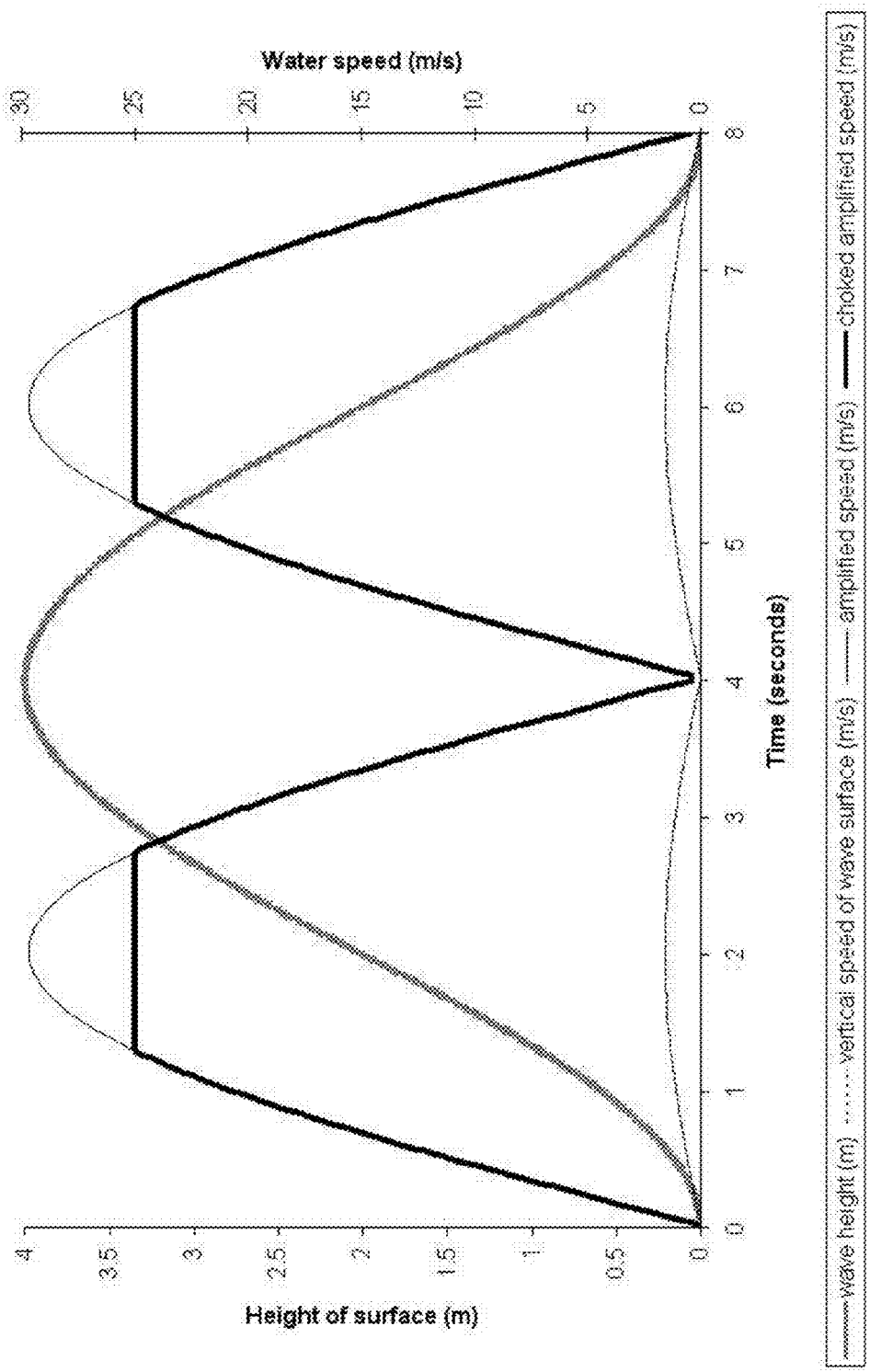

FIG. 13C displays, for reference, the same wave profile shown in FIGS. 13A and 13B. FIG. 13 C also includes the same vertical speed profile for the reference wave, which ranges from 0 to 1.57 m/s. FIG. 13C includes a line, i.e. labeled "amplified speed", which represents the speed which would characterize the water traveling through the throat of a venturi device which possessed a ratio of mouth-to-throat cross-sectional areas, i.e. a "venturi factor", of 18.9. This amplified speed profile ranges from 0 to 30 m/s. In other words:

[input speed 0 to 1.57 m/s]*[venturi factor of 18.9]=
[throat speed 0 to 29.7 m/s]

FIG. 13C also displays what the actual water-speed profile, of the water flowing through the throat of a venturi device with a venturi factor of 18.9, would be if the water entering the venturi device mouth was characterized by a choke speed of 25 m/s. This is the choke speed one might expect to encounter with a venturi device operating at a depth of about 22 meters.

Figure 13D:
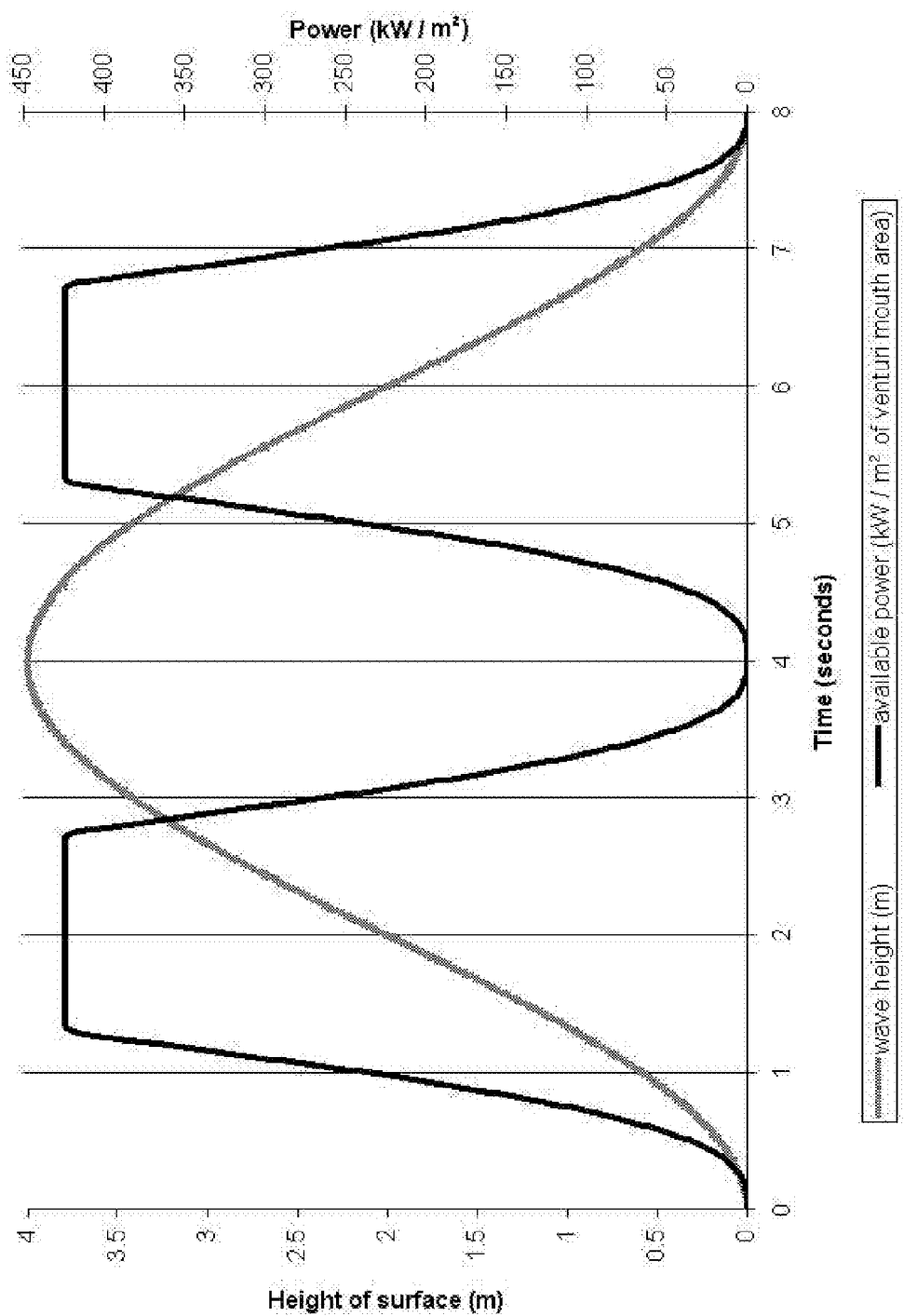

FIG. 13D displays the amount of power that would be available in the throat of a venturi device with a venturi factor of 18.9, when it is driven by waves with a height of 4 meters and a period of 8 seconds, when the water flowing through the venturi device has a choke speed of 25 m/s. Note that the amount of available power is truncated at a level of 424 kW/m². This truncation, or upper-limit, of the level of available power is a direct consequence of the truncation, or upper-limit, of the amplified speed of the water flowing through the throat of the venturi device.

Note that the power levels displayed in this graph are specified in terms of power per square meter (i.e. kW/m²). This is because these power levels are relative to the total size of the venturi device. In particular, these power levels are relative to the amount of water that will enter a particular venturi device. For example, a venturi device through which flows twice the volume of water as that which flows through another venturi device will likewise have twice as much power available for extraction. The power levels specified in this graph, and in many of the other graphs referred to in this patent, will be expressed in terms of kW/m², where the area is in relation to the cross-sectional area of the venturi mouth of any particular venturi device. The actual power level associated with any particular device will be determined by multiplying the cross-sectional area of the venturi device's mouth by the relative amount of power specified.

Figure 14:
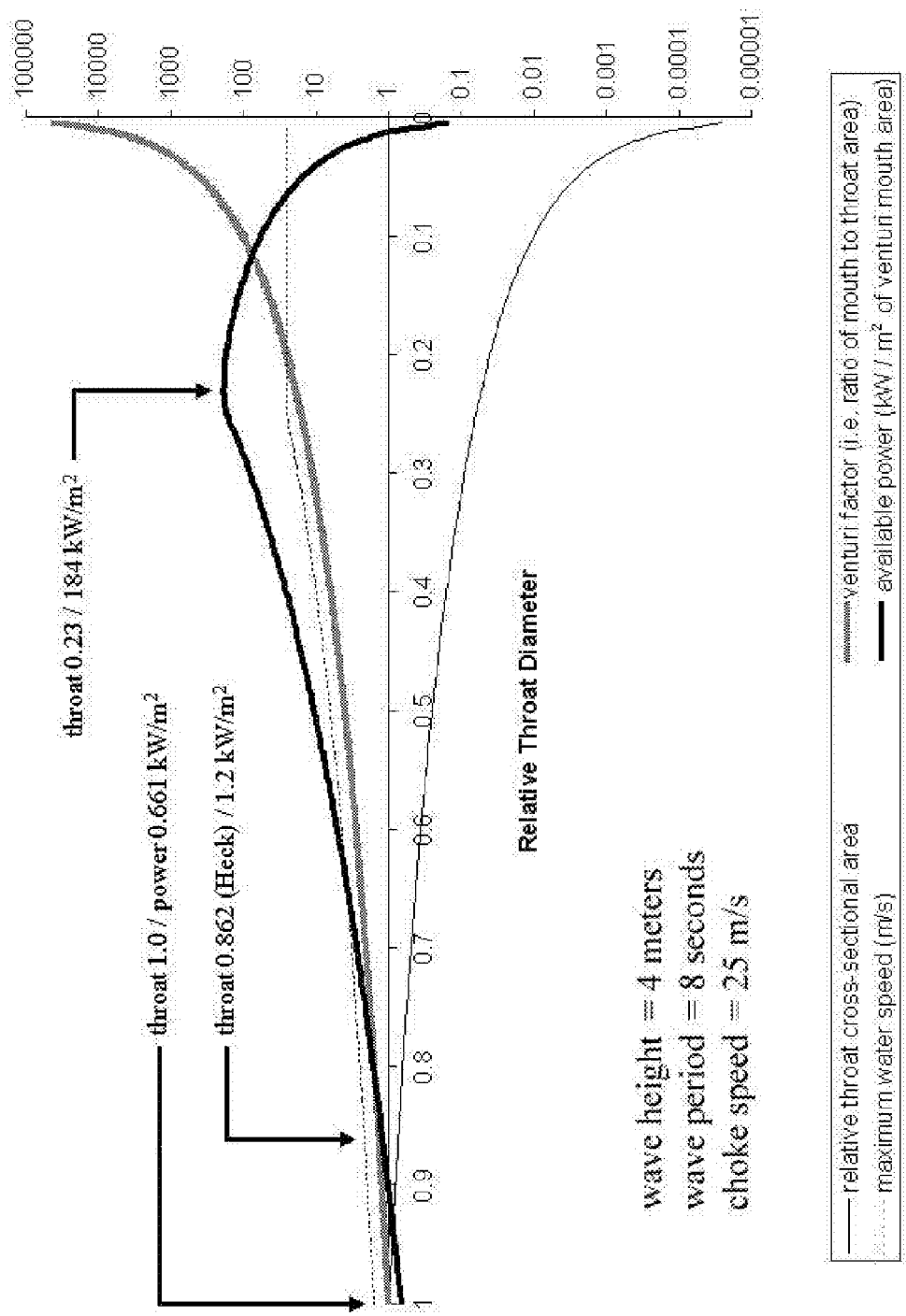
FIG. 14 illustrates the actual speeds and relative power levels of a venturi device operating in water having a specific wave height, wave period and choke speed with respect to the device's relative throat cross-sectional area (expressed in the graph as the diameter of an equivalent circular area)

FIG. 14 shows the relationship between the actual speeds and power levels (still relative to the cross-sectional area of the venturi device's mouth) and the relative throat diameters with respect to a venturi device operating in waves with a height of 4 meters, a period of 8 seconds, and a choke speed of 25 m/s. Note the power level associated with the ambient water entering the mouth of the venturi device (i.e. before any amplification of its speed has occurred) is 0.661 kW/m². Also note that the power level that would characterize a Heck wave energy device, which possesses a relative venturi throat diameter of 0.862, would be 1.2 kW/m², an 80% improvement. Finally note that the maximum possible power level associated with a venturi device optimized according to the principles of this invention would be 184 kW/m², an improvement of 28,000%. An optimized venturi device can make available 15,000% more power than an equivalent Heck device.

Also note in FIG. 14 that the optimal relative throat diameter (i.e. 0.23) is slightly less than the diameter at which the speed of the water passing through the throat of the venturi device first begins to reach and/or exceed the choke speed (i.e. at 0.25).

Figure 15:
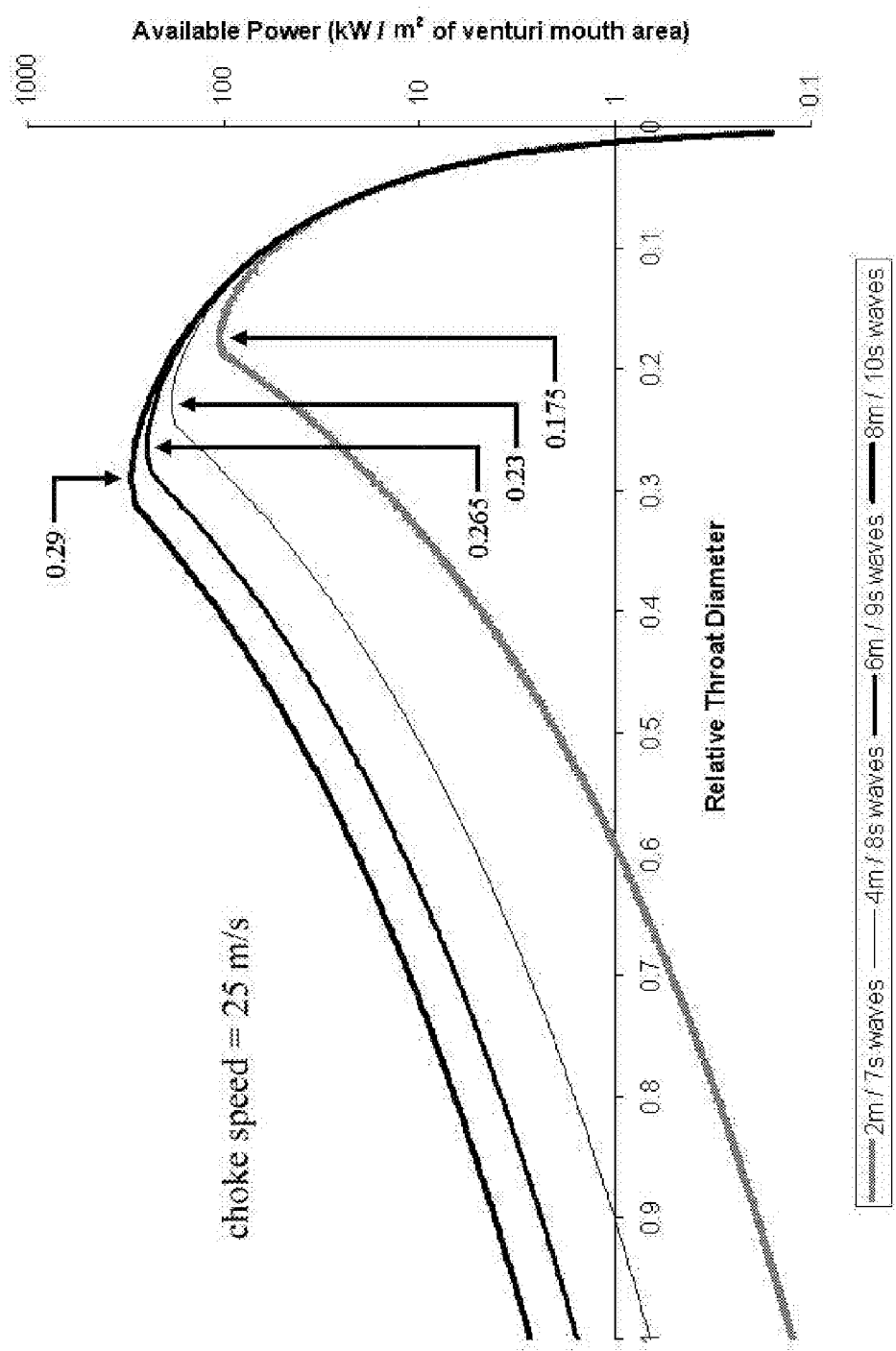
FIG. 15 is a graph illustrating power optimization curves similar to that shown in FIG. 14, but with respect to different wave heights and periods with a choke speed that is specific.

FIG. 15 shows four power optimization curves, similar to the curve illustrated for 4-meter waves in FIG. 14. These four curves of available power correspond, respectively, to waves with heights and periods of:

2 meters and 7 seconds,
4 meters and 8 seconds,
6 meters and 9 seconds,
8 meters and 10 seconds Note that, with respect to each unique wave type, there is a corresponding unique relative venturi throat diameter that would result in an optimal amount of power being made available for extraction. Obviously, an actual wave energy device deployed in a real environment will be subjected to a variety of wave types. Therefore, the selection of the one relative venturi throat diameter for a particular wave energy device must balance the effects of that particular diameter on the overall power of the device.

Figure 16:
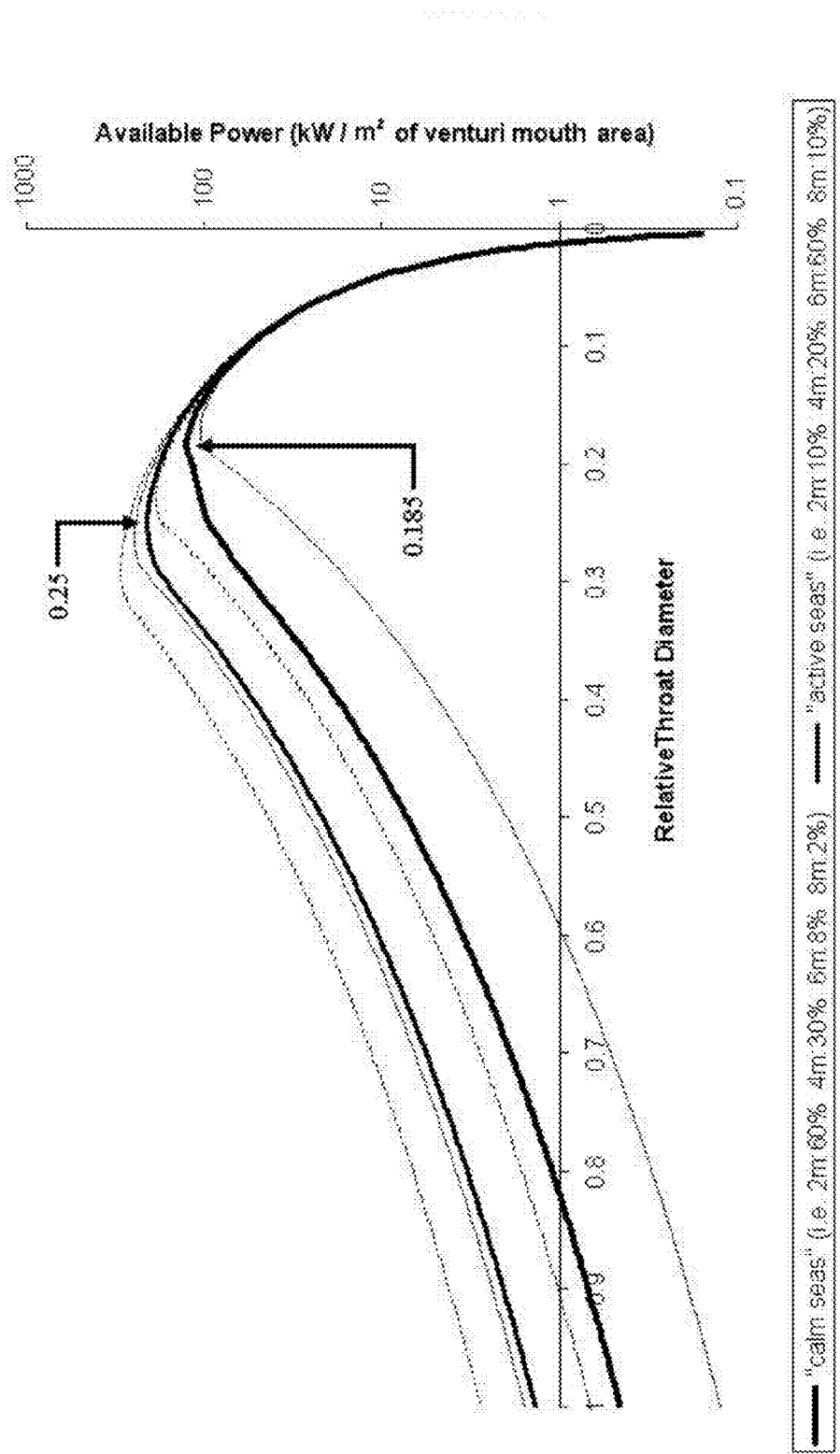
FIG. 16 is a graph illustrating the optimization of the relative venturi throat cross-sectional area (expressed in the graph as the diameter of an equivalent circular area) with respect to different sets of expected wave conditions.

FIG. 16 shows the results of optimizing the relative venturi throat diameter with respect to two different sets of expected wave conditions. (Note the assortment of wave types contributing to each wave condition is admittedly rudimentary. However, we are keeping this simple for the purpose of facilitating understanding in the optimization principles involved.)

The set of wave types labeled as "calm oceans" includes:
60% of waves with a height of 2 meters and a period of 7 seconds,
30% of waves with a height of 4 meters and a period of 8 seconds, 8% of waves with a height of 6 meters and a period of 9 seconds, 2% of waves with a height of 8 meters and a period of 10 seconds.

The set of wave types labeled as "active oceans" includes:

10% of waves with a height of 2 meters and a period of 7 seconds,

20% of waves with a height of 4 meters and a period of 8 seconds,

60% of waves with a height of 6 meters and a period of 9 seconds,

10% of waves with a height of 8 meters and a period of 10 seconds

Figure 17:
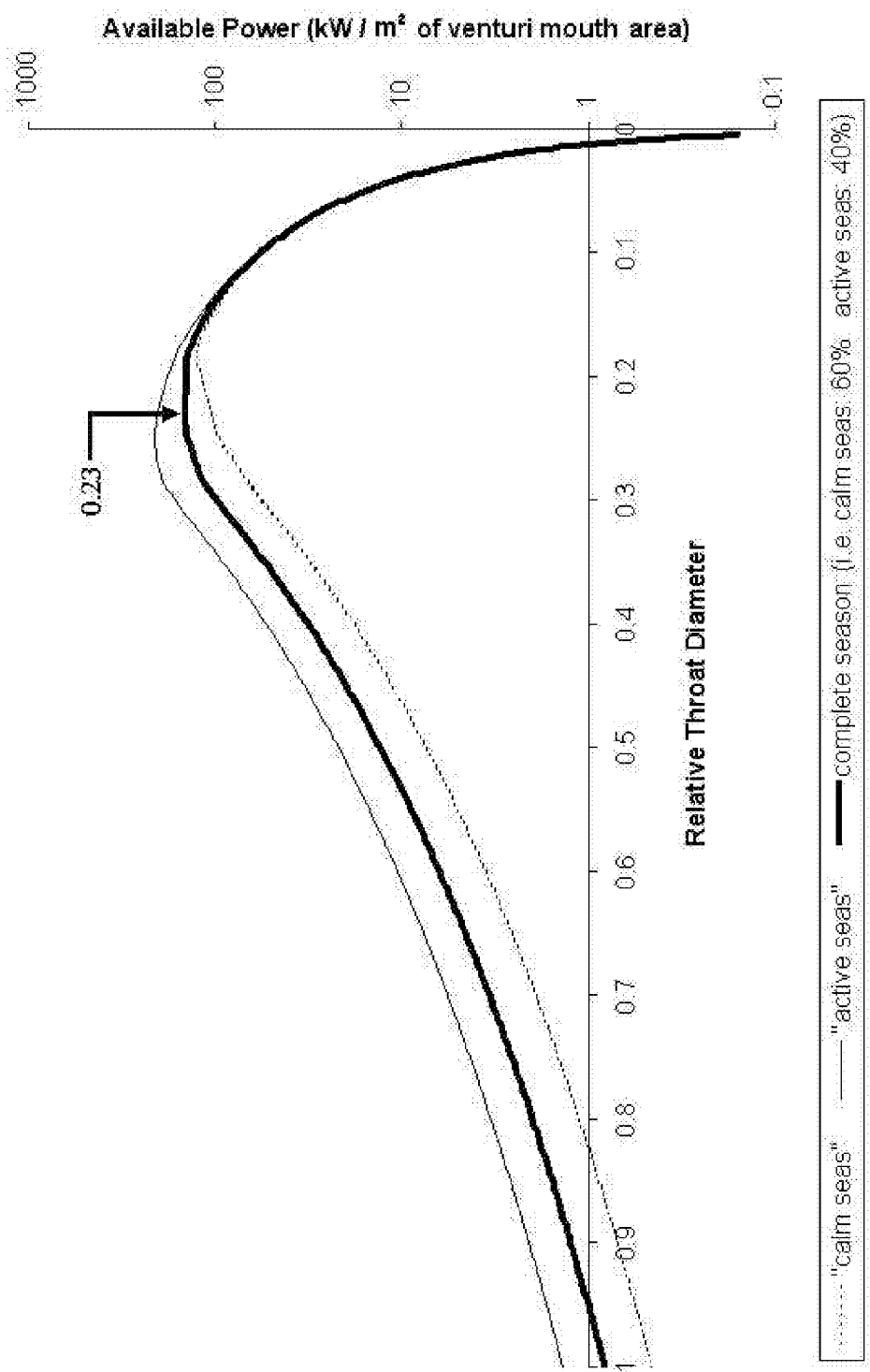
FIG. 17 is a graph illustrating the optimization of the relative venturi throat cross-sectional area (expressed in the graph as the diameter of an equivalent circular area) with respect to a combination of expected seasonal wave conditions.

FIG. 17 shows the results of optimizing the relative venturi throat diameter with respect to a combination of individual "ocean conditions" which might characterize a deployment site over the course of a year. This optimization is with respect to the following balance:

60% (or about 7 months) of calm oceans, and

40% (or about 5 months) of active oceans.

An actual deployment site might include complicated wave conditions over the course of a year. Conditions might even vary from year to year. In an actual optimization, one would likely catalogue the frequency with which each distinct wave type is observed at a particular deployment site (with whatever resolution in terms of height and period is desired) over the course of a suitable period of time, e.g. over the course of a year. The amount of power derived from each wave type could then be weighted by the frequency with which it was observed, or with which it is expected to be observed in the future, and the sum of the weighted power contributions associated with each wave type can then be used to compute the overall power level which would be expected with respect to each possible relative venturi throat diameter.

FIG. 18 is a table comparing a Heck venturi device with an equivalent device optimized according to the principles of this invention. The comparison is made on the basis of devices with a 7-meter diameter venturi device mouth, whose vertical oscillations are being driven by waves with heights of 4 meters, and periods of 8 seconds, in waters with a choke speed of 25 m/s.

Figure 19:
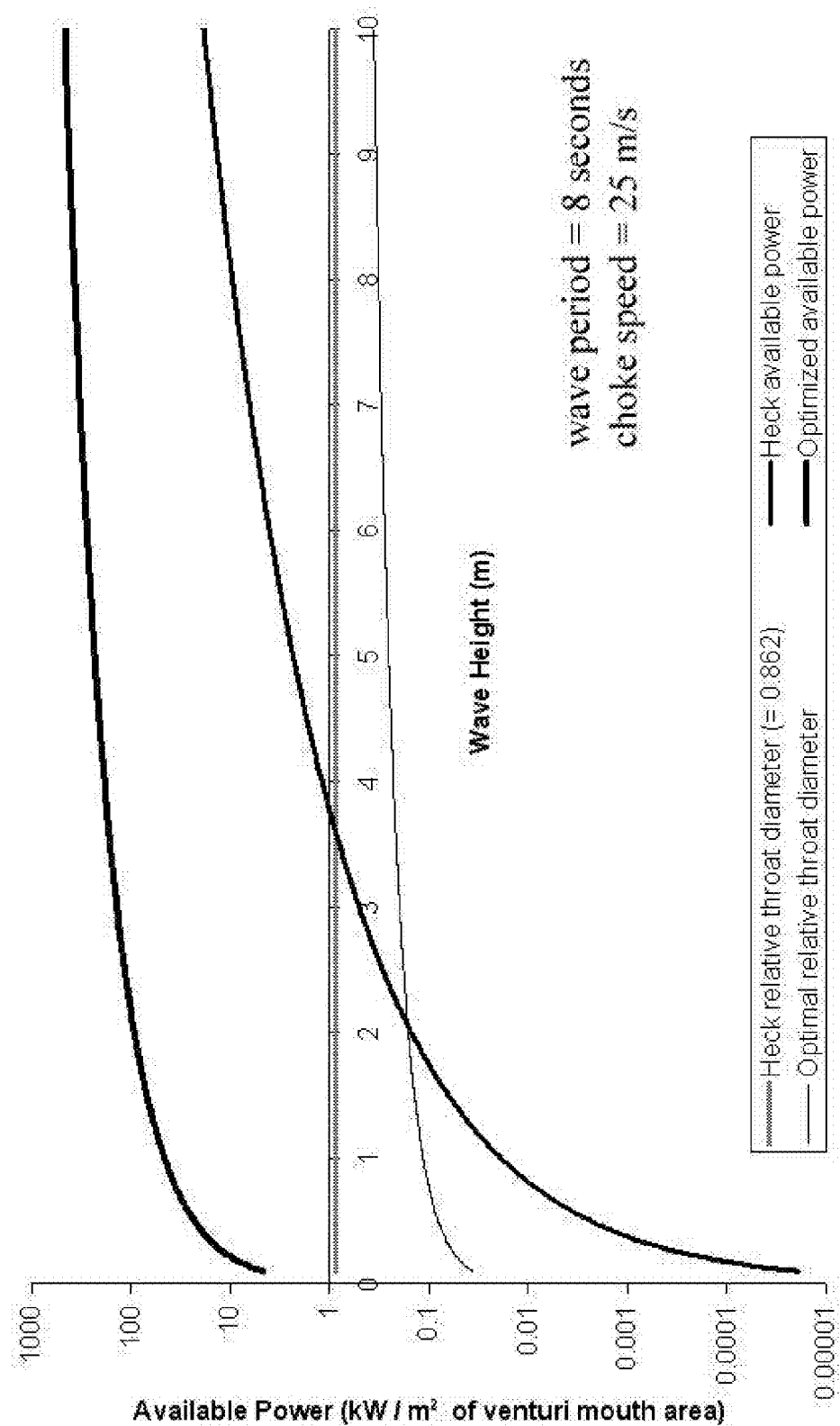
FIG. 19 is a graph illustrating the amount of power available for extraction from the prior art device as shown in FIG. 2 and by an equivalent device optimized according to the principles of the present invention.

FIG. 19 shows a comparison between the amount of power that would be made available) for extraction by a Heck wave energy device and by an equivalent device optimized according to the object of this invention. The power levels displayed in this figure are displayed relative to waves with heights ranging from 0 to 10 meters (and periods of 8 seconds, and choke speeds of 25 m/s). Note that the relative venturi throat diameter of the Heck device remains constant at 0.862, while the optimal diameter varies continuously from 0.01 (with respect to very small waves) to 0.36 (with respect to the most energetic waves). The power made available within a Heck wave energy device is uniformly, and substantially, less than that made available by an equivalent optimized device.

Figure 20:
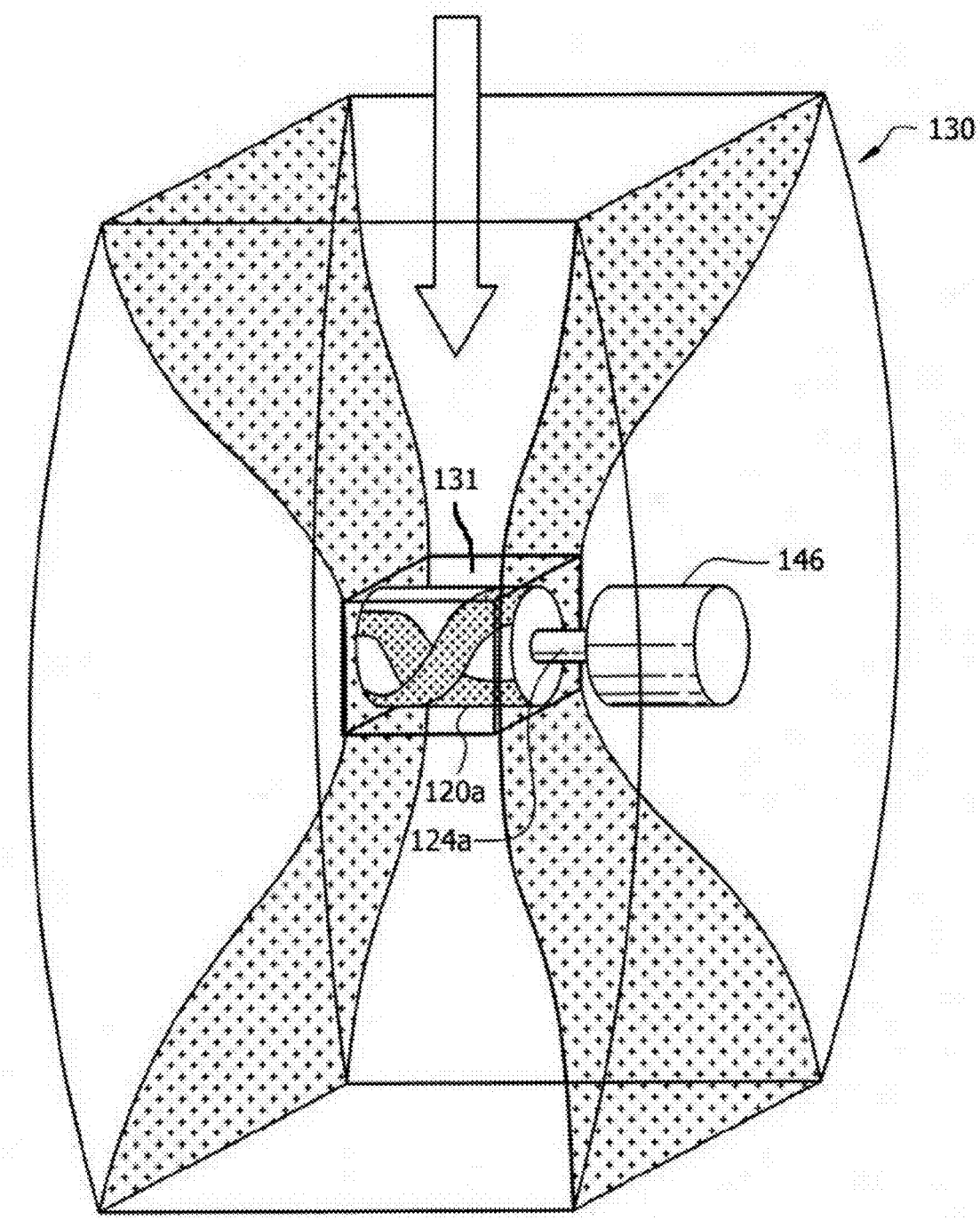
FIG. 20 illustrates an alternative embodiment of venturi device constructed in accordance with the principles of the present invention.

FIG. 20 is an alternate type of venturi device to which this invention would apply with equal force. It utilizes a venturi tube in which each cross-sectional area normal to the axis of the venturi tube is rectangular instead of circular. It also uses, as its power extraction mechanism, a turbine utilizing an axis of rotation normal to the axis of the venturi tube. This type of turbine extracts energy from the water flowing through throat 131 of venturi tube 130 regardless of the vertical direction of the water's travel. Water entering either mouth of venturi tube 130 induces the same rotational motion in perpendicular-axis turbine 120a. Such a turbine can be attached directly to an alternator or generator 146 by a shaft 124a or the turbine's rotational energy can be transmitted by any combination of solid (rigid) or flexible shafts to buoy 26.

If an alternator or generator 146 is located within the sidewalls of venturi tube 130 as depicted in FIG. 20, the electrical energy generated in response to the rotation of the perpendicular-axis turbine 120a is transmitted to the surface via one or more electrical conductors. Such conductors extend along one or more of the cables or struts 54-60 supporting venturi tube 130 beneath buoy 26. The optimization of this type of venturi device would also fall within the scope of this patent, as would the optimization of any other type of submerged venturi device.

FIG. 21 is another alternate type of venturi device to which this invention would apply with equal force. It utilizes a pair of wedge-shaped venturi devices that act in concert to spin an embedded turbine. The optimization of this type of venturi device would also fall within the scope of this patent, as would the optimization of any other type of submerged venturi device.

Figure 21A:
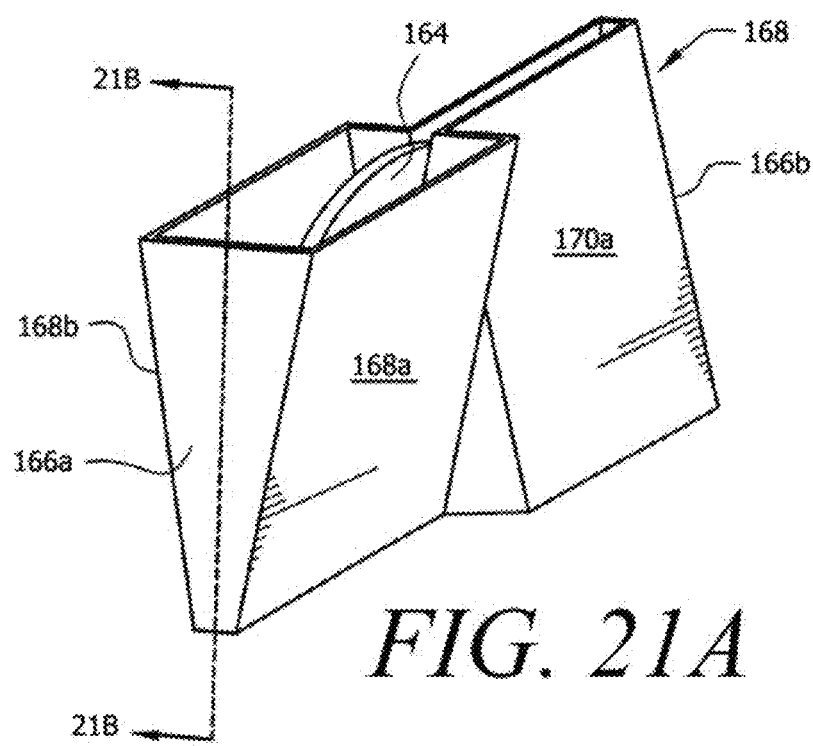
FIGS. 21A and 21B illustrate yet another alternative device constructed in accordance with the principles of the present invention
Figure 21B:
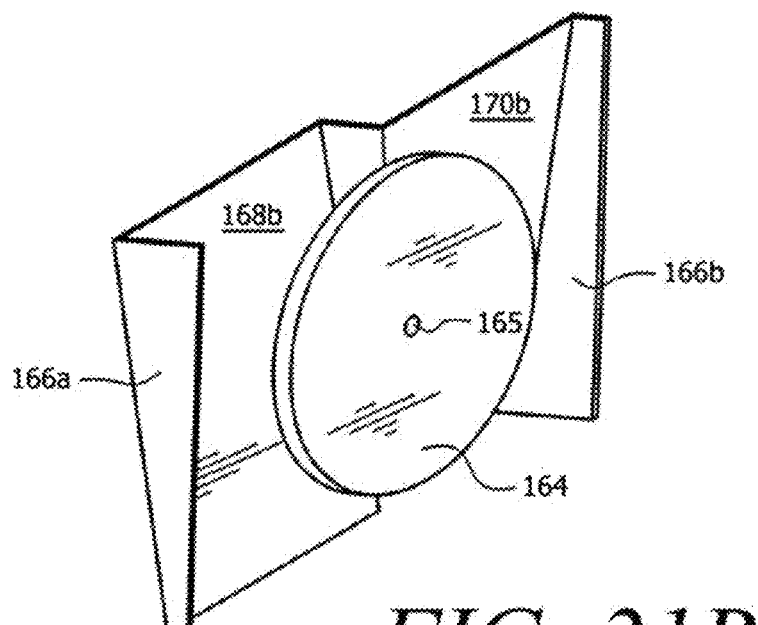

FIGS. 21A and 21B depict one of many possible embodiments of the novel venturi wave-energy device that are within the scope of this invention. FIG. 21B is a cross-sections view of housing 168 taken along line 21B-21B in FIG. 21A.

Water wheel 164 is mounted for rotation about axle 165 in housing 168 that includes two substantially parallel vertical walls 166A and 166B. Housing 168 has two compartments that are in fluid communication with one another. The first compartment is defined by sidewall 166A, front wall 168A, and back wall 168B. Front and back walls 168A, 168B converge toward one another from top to bottom, creating a venturi effect at the bottom of said first compartment. The second compartment is defined by side wall 166B, front wall 170A and back wall 170B. Front and back walls 170A, 170B diverge from one another from top to bottom, creating a venturi effect at the top of said compartment.

Axle 165 of water wheel 164 is positioned in the center of housing 168 so that half of said water wheel is in the first compartment and half is in the second compartment.

The left compartment as viewed in FIG. 21A receives water entering from the top and accelerates it as it moves toward the bottom, due to the decreasing cross-sectional area of the left compartment. Also any water entering the right compartment from the bottom accelerates as it flows through the right compartment's decreasing bottom to top cross-sectional area.

Figure 22A:
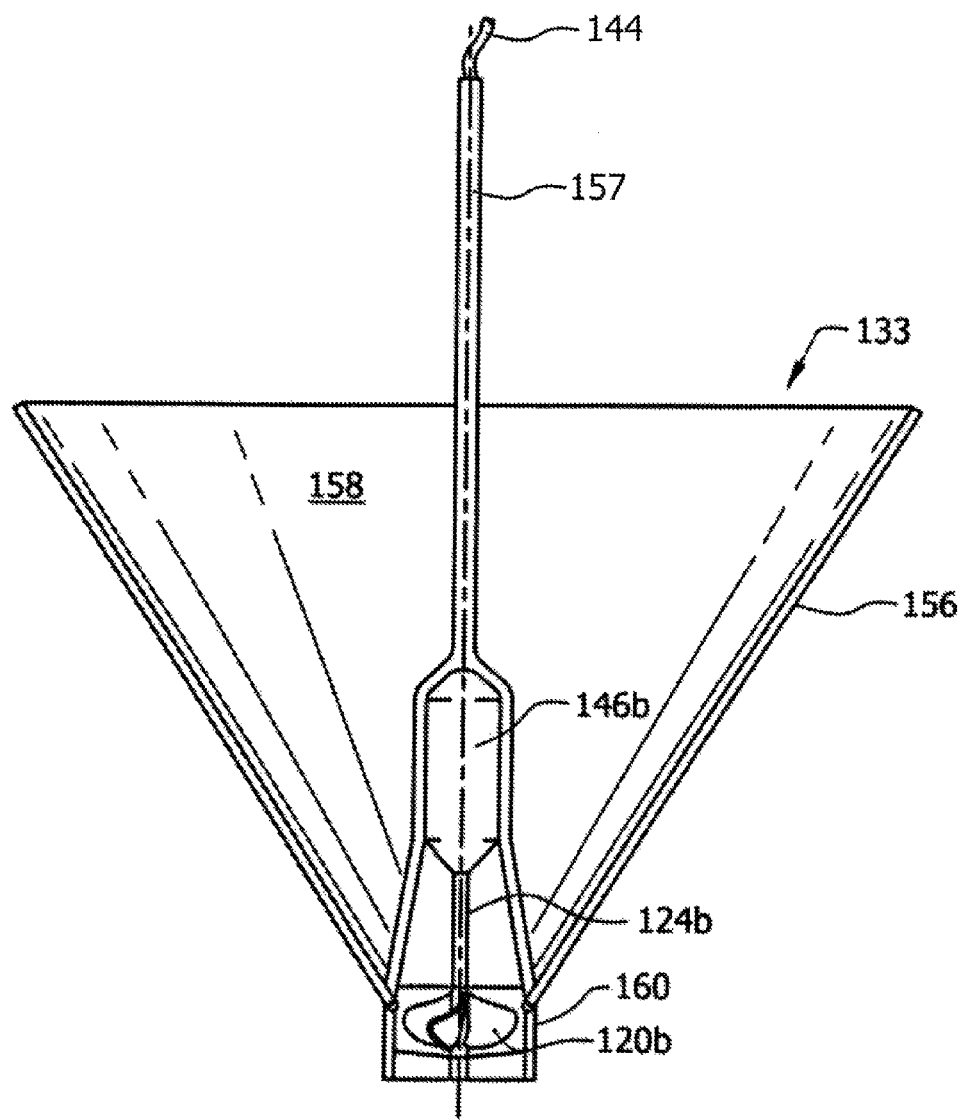
FIGS. 22A, 22B and 22C illustrate an additional alternative device constructed in accordance with the principles of the present invention.

FIG. 22A is yet another alternate type of venturi device to which this invention would apply with equal force. It utilizes a semi-rigid venturi shroud 133 having ribs 156 and fabric 158, which could, in some embodiments be collapsible. This type of venturi device, unlike the types discussed earlier, would only generate significant amounts of power when pulled up by its associated flotation device. A turbine 120B is disposed in the throat 160 of the venturi and is connected by a shaft 124B to a generator 146B. The venturi shroud might fully or partially collapse as the venturi device descends on the falling side of a passing wave. The optimization of this type of venturi device would also fall within the scope of this invention, as would the optimization of any other type of submerged venturi device.

Figures 22B, 22C:
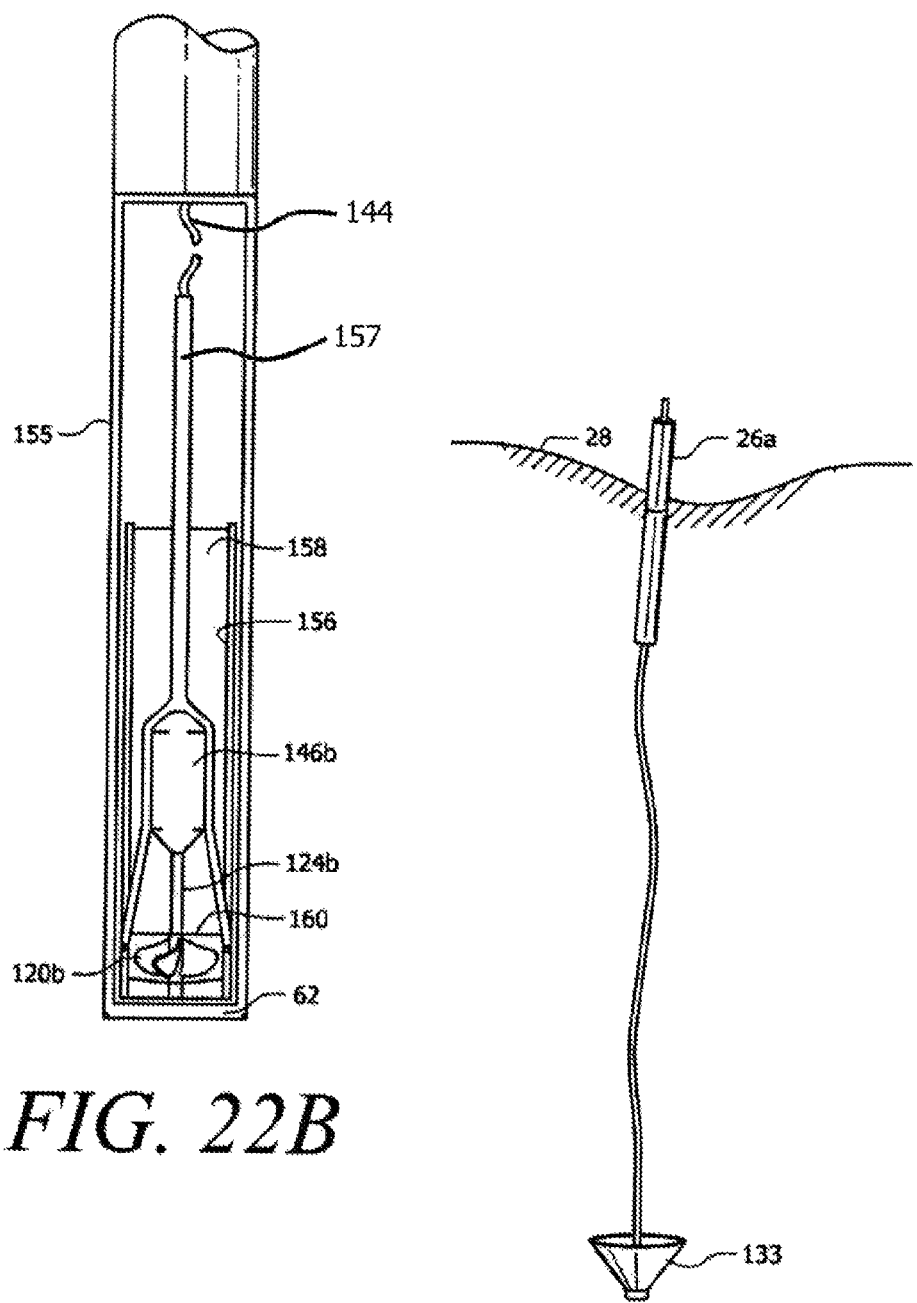

FIG. 22B illustrates how such an alternative embodiment of a venturi device as shown in FIG. 22A, i.e. one employing a collapsible venturi shroud, might fit inside a canister 155 for storage, and perhaps as an aid to deployment. Such a portable optimized venturi device might be useful as a power supply for buoys or life rafts.

FIG. 22C illustrates how such an alternate embodiment of a venturi device might operate in conjunction with a buoy.

A further discussion of FIGS. 22A-C follows. A preferred embodiment of the full-sized venturi-pinwheel wave-energy device transmits its rotary energy to the surface through mechanical shaft or cable (44 in FIG. 3C) that is attached to the central shaft (27 of FIG. 3B) of the turbine (21 of FIG. 3C). The mechanical rotational energy is converted into electrical energy with a generator mounted above the water line. To adapt this technology to small, portable devices, a small water-proof generator 146b is located near the turbine 120b and shares a common axle 124b with it.

The resulting power is transmitted to buoy 26a through primary electrical cable 144 which may also support the venturi shroud assembly as it hangs beneath buoy 26a. The preferred embodiment of a portable version of the venturi-pinwheel device includes central rigid support 157 securing cable assembly 144 to the turbine assembly. Central rigid support 157 maintains the vertical alignment of venturi shroud 133 and turbine 120b as the venturi shroud is pulled toward the surface by buoy 26a. The upward force provided by the buoy acts on the upper end of rigid support 157, and the drag induced by the unfurled venturi shroud 133 acts on the lower end of support 157. For the same reason that a wind vane orients itself to point into the wind, the central rigid support, and its attached venturi shroud, are compelled to point toward the buoy. Without this central rigid support, the orientation of the venturi shroud could be unstable, i.e., under the influence of water moving past it as it rises, the shroud would tend to turn sideways and a collapsible shroud would tend to partially collapse.

Because of its small size, solid turbine blade 120b (FIGS. 22A and 22B) is advantageous, instead of an articulating bi-directional turbine. Venturi shroud 133 funnels water into the turbine, increasing the water's speed, while the buoy and turbine are rising. A preferred embodiment of the full-sized venturi-pinwheel wave-energy device has a bi-directional venturi shroud allowing it to generate power when falling as well as rising. These adaptations allow the portable embodiment of the turbine to extract a significant amount of power from the seawater only while the buoy and turbine are rising.

It is also possible to construct a "miniaturized" version of the preferred embodiment of this device, i.e., a bi-directional venturi tube incorporating a bi-directional turbine. Such a device can utilize a local water-proof generator or a shaft transmitting rotational energy to a buoy at the surface of the water. For some applications this intermediate design may be advantageous. The scope of this disclosure includes all variations in the sizes of the devices disclosed.

A preferred embodiment of a portable version of the venturi-pinwheel device, which incorporates a collapsible venturi shroud, also contains rigid collar 160 serving as the base for the collapsible venturi shroud 133 to constrain its alignment. Propeller/turbine 120b is positioned concentrically with rigid collar 160 because the lumen of rigid collar 160 is the narrowest part of the lumen created by shroud 133. Rigid frame members 156 have a first end pivotally secured to rigid collar 160 in circumferentially spaced relation to one another.

FIG. 22B illustrates the configuration of the portable embodiment depicted in FIG. 22A when it is incorporates a collapsible venturi shroud and is stored within a canister 155. Rigid frame members 156 of venturi shroud 133 pivot toward rigid central support 157 of the device, and venturi shroud fabric 158 collapses like a retracted umbrella. Such a stored device may be slid out of storage canister 155 following the removal of optional canister lid 62.

FIG. 22C depicts the portable embodiment of FIGS. 22A and 22B with small buoy 26a. This embodiment has utility in connection with a life raft. When the assembly of FIGS. 22A and 22B is connected to buoy 26a by cable 144, the rising and falling of the portable venturi shroud generates electrical power. A life raft itself can serve as the buoy. This portable embodiment has utility in providing electrical power to distress beacons, locator devices, water distillation equipment, and the like.

Figures 23A, 23B:
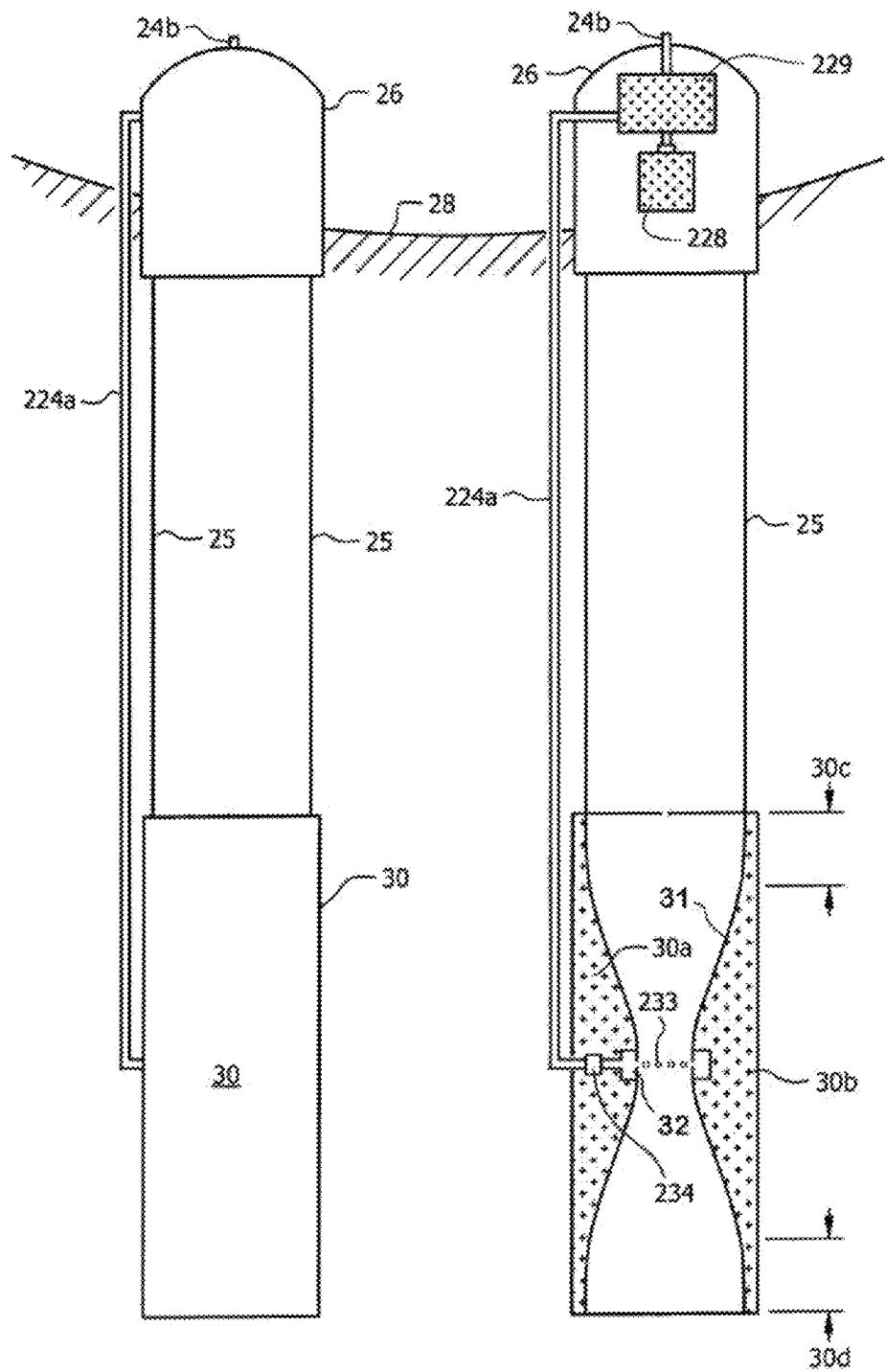
FIGS. 23A and 23B illustrate an alternative venturi device in which suction created by the venturi throat is used to draw air through a turbine to generate electrical energy.

FIG. 23A and FIG. 23B illustrate an alternate type of wave energy device, and inclusive venturi device, to which this invention would apply with equal force. This wave energy device is similar to that illustrated in FIGS. 3B and 3C but uses the reduced and/or eliminated lateral pressure in the water flowing through the throat of an optimized venturi device to create a sucking force. In this type of wave energy device embodiment the suction created at 233 by the venturi throat is used to draw air through a turbine 229 located in the buoy 26 at the surface. Such a device would likely incorporate one-way valves 234 to prevent water from rushing in to the pipes used to communicate the partial or full vacuum to the turbine at the surface when the suction in the venturi throat diminishes at or near the peaks and troughs of the waves driving the device's motion.

Figures 24A, 24B:
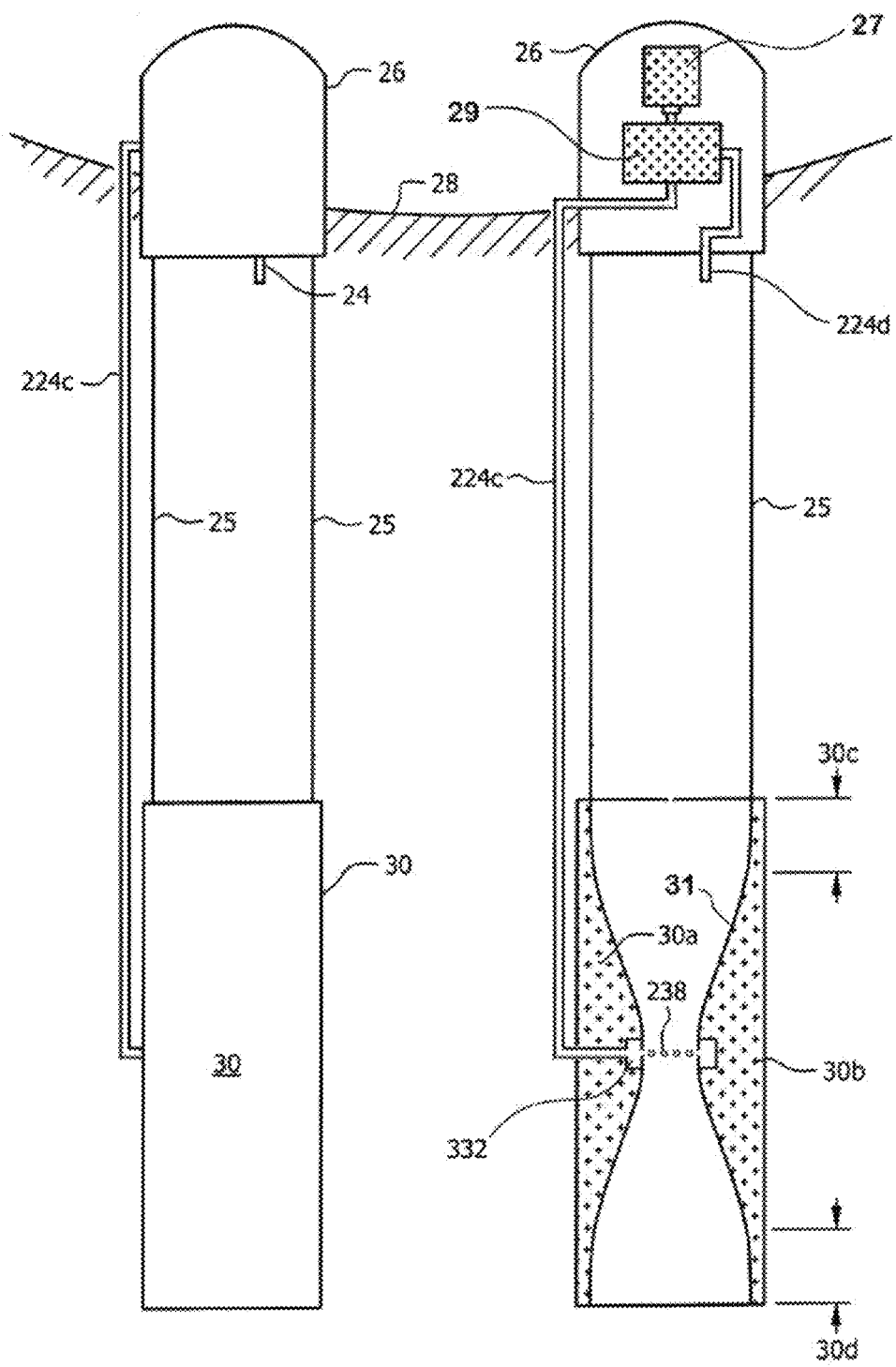
FIGS. 24A and 24B are similar to the alternative device in FIGS. 23A and 23B, but the suction force is used to draw water through the turbine.

FIG. 24A and FIG. 24B illustrate another alternate type of wave energy device similar to that illustrated in FIGS. 23A and 23B, and inclusive venturi device, to which this invention would apply with equal force. Like the device illustrated in FIG. 23, this device would exploit the suction created in the throat of an optimized venturi device to extract power from the ocean. This wave energy device however would use the sucking force to draw water through the turbine. Water would be able to enter the turbine through an inlet 224C, and a full or partial vacuum created by the suction in the venturi throat would be used to draw water out of the turbine, thus causing it to spin. The advantage of this device, over the one illustrated in FIG. 23, is that the pipe(s) connecting the venturi throat to the turbine would contain water instead of air. Thus, when the suction diminished near the peaks and troughs of the waves driving the vertical motion of the device, there would little, if any, tendency on the part of the water in the venturi throat to rush in to the pipe(s). Thus, it might not be necessary to utilize one-way valves in this type of device.

5. Detailed Description of the Preferred Embodiment

5a. Basic Design

The preferred embodiment of this invention (see FIG. 4) incorporates a buoy 52 rigidly attached to a submerged, radially symmetrical venturi tube, with a bi-directional turbine located in the throat of the venturi tube. In the preferred embodiment, the venturi tube is attached to the buoy by means of struts 54-60 located about the periphery of the tube and buoy. In the preferred embodiment, the rotation of the submerged turbine causes the attached turbine shaft to rotate, which, in turn, causes the shaft of an attached alternator to rotate. In the preferred embodiment, the rotations of the alternator's shaft result in the generation of electrical power.

However, many alternate embodiments are possible for a wave energy device that facilitates, and optimizes, its power extraction by means of an optimized venturi effect. All such alternate embodiments are within the scope of this invention.

5b. Optimization of Venturi Effect for Waves of Constant Height

5b1. Assumptions

For the sake of illustration, we will discuss the optimization of the venturi effect created within a wave energy device of the type illustrated in FIG. 4. The following discussions regarding the optimization of the venturi effect would apply equally well, with only slight, if any, modification, to other embodiments of venturi-based wave energy devices.

We will discuss the optimization of a venturi device from the perspective of a limiting, or maximum, overall device size. The types of venturi-based wave energy devices being discussed here have maximum practical sizes. However, the scope of this patent is not limited to the size of the energy device and applies with equal force to devices of all sizes.

The diameter of a buoy employed in this type of device (or the maximum width of the ocean surface area displaced by such a floating component) should not exceed more than a small fraction of the wavelength of the waves from which power is to be extracted if it is to remain optimal. Otherwise, the buoy will begin to "integrate" the wave's motion. That is, the amplitude of the buoy's vertical oscillations will begin to decrease with respect to the amplitude of the vertical oscillations of the waves passing beneath it. You can imagine that if a buoy's diameter were twice as great as the wavelength of the waves passing under it, then it would be difficult for the buoy to move up-and-down at all. The buoy would overlay as many wave crests as wave troughs and the net result would be little, if any, vertical movement.

However, it is much more likely that the diameter of a venturi-type wave energy device will be limited by practical considerations related to construction, deployment and maintenance, rather than being limited by its tendency to integrate waves. For instance, there might be practical considerations that dictate that the maximum diameter of a practical wave energy device might be 7 meters.

Therefore, when we discuss varying the diameter of the throat of a venturi tube in order to optimize the venturi effect, and the resulting extraction of power, we will discuss that throat diameter relative to a fixed (though arbitrary) diameter of the corresponding mouth of the venturi tube.

Furthermore, even though we will discuss the optimization of the diameter of the throat of a venturi device, relative to the diameter of its mouth, the same discussion and optimization procedure could apply with equal validity to the cross-sectional area of the throat of a venturi device, relative to the cross-sectional area of its mouth. We discuss the optimization process relative to the diameters of a presumably radially symmetrical venturi tube. However, the same process, discussed in terms of the respective cross-sectional areas, would apply to the optimization of venturi devices which were not radially symmetrical, and for which a reference to a diameter would be inappropriate.

We will also frequently discuss the optimization process, and the various quantities related to that process, in terms made relative to the cross-sectional area of the mouth of a venturi device. For instance, we will often express a power level as some amount of kilowatts per square meter. Obviously, power levels are not usually expressed relative to an area. We express such power levels as a level of power proportional to the cross-sectional area of the mouth of the venturi device under discussion. The actual power level can be obtained by multiplying the relative level specified by the cross-sectional area of the mouth of the venturi device under discussion.

FIG. 5 illustrates a sample venturi device with a mouth of diameter "Dm" which we will assume to be fixed at some arbitrary value, and a throat of diameter "Dt" which we will vary in our effort to optimize the venturi effect influencing the power available for extraction from the turbine.

5b2. Competing factors

The optimization of a venturi device, with respect to the degree to which it amplifies the speed of the water entering the venturi's mouth, involves two competing factors.

As the cross-sectional area of a venturi tube is reduced, the speed of the water that flows through that tube is increased. If you will examine FIG. 6 you will see a line (i.e. "relative throat area") that specifies the relationship between the relative cross-sectional area of a venturi tube's throat, and the corresponding relative throat diameter—both quantities being "relative" to the corresponding attributes of the venturi tube's mouth. This also specifies the area which will be swept by the blades, of any turbine operating therein. This area is proportional to the square of the throat's diameter. Furthermore, since the power generated by a turbine enclosed in the venturi tube's throat is proportional to the area swept by its blades, this same line specifies how the amount of power that a turbine could extract from water will change as a consequence of changes to its diameter.

In FIG. 6 you will see a line (i.e. "relative water speed") that specifies the relationship between the mouth-relative diameter of a venturi tube's throat and the relative speed of the water that will move through it (i.e. relative to the speed of the water that enters the venturi device). The water's speed is inversely proportional to the square of the diameter. (Actually, the degree to which the speed of the water is amplified is equal to the area of the mouth divided by the area of the throat. If you halve the area of the throat, relative to the area of the mouth, then you double the speed of the water that will flow through it, relative to the speed of the water which enters the mouth.)

In FIG. 6 you will see a line (i.e. "relative available power") that specifies the relationship between mouth-relative diameter of a venturi tube's throat and the amount of power available in water moving through that throat at the corresponding speed. This is the power that will be available in the water flowing through the venturi tube's throat relative to the power available in the water entering the venturi tube's mouth.

Finally, in FIG. 6 you will see a line (i.e. "relative device power") that specifies the relationship between the mouth-relative diameter of a venturi tube's throat and the amount of power available per square meter of the cross-sectional area of a stream of water moving at a particular speed. The "relative device power" is that "relative available power" (i.e. power per unit cross-sectional area) multiplied by the cross-sectional area of the venturi tube's throat. When the cross-sectional area of a venturi device's throat narrows, the water speeds up, which increases the amount of power available per unit of cross-sectional area, but the total cross-sectional area available decreases, so a tradeoff exists. This tradeoff is what this invention seeks to optimize.

The "relative device power" illustrated in FIG. 6 specifies how much power would be available for extraction by a turbine located in the throat of a venturi tube relative to the amount of power that would be available by a turbine located in the mouth of the venturi tube. The interesting observation to note here is that even though a turbine in a venturi tube's throat would presumably be smaller than a turbine which could be located in a venturi tube's mouth (or simply located in the water without benefit of a venturi tube as in Bichard), nevertheless, the amount of power which would be available for extraction by a turbine in the tube's throat would be much greater than the amount of power which would be available for extraction by a turbine in the tube's mouth, or a turbine outside the tube all together. This increase in the overall amount of power available for extraction is a consequence of the correlation between the amount of power available and the cube of the water's speed.

The lines shown in FIG. 6 would suggest that a venturi tube throat with a microscopically small diameter would be capable of producing an almost infinite amount of power. The reason why the graph in FIG. 6 suggests this nonsensical possibility is because this graph fails to account for the "choke speed" of the water that is moving through a venturi tube (explained below).

The choke speed of the water results in an optimal relative venturi throat diameter that is significantly greater than zero.

The optimal diameter of a venturi tube throat in a venturi-based wave energy device is influenced by the choke speed (i.e. the depth) of the water in which the venturi tube will operate, the height of the waves which will power the vertical oscillations of the venturi tube, and the period of those waves. This invention provides a method of optimizing the performance of a venturi-based wave energy device with respect to these factors.

5b3. Venturi Choke Speed

With respect to any given water pressure (i.e. water depth) there is a maximum speed to which the water can be accelerated by a venturi tube, or venturi effect. This maximum water speed is called the "choke speed" of the venturi tube, and the magnitude of the choke speed depends heavily upon the water's pressure (or depth). When the speed of water flowing through a venturi tube would, but fails, to exceed the tube's choke speed, that condition is called "choked flow".

FIG. 7 provides a graph illustrating the relationship of a venturi tube's choke speed to the depth of the venturi tube's throat. The algorithm used to calculate the choke speed of a venturi tube as a function of depth is not explained in this patent, but it will be familiar to anyone skilled in the art.

A venturi tube accelerates the speed of the water moving through it by converting some of the omni-directional kinetic energy (i.e. "pressure") of the water entering the tube into additional speed of the overall water flow. However, when this speeding of water flowing through a venturi tube occurs, the lateral pressure of the water, i.e. the pressure of the water normal to the axis of flow, decreases by a similar amount. In this way, energy is, as it must be, conserved. Thus, a venturi tube aligns the random motions of the water molecules entering the tube so that more and more of those water molecules move in directions parallel to the axis of the tube. So, even though the motions of individual water molecules are no more energetic when traveling through a venturi tube, the macroscopic flow of the water traveling parallel to the axis of the venturi tube, i.e. the kinetic energy of the macroscopic flow, increases greatly.

This decrease in the lateral pressure of fluids moving through a venturi tube is why these tubes are useful in creating a homogeneous dispersion of materials within a fluid. For instance, the carburetor in an automobile uses a venturi tube to facilitate the injection of fuel into an accelerated stream of air, thus creating a homogeneous mixture of air and fuel that is suitable for combustion. It is the reduced lateral pressure created in the flow of air passing through the venturi tube of a carburetor that allows the fuel to disperse so evenly.

Or, in other words, the fuel disperses so evenly in the air, as the air passes through a venturi tube, because the fuel doesn't encounter any resistance to its motion as it enters the stream of air from a direction normal to the axis of the venturi tube.

For a wave energy device, like the one comprising the preferred embodiment of this invention, and illustrated in FIG. 4, the maximum speed to which the venturi tube will be able to accelerate the water will depend largely on the depth of the venturi tube's throat.

The speed of the water flowing through the throat of a venturi tube is a multiple of the original speed of the water entering the tube. The magnitude of this multiplying factor (i.e. this "venturi factor") is invariant with respect to any particular venturi tube design, and equals the ratio of the cross-sectional areas of the mouth and the throat. For example, if the cross-sectional area of the throat is one-tenth the cross-sectional area of the mouth, then the venturi factor, by which the speed of the water entering the tube is multiplied, is equal to 10× (i.e. 1/0.1=10).

However, the speed of the water entering the mouth of the venturi tube, when multiplied by the venturi factor, cannot exceed the choke speed of the water.

At a certain point, as the speed of the water closely approaches the choke speed of the venturi tube, the pressure of the water will fall below the water's vapor pressure. At that point "cavitation" will occur. This means that the water will flash boil and create bubbles of gaseous water vapor. Care must be taken that cavitation not be allowed to cause pitting and wear on the turbine and on the walls of the venturi throat.

5b4. Optimum Determined with Respect to Choke Speed

FIG. 8 shows the relationship between the maximum amounts of power that can be made available through the application of this invention (i.e. the line labeled "optimal available power), relative to the choke speed of the water in which the venturi device will operate. The data in FIG. 8 are based on a wave height of 4 meters and a wave period of 8 seconds and the determination of an optimal relative venturi throat diameter with respect to each choke speed (i.e. the line labeled "optimal relative throat diameter").

The maximum amount of power that can be made available for extraction within the throat of a venturi device increases from a low of 50 kW/m$^2$ when the choke speed is about 13 m/s (the choke speed characteristic of the water at the surface of the ocean), to a high of 650 kW/m$^2$ when the choke speed is about 47 m/s (the choke speed characteristic of water at a depth of about 100 meters). Further increases in the maximum amount of power available for extraction in a venturi device can be achieved through further increases in the depth, and corresponding choke speed, of the water in which the venturi device operates. The maximum depth specified in FIG. 8 is an arbitrary value and does not represent an upper limit.

It is more likely that the submerged venturi devices will operate in waters characterized by choke speeds ranging from 20 to 30 m/s. With respect to this range of choke speeds, the maximum amount of power that can be made available for extraction within the throat of a venturi device will range from 120 to 265 kW/m$^2$, respectively.

A wave energy device with the same overall size, and differing only in the cross-sectional area of its throat and embedded turbine (if any), can generate substantially more power with every increase in the depth of its attached venturi device. Of course, there are practical considerations, such as weight, stress, environmental concerns, etc., that may make a relatively modest depth more desirable. Also, if a wave energy device is deployed over a continental shelf then the restricted depth of the water will limit the depth at which the venturi device can operate.

Note: The power levels discussed above, and below, when expressed in terms of kW/m² are referring to the amount of power available for extraction from each square meter of the cross-sectional area of the mouth of a venturi device. If a venturi device's mouth is larger, then proportionately more power can be extracted from a similarly designed venturi device.

5b5. Optimum Determined with Respect to Wave Height

FIG. 9 shows the relationship between the maximum amounts of power that can be made available through the application of this invention, relative to the height of the waves driving the vertical oscillations of a venturi device. The data in FIG. 9 are based on a choke speed of 25 m/s and a wave period of 8 seconds.

The maximum amount of power that can be made available for extraction within the throat of a venturi device, optimized according to the object of this invention, increases from zero, when there are no waves present to drive the submerged venturi device, to a high of almost 700 kW/m² when the venturi device is driven by waves with a height of 15 meters. Of course, waves with heights exceeding 15 meters would offer the opportunity make even higher amounts of power available for extraction. The maximum wave height specified in FIG. 9 is an arbitrary value and does not represent an upper limit.

It is more likely that waves with heights ranging from 3 to 7 meters would drive the vertical oscillations of a submerged venturi device. With respect to this range of wave heights, the maximum amount of power that can be made available for extraction within the throat of a venturi device will range from 140 to 320 kW/m², respectively.

A wave energy device with the same overall size, and differing only in the cross-sectional area of its throat and embedded turbine (if any), can generate substantially more power when driven by waves of greater height.

5b6. Optimum Determined with Respect to Wave Period

FIG. 10 shows the relationship between the maximum amounts of power that can be made available through the application of this invention, relative to the period of the waves driving the vertical oscillations of a venturi device. The data in FIG. 10 are based on a wave height of 4 meters and a choke speed of 25 m/s.

The maximum amount of power that can be made available for extraction within the throat of a venturi device, optimized according to the object of this invention, increases very rapidly when the wave period becomes less than 4 seconds—a very unlikely prospect for waves with a height of 4 meters. The maximum amount of power available for extraction when the venturi device is driven by 4 meter waves with a period of 15 seconds is about 100 kW/m².

It is more likely that a wave energy device will be driven by waves with periods ranging from 10 to 7 seconds. With respect to this range of wave periods, the maximum amount of power that can be made available for extraction within the throat of an optimized venturi device will range from 147 to 210 kW/m², respectively.

A wave energy device with the same overall size, and differing only in the cross-sectional area of its throat and embedded turbine (if any), can generate substantially more power when driven by waves of shorter periods.

5b7. Two Examples of an Optimal Venturi Throat

FIGS. 11 and 12 show the relationship between the diameters of the venturi throat (relative to the diameter of the venturi mouth) for two sets of conditions that might exemplify the operation of submerged venturi devices.

FIG. 11 shows how the amount of power which would be available within the throat of a submerged venturi device, relative to the amount of power available at the mouth of the venturi, would change as a consequence of the diameter of the venturi tube's throat (or the corresponding cross-sectional area of the venturi device's throat) when the corresponding wave energy device were driven by waves with a height of 4 meters and a period of 8 seconds, and the water were characterized by a choke speed of 25 m/s (i.e. corresponding to a depth of about 22 meters).

The relative amount of power available for extraction reaches a peak, of about 280 times the amount available at the mouth of the venturi device, (i.e. an absolute amount of 184 kW/m² in the throat compared to 0.7 kW/m² at the mouth) when the diameter of the venturi throat is about 23% (i.e. 0.23) the diameter of the venturi tube's mouth. Under these conditions, any other throat diameter, relative to the mouth diameter, will result in a sub-optimal amount of power being available.

The relative throat diameter corresponding to the optimal amount of power available for extraction is slightly less than the throat diameter at which the water's speed first begins to exceed the water's choke speed. I.e. the optimal amount of power is found at a relative throat diameter that is smaller than the diameter at which the water's choke speed begins to limit the flow of water through the venturi tube.

FIG. 12 shows how the amount of power which would be available within the throat of a submerged venturi device would change as a consequence of the diameter of the venturi tube's throat when the corresponding wave energy device were driven by waves with a height of 6 meters and a period of 7 seconds, and the water were characterized by a choke speed of 30 m/s (i.e. corresponding to a depth of about 40 meters).

The relative amount of power available for extraction (per square meter of the cross-sectional area of the mouth) reaches a peak, of about 136 times the amount available at the mouth of the venturi device, (i.e. an absolute amount of 455 kW/m² in the throat compared to 3.3 kW/m² at the mouth) when the diameter of the venturi throat is about 27.5% (i.e. 0.275) the diameter of the venturi tube's mouth. Under these conditions, any other throat diameter, relative to the mouth diameter, will result in a sub-optimal amount of power being available.

5b8. Calculate the Power for a Specific Throat Diameter

5b5a. Ambient Water Speed

For the purposes of this discussion, we will calculate the amount of power which will be available within a venturi device having arbitrary mouth and throat cross-sectional areas for waves with a constant height of 4 meters, and a constant period of 8 seconds. We will further assume a depth of about 22 meters, and a corresponding choice speed of 25 m/s. We make our calculations relative to a venturi tube with a mouth possessing a diameter of 5 meters, and a throat possessing a diameter of 1.15 meters. (This corresponds to a venturi factor of 18.9.)

As a first step in calculating the power available for extraction within the throat of our sample venturi device, consider the characteristics of the wave that drives the vertical oscillations of the buoy and its attached submerged venturi device.

Please refer to FIG. 13A. This figure illustrates the changes in the height of the water's surface, as a function of time, which characterizes the passing of a 4-meter wave.

FIG. 13B illustrates the vertical speed with which the height of the ocean changes as a 4-meter wave passes. This is the same vertical speed that will characterize the oscillations of the submerged venturi device. It will also define the speed at which water will enter the mouth of the submerged venturi device. (Note: Water will enter the upper mouth of the submerged venturi device as the wave carries the buoy, and submerged venturi device, higher. Water will then enter the lower mouth as the wave allows the buoy, and submerged venturi device, to fall.)

Note in FIG. 13B that the points of maximum vertical speed are associated with the midpoints of the wave's height. The vertical speed falls to zero at the peaks and troughs of such a wave.

5b5b. Calculate the Venturi Factor

The next step in calculating the power for a specific venturi throat diameter (or for a specific venturi throat cross-sectional area) is to determine the venturi factor for the venturi device (i.e. the degree to which the speed of the water entering the venturi device's mouth will be amplified as it passes through the venturi device's throat).

In order to calculate the venturi factor for a particular venturi device, we need to know the specific venturi tube mouth and throat diameters (or equivalent specific venturi tube mouth and throat cross-sectional areas). In this example, the relevant diameters are:

Dm=venturi tube mouth diameter, e.g. 5 m
Dt=venturi tube throat diameter, e.g. 1.15 m If the venturi device is not a radially symmetrical tube, then we can specify the cross-sectional areas of the mouth and throat directly. However, if the device is a tube (as in this example), then we can calculate the cross-sectional areas mathematically from the specified diameters:

Am=venturi tube mouth cross-sectional area
  At=venturi tube throat cross-sectional area $$Am = \Pi Dm^2/4 = 0.25\Pi(5\ m)^2$$

$$At = \Pi Dt^2/4 = 0.25\Pi(1.15\ m)^2$$

The venturi factor, "Vf" is defined as the ratio of the cross-sectional areas of the mouth and throat. For this example, the venturi factor is calculated as follows:

$$Vf = Am/At = 0.25\Pi(5\ m)^2/0.25\Pi(1.15\ m)^2 = 18.9$$

5b8c. Speed Through the Venturi Throat

FIG. 13C illustrates the speed profile (i.e. "amplified speed") that would result from a simple multiplying of the speed of the water entering the venturi device by the venturi factor. In other words, FIG. 13C illustrates the result of amplifying, by the venturi factor, the "vertical speed of the wave surface", i.e. the speed of the water entering the mouth of the venturi device. This amplified speed profile is a simple amplification of the speed profile of the water entering the venturi device.

However, the actual speed of the water passing through the throat of the venturi device is limited by the choke speed of the water, i.e. 25 m/s in the case of this sample calculation. In FIG. 13C, the line entitled "choked amplified speed" illustrates what the profile of the speed of the water flowing through the throat of the venturi device would actually look like. Note that the speed does not exceed the choke speed.

5b8d. Power Available for Extraction Within the Venturi Throat

At any particular time on the x-axis of the graph in FIG. 13C, the speed of the water flowing through the throat of the venturi device can be determined. That speed is then used as input to the following equation to determine the power available for extraction at that particular moment:

Vn=speed of the water flowing through venturi throat at time=n seconds
Pn=power available for extraction in the venturi throat at time=n seconds
Pn (Watts)=0.5 ρ At Vn³
ρ (seawater)=1025 kg/m³
At=0.25 Π(1.15 m)²=1.04 m²
V₂=25 m/s (determined through an examination of FIG. 13C)

Therefore, at the 2-second mark of the graph in FIG. 13C, where the speed of the water flowing through the venturi throat is limited to the choke speed of 25 m/s, the power available for extraction by a turbine with a cross-sectional area equal to the cross-sectional area of the venturi throat will be:

$$P_2 = 0.5\ (1025\ kg/m^3)\ (1.04\ m^2)\ (25\ m/s)^3$$

$$= 8,328,125\ W$$

$$= 8.33\ MW$$

At the 2-second mark, FIG. 13D indicates that the power available for extraction from the water flowing through the venturi throat (assuming a venturi factor of 18.9, as in this example) will be 424 kW/m² (i.e. 424 kW per square meter of the mouth area of the venturi device). We can verify the agreement of our calculated result with the value indicated in FIG. 13D:

$$P_2[chart] = (424\ kW/m^2)\ Am$$

$$= (424\ kW/m^2)\ (0.25\Pi(5\ m)^2)$$

$$= 8.33\ MW$$

5b8e. Average Power

After calculating the instantaneous power available for extraction with respect to a multitude of evenly spaced moments during the period of the wave driving the wave energy device, the average power can be calculated.

The average amount of power associated with the power curve displayed in FIG. 13D is 234 kW/m². When multiplied by the cross-sectional area of the mouth of the venturi device considered in our example (i.e. by "Am") this average power level equals 4.6 MW.

5b9. Calculate the Optimal Throat Diameter

The calculations illustrated above, for determining the power available for extraction with respect to a specific venturi throat diameter (or cross-sectional area) can be repeated for every throat diameter under consideration, typically ranging from the diameter of the venturi mouth down to 0 (exclusive of 0 of course).

FIG. 14 shows a graph created by evaluating the power available for extraction with respect to every possible relative throat diameter within the range of 1.0 (i.e. a throat with the same diameter as the mouth) down to 0.0, exclusive (i.e. we don't actually evaluate a relative throat diameter of zero since this would preclude the flow of any water). Repeating the calculation demonstrated above with respect to each possible relative throat diameter creates the graph in FIG. 14. However, in FIG. 14 we used a mouth diameter of 1.0, and the corresponding throat diameters are expressed relative to that unity mouth diameter.

We use relative throat diameters in FIG. 14 instead of actual diameters since this is a more general illustration of the process. We could transform the graph in FIG. 14, in to an equivalent graph of the venturi tube discussed in the example above simply by changing the scale of the horizontal axis from its current 1.0-to-0.0, to an equivalent 5 m-to-0.0. We would then adjust the vertical scale of each line in the graph to correspond to the values that would be obtained from a venturi device with a mouth diameter of 5 meters, instead of the 1-meter mouth diameter used in FIG. 14. We could do this by multiplying the range of values along the vertical scale in FIG. 14 by Am (as defined above).

The optimal relative throat diameter in FIG. 14 is found at 0.23, whereas the optimal specific (i.e. "non-relative") throat diameter that would be obtained for the venturi device specified in our example above would be found at:

Optimal throat diameter (i.e. optimal
$Dt$)=0.23*$Dm$=0.23*5 m=1.15 m

5c. Optimization of Venturi Effect for a Variety of Waves

Locations where wave energy devices might be deployed are not generally characterized by waves of constant height and period. Any body of water that is perturbed by wind blowing across its surface will be populated by waves of varying heights and periods. Therefore, any effort to optimize the cross-sectional area of the throat of a wave energy device's venturi tube will be improved by a consideration of what impact the final design will have on the performance of the device with respect to the full complement of the various wave types which will drive it.

FIG. 15 shows a sample venturi-throat optimization with respect to four different wave types. The four lines in FIG. 15 correspond to waves of height: 2,4, 6 and 8 meters; and periods of: 7, 8, 9 and 10 seconds, respectively. Note that the optimal relative diameter (or corresponding relative cross-sectional area) for the throat of a venturi device will be different with respect to each of the four types of waves.

There are many ways to achieve a comprehensive optimization of the cross-sectional area of the throat of a venturi device. We will discuss two of these ways below, with respect to the four sample wave types specified in FIG. 15.

5c1. Optimize Total Annual Energy Production

If you can determine the relative contribution of each wave type to the full spectrum of wave types that will characterize a particular deployment site (likely with respect to an annual survey), then you can calculate, in the manner illustrated in FIG. 15, the optimal venturi throat diameter appropriate to each one. Then, by summing weighted contributions of the available power associated with each of the particular wave types evaluated, you can determine what the average available power would be, over the time span represented by the survey, with respect to each venturi throat diameter evaluated, for a device deployed at such a site. In this manner, you can deploy a venturi device that possesses a venturi throat diameter that will result in an optimal total annual amount of power.

FIG. 16 shows two lines created through the summation of weighted contributions from the four individual wave-type lines illustrated in FIG. 15. The two lines in FIG. 16 correspond to two different weighted summations of the four lines of FIG. 15. One line in FIG. 16 corresponds to a representative "calm ocean" scenario in which the total wave complement contains contributions of 60% from 2-meter waves; 30% from 4-meter waves; 8% from 6-meter waves; and 2% from 8-meter waves. The other line in FIG. 16 corresponds to a representative "active ocean" scenario in which the total wave complement contains contributions of 10% from 2-meter waves; 20% from 4-meter waves; 60% from 6-meter waves; and 10% from 8-meter waves.

FIG. 16 shows that with respect to the calm ocean wave profile the optimal venturi throat diameter will be 0.185 (relative to the venturi mouth diameter). And, with respect to the active ocean wave profile the optimal relative venturi throat diameter will be 0.25.

If a deployment site were to be characterized by 7 months of relatively calm oceans, as illustrated in the first line of FIG. 16 (e.g. perhaps during the late spring, summer and early fall); and by 5 months of relatively active oceans, as illustrated in the second line of FIG. 16, (e.g. perhaps during the winter); then the optimal relative venturi throat diameter, as illustrated in FIG. 17, would be 0.23.

5c2. Optimize for Greatest Minimum Energy Production

If one desires to ensure that the contribution of electrical power from a farm of venturi-based wave energy devices is always at, or above, a predictable minimum level during any desired period of time, e.g. during a typical year, with respect to particular intervals within that period of time, e.g. with respect to every day, month, etc. during a typical year, then one can do the following:

1. Calculate the amount of power available with respect to every throat diameter under consideration, with respect to the wave complement characteristic of every interval during the specified period of time (e.g. every month of a typical year).
2. Identify (e.g. plot) the minimum amount of power associated with each of the specific intervals (e.g. each typical month) with respect to each throat diameter.
3. And, identify the maximum power level in this set of throat-diameter-specific minimum power levels. The throat diameter associated with this peak minimum power level will keep the overall power level of the farm of devices at, or above, the greatest possible level over the desired period of time.

For example, with respect to the two wave scenarios evaluated in FIG. 16, the optimal amount of power available during a "calm ocean" is lower than the amount available during an "active ocean", therefore, the optimal minimum relative venturi throat diameter needed to ensure the greatest possible minimum level of power available within an optimized wave energy device would be 0.185. This constitutes the relative throat diameter which ensures that the amount of energy available within each wave energy device during the periods of relatively "calm" (and relatively "feeble") oceans is maximized.

5c3. Greater Actual Complexity

Of course, the actual determination of an optimal venturi throat diameter (or equivalent cross-sectional area) will be more complicated than suggested by the examples provided above. An actual determination of the optimal diameter will likely involve a consideration of a broad range, and high-resolution differentiation, of wave heights and periods. An optimization of a venturi device's relative throat diameter would likely best be accomplished through the evaluation of one or more annual tabulations of high-resolution wave data characteristics observed at a prospective deployment site.

5d. Iterative Optimization

The methods of optimization described above are limited in many respects:

First of all, surveys of past wave characteristics may not be completely accurate. Such surveys sometimes represent hourly, or even daily, peak (i.e. most typical) wave heights and periods. In any case, it would likely not be practical to log the height and period of every single wave encountered at a site for an entire year. For this reason, the available historical wave data will almost always represent an imperfect estimation of the actual conditions.

Furthermore, even if a perfectly accurate high-resolution record could be obtained for a potential deployment site, it would always represent an historical record of wave conditions. Such an historical record would likely not provide a perfectly accurate prediction of future wave conditions.

Also, when multiple waves pass a point on the surface of the ocean in close proximity to one another they "interfere" with one another. In other words, a composite wave appears to pass such a point instead of multiple individual waves. This composite wave will be composed of contributions from each of the individual discrete waves involved, and it will likely lack a perfectly sinusoidal wave shape. The optimization methods discussed earlier were based on an assumption of purely sinusoidal waves.

In addition, the drag that a submerged venturi device will impose on the vertical movements of the associated wave energy device would be expected to change, perhaps abruptly, when the water flowing through the venturi throat would, if it were able to do so, exceed the choke speed of the ambient water. When the speed of the water entering the venturi device, after amplification by the venturi's characteristic venturi factor, would exceed the water's choke speed, then some of the water which would otherwise enter the venturi device and flow through it, must instead be pushed out of the way by the rising or falling venturi device. At such moments the drag imposed by the venturi device will increase and the venturi device will begin to act like a parachute or sea anchor.

Such a pattern of irregular or non-uniform drag will tend to alter the rate, phase and amplitude of a wave energy device's rising and falling—causing it to deviate from a purely sinusoidal pattern. The resulting irregular rate of vertical ascent and descent, as well as the reduced amplitude of the device's vertical motions, will violate the assumptions on which the prior discussions regarding the optimization of the venturi throat's diameter were based.

For all of these reasons, and others, the following would likely constitute a better optimization protocol:
1. Create an initial optimization of the relative venturi throat diameter by a method similar to the ones discussed above. (If the relationship between the drag of a wave energy device's venturi and its speed can be determined through simulation, or field trials, then this dynamic contribution to the vertical speed of the device's venturi can be factored in to the optimization methods discussed earlier.)
2. Deploy an initial device, perhaps a small prototype, optimized by the method in step 1 above, at the selected site.
3. Monitor the actual speeds with which water enters the venturi device (from either mouth) for a period of time (probably for one year). This would likely best be accomplished by populating a high-resolution array of water speeds with the average water speeds encountered during fractional periods of time of a constant duration (e.g. the average water speed detected during every millisecond). If the goal of optimization is to maximize the minimum energy available during any block of time of a particular duration, e.g. during any particular 24-hour period, then separate arrays could be utilized for every such block of time, e.g. for every 24-hour period, in order to allow for the optimization of the minimum power output.
4. a) To optimize for greatest annual total power output, calculate the optimal venturi throat diameter on the basis of this high-resolution array of water speeds in a manner similar to the ones already discussed above.
   b) To optimize with respect to maximizing the minimum energy which will be made available during any block of time of a specified duration, calculate the optimal venturi throat diameter with respect to the speed-readings gathered with respect to every such block of time, and use the throat diameter associated with the greatest minimum power-level threshold over all of the evaluated blocks of time.

An optimized throat diameter identified in this manner, if it differs from the throat diameter of the monitored device, will cause the device to encounter choke speeds at different times, and for different durations, than the monitored device when exposed to identical wave conditions (unless choke speeds are encountered by neither the monitored nor the optimized device). Therefore, although a single iteration of this procedure will likely result in a sufficiently optimized result, it may be desirable to iterate this procedure multiple times, applying the optimized throat diameter identified at the conclusion of each iteration to the device to be monitored during each subsequent iteration.

5e. Avoiding, or Reducing, Cavitation

When the water flowing through a venturi device is accelerated to a point at which it reaches, and would, if possible, exceed, the choke speed of the water, then cavitation will occur. (It will actually occur at the point at which the lateral pressure remaining in the water drops below the vapor pressure of the water. And, the vapor pressure of the water is dependent on the temperature of the water. Cavitation usually occurs at a speed equal to, or only slightly greater than, the actual choke speed.)

The relative venturi throat diameter (or equivalent relative cross-sectional area) at which the optimal amount of power is made available for extraction with respect to waves of a particular height and period, is often only slightly more narrow (i.e. associated with only a slightly greater venturi factor) than the diameter at which the water first begins to reach, or exceed, its choke speed. It may be desirable in some circumstances, especially in cases where the materials and/or design of a venturi device would render it especially susceptible to damage from cavitation, to select a venturi throat diameter which, with respect to a given pattern of wave heights and periods, is slightly sub-optimal with respect to the amount of power generated, but which nonetheless minimizes the likelihood that cavitation will occur.

Cavitation can sometimes (depending on the design and materials used) cause pitting, and in other ways damage, the components of a submerged turbine, and the walls of the venturi device, especially when such cavitation occurs in close proximity to those components.

5f. Avoiding Ice Deposits

When the water flowing through a venturi device is accelerated, both its pressure and its temperature drop. If the temperature of the water drops to, or below, the freezing point of that water then icing can occur. If this problem is anticipated, or observed, then it may be desirable to reduce the venturi factor by utilizing venturi devices possessing relatively larger throat cross-sectional areas than would be considered optimal solely in relation to the power output of those devices.

5g. Comparison of Preferred Embodiment with Similarly Sized Fleck Device

The optimized embodiments of venturi-based wave energy devices proposed here, will generate significantly more power than similarly sized Heck venturi-based wave energy devices. Below we compare a Heck wave energy device with a similarly sized device that has been optimized according to the method of this patent.

Let us assume the following conditions:
Wave height=4 meters
Wave period=8 seconds
Choke speed=25 m/s
Venturi mouth diameter=7 meters
Turbine efficiency=0.5

The diameter of the venturi throat of a Heck device, relative to the venturi mouth diameter, is 0.862 (as explained earlier).

The diameter of the venturi throat, relative to the venturi mouth diameter, when optimized according to the method of this patent, relative to a wave height of 4 meters, a wave period of 8 seconds and a choke speed of 25 m/s is 0.23 (see FIG. 14).

Therefore:
Diameter of venturi throat:
For Heck device=0.862*7 meters=6.0 meters
For optimized device=0.23*7 meters=1.6 meters
For "No venturi"=1.0*7 meters=7.0 meters
Cross-sectional area of venturi throat:
For Heck device=$\Pi$*(6.0 m)$^2$/4=28.3 m$^2$
For optimized device=$\Pi$*(1.6 m)$^2$/4=2.01 m$^2$
Cross-sectional area of venturi mouth:
For all devices=$\Pi$*(7 m)$^2$/4=38.5 m$^2$
Venturi factor for device:
For Heck device=38.5 m$^2$/28.3 m$^2$=1.36
For optimized device=38.5 m$^2$/2.01 m$^2$=19.2
For no venturi, i.e. just an open turbine=1.0
As defined earlier, power available for extraction=0.5 A v$^3$ Average available power for each device, with respect to water entering the mouth of the device with a speed profile as defined in FIG. 13B, and remembering the equation above:
For Heck device=60 kW
For optimized device=9,000 kW=9.0 MW
For no venturi=32.3 kW
As defined earlier, power actually extracted=0.5 k A v$^3$ For the Heck device, the optimized device, and for an open turbine lacking a venturi device, the average extracted power equals k, or, in this example 0.5, times the average available power.

While the Heck venturi device increases the amount of power extracted by the device's turbine by less than 2×, a properly optimized venturi device (the object of this invention) increases the amount of power extracted by the device's turbine by 280×.

An optimized venturi-based wave energy device can generate 4,500 kW of electrical power while a similarly sized Heck device, driven by the same waves, can only generate 30 kW. Or, in other words, a Heck device can only generate 0.7% as much power as an optimized device when driven by waves of the type specified in this example.

FIG. 18 shows a table summarizing this comparison of the Heck and optimized wave energy devices.

FIG. 19 shows the differences in the amounts of power available for extraction within a Heck wave energy device, and a similarly sized optimized device. The optimized device provides significantly more power with respect to all wave heights. (For the sake of scale, only power levels corresponding to wave heights greater than, or equal to, 0.1 meter are shown in FIG. 19.) Though not shown in FIG. 19, the optimized device provides 2.4×109% more power at a wave height of 0.01 meter; 61,500% more at a wave height of 2 meters; 15,400% more at a wave height of 4 meters; and so on.

6. Alternate Embodiments
6a. All Optimal Submerged Venturi Devices

The scope of this invention is intended to cover all wave energy devices employing submerged venturi devices which incorporate a venturi effect which approaches, to any non-trivial extent, an optimal level with respect to its real or anticipated pattern of movement in relation to its surrounding water; or, equivalently, all submerged venturi devices which incorporate a venturi effect which approaches, to any non-trivial extent, an optimal level with respect to the pattern with which water moves through the venturi device.

The difference between what is trivial and what is non-trivial with respect to a venturi effect is necessarily subjective. However, a venturi factor of 2× appears to establish a reasonable threshold. Therefore, the scope of this patent is intended to include ant submerged venturi device that amplifies the speed of the water entering it by a factor that equals, or exceeds, 2×. Or, in other words, the scope of this patent is intended to include all submerged venturi devices which double, or more than double, the speed of the water that enters the device.

With respect to this definition, the wave energy device proposed by Heck would be regarded as incorporating a venturi effect of trivial extent, and Heck's device would therefore not infringe on this patent.

6b. All Types of Venturi Devices

The scope of this invention is intended to cover wave energy devices employing all types of submerged venturi devices when they are optimized to any non-trivial extent. A venturi tube is the most obvious type of venturi device. However, the scope of this invention also applies with equal force to non-trivially optimized venturi devices of other designs. For instance, the scope of this patent would apply to the venturi device embodiments illustrated in FIGS. 20 through 24, if they were optimized to a non-trivial extent with respect to the degree to which they amplify the speed of the water that enters their mouths.

6c. All Manner of Flotation Devices

The scope of this invention is intended to cover all wave energy devices employing submerged venturi devices that are moved partially, or entirely, by means of a loosely or rigidly attached flotation device. These flotation devices include buoys, boats, ships, and other objects or devices which remain near, at, or above the surface of the water by means of their natural buoyancy, or by active means involving the expenditure of energy, or by any other means.

6d. All Manner of Power Extraction

The scope of this invention is intended to cover wave energy devices employing venturi devices used in association with all manner of power extraction devices and designs. For instance, the embodiments discussed at length in this patent involve venturi devices in which turbines are located in the throats of the venturi devices. The turbines are driven by water flowing through the venturi devices. However, because they are positioned in the venturi throats, the turbines are driven by the water at the point of its greatest speed, and therefore at the point at which the water's kinetic energy, and associated extractable power, are at their greatest.

While it would seem obvious that an optimal venturi design would place a turbine, or other power extraction component, in the narrowest portion of the venturi device (i.e. in the venturi throat), it is conceivable that the power extraction could be accomplished at a location between the throat and one or both mouths of a venturi device. The scope of this patent is intended to cover all of these types of embodiments as well.

The scope of this invention is intended to cover not only wave energy devices employing venturi devices that incorporate a turbine in the venturi, but also those that utilize any, and all, other means of utilizing the accelerated waters flowing through a venturi device to extract power.

One such alternate method of extracting power from the water flowing through a submerged venturi device is by means of exploiting the reduced, or absent, lateral pressure in the water whose speed is amplified by the venturi device. The scope of this invention is intended to apply with equal force to wave energy devices that exploit the "suction" created by the water speeding through a submerged venturi device, FIG. 23 illustrates one possible embodiment of this type of venturi device power extraction scheme. The inlet of an air turbine is connected to the atmosphere above the surface of the ocean. The exhaust from the air turbine, i.e. the port through which air is evacuated from the turbine, is connected to tubes that extend below the surface of the ocean and into the venturi device. Holes positioned about the throat of the venturi tube allow air from the connected tubes to be drawn from the tubes and into the water flowing through the venturi throat.

As water flows through, and accelerates through, the venturi device, air is drawn out of the pipes connected to the venturi throat's suction ports. The suction induced in the pipes is communicated to the air turbine. And air is subsequently drawn out of one port in the turbine, and flows in from the other port. The flow of air through the turbine powers the turbine. And the turbine's rotations can be used to drive a generator or alternator.

This "air sucking" embodiment offers the advantage of allowing the turbine to be located in, or near, the buoy at the surface, thus facilitating maintenance. It is likely that one-way valves would be required in the air suction pipes to prevent the back flow of water in to the pipes during the cyclic pauses in the suction which would be associated with the peaks and troughs of the waves driving the submerged venturi's motion.

Other embodiments of such suction-based power extraction schemes are possible, and these other embodiments would also be covered by the scope of this patent.

Another alternate method of extracting power from the water flowing through a submerged venturi device is by a means similar to the suction-based method described above. Instead of using the reduced, or absent, lateral pressure of the water in the venturi throat to draw air through an air turbine, in this embodiment, the reduced, or absent, lateral pressure of the water in the venturi throat is used to draw water through an external water turbine. FIG. 24 illustrates one possible embodiment of this type of venturi device power extraction scheme. As with the air sucking embodiment, this "water sucking" embodiment also offers the advantage of allowing the turbine to be located in, or near, the buoy at the surface. This would be expected to facilitate any repair or maintenance activities.

Furthermore, during those recurring moments when the vertical motion of the buoy, and its attached submerged venturi device, pause between crests and troughs, the water in the suction tubes will be ready to be immediately drawn out again once the vertical motion, and the associated suction, resume. With an air-based suction system like the one described above, water would tend to flow up from the venturi throat in to the suction tubes during those moments when the suction pauses. With an air-based suction system it would likely be desirable to employ one-way valves, or some other mechanism, to prevent water from flowing in to the suction tubes when the partial, or full vacuum, drawing the air out of the tubes was lost. If water were allowed to flow in to the suction tubes between vertical movements, then some residual suction would be lost, and power would be wasted. A water-based suction power extraction method would not necessarily require such one-way valves. Also, because water is largely incompressible, a water-based suction scheme would likely have a higher efficiency than an air-based scheme.

The scope of this patent is intended to apply with equal force to wave energy devices that utilize any kind of power extraction and generation scheme, and regardless of whether or not power extraction occurs within, or outside, the throat of the venturi tube. In particular, the scope of this invention is intended to apply to wave energy devices utilizing generators, alternators, or any other means of converting mechanical energy into electrical energy. The scope of this invention is also intended to apply to wave energy devices utilizing any other means of converting the energy obtained from the ocean by such devices in to any other form of useful energy, e.g. converting such energy in to useful forms of chemical energy. The scope of this invention is also intended to apply to wave energy devices utilizing the energy made available within, or outside, the throat of an optimized venturi device to accomplish any useful function, e.g. to desalinate seawater, to extract minerals from the ocean, to capture and sequester carbon in the ocean or the atmosphere, etc.

6e. All Manner of Venturi Movement

The scope of this invention is intended to cover wave energy devices employing venturi devices that are moved vertically, or horizontally, in response to wave motion near the surface of the ocean. However, it is also intended to cover those energy devices, which operate on the ocean, or on other large bodies of water, and which employ venturi devices that are lifted partially, substantially, or entirely, by other means. For instance, the scope of this patent is intended to apply to those wave energy devices that move their attached submerged venturi devices entirely by means of the wave-induced motions of their attached flotation devices. It is also intended to apply to those wave energy devices that supplement the movement of their attached venturi devices by means of mechanical devices, hydraulic devices, winches, compressed air, etc. There may be some advantage to be gained by using such active means to partially, or fully, move a submerged venturi device relative to the supporting flotation device. For instance, it may be desirable to use such secondary lifting means to partially oppose the natural vertical motion of the waves. The purpose of this artificial counter motion might be to change a primarily sinusoidally varying vertical motion into a more linear motion. This could allow the venturi device to utilize a greater venturi factor, and to enjoy waters traveling at the maximum rated venturi throat speed for longer periods of time, while perhaps also avoiding the increases in drag and turbulence which would be associated with non-linear water speeds which would not just reach, but would, if possible, exceed the choke speed of the device, thus further maximizing the extraction of power from such wave-induced vertical motion. The purpose of such active movements of a submerged venturi device might also be to increase the amplitude of the submerged venturi device over that which would be provided naturally by the driving waves.

Figures 25A, 25B:
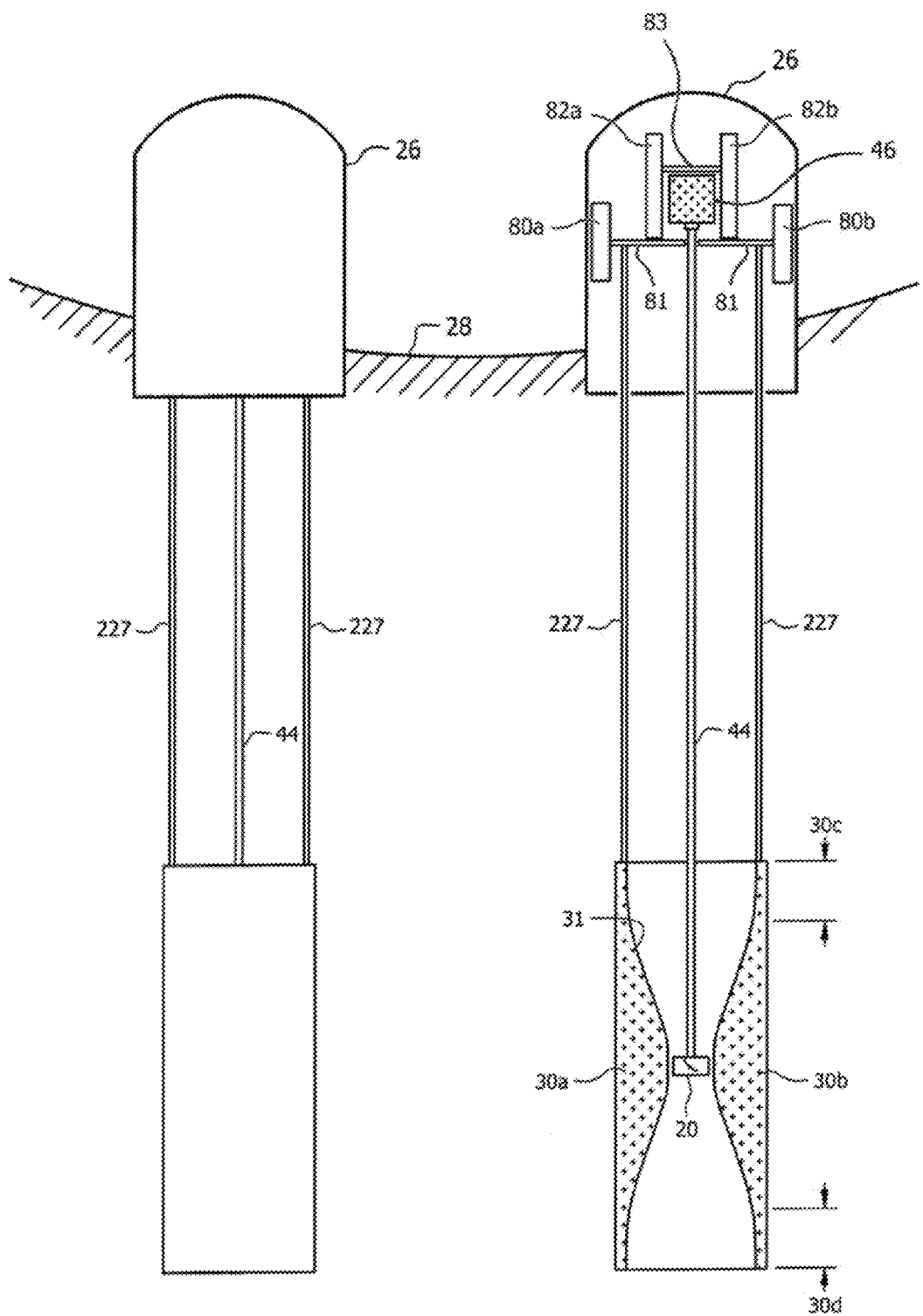
FIGS. 25A and 25B illustrate an alternative embodiment in which lifting means is incorporated into the buoy to modify the position of the venturi and or the generator.

FIGS. 25A and 25B illustrate another embodiment of this invention. This embodiment incorporates two optional features either of which, or both of which, may be incorporated in an embodiment of this invention.

In the embodiment illustrated in FIGS. 25A and 25B, the struts 227, or cables, which at one end are attached not directly to the buoy 26, but instead to a platform 81. The platform 81 is then attached to one or more lifting means 80a and 80b. These lifting means, are then attached to the buoy 26. Thus, the lifting means are able to modify the degree to which the buoy and venturi tube are vertically separated. These lifting means can be used to modify the vertical separation, and the vertical motion of the submerged venturi tube so that its motion is no longer precisely synchronized with that of the waves passing beneath the buoy.

In the absence of this lifting means, the vertical speed of the submerged venturi tube, and the speed with which water enters the mouth(s) of the venturi tube, moves between maxima and minima in a sinusoidal fashion. This means that the optimization of the venturi tube's design by the method of this invention, must try to find an optimal balance between these extremes of ambient water speed.

Through the incorporation and use of this lifting means, the vertical motion of the submerged venturi tube is partially decoupled, by means of active lifting (or dropping) of the venturi tube with respect to the buoy. Thus, the sinusoidal motion of the waves which drive the motion of the buoy can be used to generate a less extreme vertical movement of the attached venturi tube. Thus, the method of optimization described in this invention can be applied to a "flatter" and more constant pattern of water movement and speed. This will make it possible to incorporate a relatively narrower venturi throat, and to generate greater amounts of power, with respect to any particular wave pattern. Of course, it will also add complexity and cost to this wave energy device, and would likely increase the amount of maintenance required.

FIG. 25B also illustrates another optional feature of this invention. In this embodiment, the generator 46 is attached, not directly to the buoy as in the preferred embodiment, but to a platform 83. This platform 83 is attached to one or more lifting means 82a and 82b. These lifting means are then attached directly to the buoy (not illustrated), or, as illustrated in FIG. 25B, to the platform 81 of the venturi tube lifting assembly. Thus, it becomes possible to move the position of the generator, and its attached shaft or cable, and the attached turbine, with respect to the venturi tube. This generator-lifting assembly makes it possible to move the turbine in to, and out of, the throat of the venturi tube to a certain extent.

Moving the turbine out of the throat of the venturi tube can be used to accomplish a number of desirable objectives. For instance, when the water in the narrowest portion of the throat of the venturi tube is manifesting, or about to manifest, cavitation, then moving the turbine to a position in the venturi tube in which the water's speed is slower, and cavitation is absent, can help to prevent damage to the turbine, It would also be possible to create a more constant rate of angular motion in the turbine, shaft and generator, by incrementally moving the turbine away from the throat as the speed of the water in the throat is accelerating, and toward the throat as the speed of the water is decelerating, it will be possible to expose the turbine to a more constant rate of water flow. This would in turn cause the attached generator to be driven with a more uniform rate of turning.

Either the venturi tube lifting means, or the generator lifting means, or both, can be incorporated in to an embodiment of this invention to achieve desirable effects.

What is claimed is:

1. A wave energy apparatus, comprising:
a venturi shroud which when the apparatus is in an operative position in a body of water is positioned in the body of water a distance below a surface of the water;
the venturi shroud being positionable in an open position and an alternative closed position;
the venturi shroud when in the open position forming a venturi channel having a top mouth and a bottom constricted region; and
a turbine attached to the venturi shroud and positioned so as to be powered, when the apparatus is in the operative position, by water accelerated by the venturi channel as the venturi shroud moves due to wave action in the body of water.

2. The apparatus of claim 1 wherein with the apparatus in the operative position, the venturi shroud is moved to the open position as the venturi shroud is moved upwardly by wave action and the venturi shroud is moved to the closed position as the venturi shroud is moved downwardly by wave action.

3. The apparatus of claim 1 wherein the venturi shroud includes a bottom cylindrical portion that forms at least a portion of the constricted region and in which the turbine is disposed.

4. The apparatus of claim 1 wherein the venturi shroud has a top frusto-conical portion and is free of any bottom frusto-conical portion.

5. The apparatus of claim 1 further comprising a flexible connection from which the venturi shroud hangs when the apparatus is in the operative position.

6. The apparatus of claim 1 wherein the venturi shroud includes pivotal ribs and flexible material connected to the ribs to define the open position.

7. The apparatus of claim 6 wherein the venturi shroud includes a cylindrical portion to which the ribs are pivotally attached and which forms at least a portion of the constricted region.

8. A wave energy apparatus, comprising:
a venturi shroud which when the apparatus is in an operative position in a body of water is positioned in the body of water a distance below a surface of the water;
the venturi shroud being configured to form a venturi channel having a top mouth and a bottom constricted region;
a turbine attached to the venturi shroud and positioned so as to be powered by water accelerated by the venturi channel as the venturi shroud moves due to wave action in the body of water when the apparatus is in the operative position;
a flexible connection from which the venturi shroud hangs when the apparatus is in the operative position; and
the venturi shroud having a top frusto-conical portion and being free of any bottom frusto-conical portion.

9. The apparatus of claim 8 further comprising a buoy, the flexible connection connecting the venturi shroud to the buoy.

10. The apparatus of claim 8 wherein the venturi shroud has a lower cylindrical portion attached to a bottom of the top frusto-conical portion, and the top frusto-conical portion is longer than the cylindrical portion.

11. The apparatus of claim 8 further comprising a generator powered by the turbine, and the flexible connection including an electrical cord from the generator.

12. The apparatus of claim 11 wherein the generator is disposed in the venturi channel.

13. The apparatus of claim 11 wherein the generator is disposed entirely within the venturi shroud.

14. A wave energy apparatus, comprising:
a venturi shroud which when the apparatus is in an operative position in a body of water is positioned in the body of water a distance below a surface of the body of water:
the venturi shroud being configured to form a venturi channel having a top mouth and a bottom constricted region;
a turbine attached to the venturi shroud and positioned so as to be powered by water accelerated by the venturi channel as the venturi shroud rises due to wave action in the body of water when the apparatus is in the operative position;
the venturi shroud having an upper frusto-conical portion that includes the top mouth and a lower cylindrical portion that is defined by the bottom constricted region;
the venturi shroud being free of any bottom frusto-conical portion below the lower cylindrical portion; and
a flexible connection from which the venturi shroud hangs when the apparatus is in the operative position.

15. The apparatus of claim 14 wherein the flexible connection includes an electrical cable.

16. The apparatus of claim 14 wherein the venturi shroud is flexible and collapsible.

17. The apparatus of claim 14 wherein the venturl shroud is rigid and non-collapsible.

18. The apparatus of claim 14 further comprising a rigid central portion to which the venturi shroud is attached, and a generator powered by the turbine and attached to the rigid central portion.

19. The apparatus of claim 14 wherein the venturi shroud is positionable in an open position and an alternative closed position due to the wave action.

20. The apparatus of claim 19 further comprising an elongate storage canister in which the venturi shroud is positionable when in the closed position but not in the open position.

21. A wave energy apparatus, comprising:
a venturi shroud which when the apparatus is in an operative position in a body of water is positioned in the body of water a distance below a surface of the body of water;
the venturi shroud being configured to form a venturi channel having a top mouth and a bottom constricted region;
a turbine attached to the venturi shroud and positioned so as to be powered by water accelerated by the venturi channel as the venturi shroud rises due to wave action in the body of water when the apparatus is in the operative position;
the bottom constricted region being formed by a collar having a lower free end and a constant cross-sectional area;
the top mouth being an uppermost water passageway of the venturi channel and the collar being a bottommost water passageway of the venturi channel; and
a flexible connection from which the venturi shroud hangs when the apparatus is in the operative position.

22. The apparatus of claim 21 wherein the collar is a cylindrical collar.

23. The apparatus of claim 21 wherein the turbine is positioned in the collar.

24. The apparatus of claim 21 wherein the venturi shroud is flexible and collapsible.

25. The apparatus of claim 21 wherein the venturi shroud is rigid and non-collapsible.

26. The apparatus of claim 21 wherein the venturi shroud is positionable in an open position and an alternative closed position due to the wave action.

27. The apparatus of claim 26 further comprising an elongate storage canister in which the venturi shroud is positionable when in the closed position but not in the open position.

28. The apparatus of claim 21 further comprising a rigid central portion to which the venturi shroud is attached, and a generator powered by the turbine and attached to the rigid central portion.

29. The apparatus of claim 28 wherein the generator includes an electrical cord, and the flexible connection includes the electrical cord.

30. A wave energy apparatus, comprising:
a venturi shroud which when the apparatus is in an operative position in a body of water is positioned in the body of water a distance below a surface of the water:
the venturi shroud being configured to form a venturi channel having a top mouth and a bottom constricted region;
a turbine attached to the venturi shroud and positioned so as to be powered by water accelerated by the venturi channel as the venturi shroud moves due to wave action in the body of water when the apparatus is in the operative position;
a flexible connection from which the venturi shroud hangs when the apparatus is in the operative position;
the venturi shroud narrowing from the top mouth to a bottom of the venturi shroud;
the venturi shroud being positionable in an open position and an alternative closed position; and
the venturi shroud when in the open position forming the venturi channel having the top mouth and the bottom constricted region.

31. The apparatus of claim 30 wherein the top mouth is the uppermost water passageway of the venturi channel and the bottom constricted region is the bottommost water passageway of the venturi channel.

32. The apparatus of claim 30 wherein the bottom constricted region is formed by a collar having a lower free end.

33. The apparatus of claim 30 wherein the flexible connection includes an electrical cable.

34. The apparatus of claim 30 further comprising a buoy, the flexible connection connecting the venturi shroud to the buoy.

35. The apparatus of claim 30 wherein the turbine is powered by accelerated water when the venturi shroud is in the open position.

36. The apparatus of claim 30 wherein with the apparatus in the operative position, the venturi shroud is moved to the open position as the venturi shroud is moved upwardly by the wave action and the venturi shroud is moved to the closed position as the venturi shroud is moved downwardly by the wave action.

37. The apparatus of claim 30 wherein the venturi shroud includes a bottom cylindrical portion that forms at least a portion of the constricted region and in which the turbine is disposed.

38. The apparatus of claim 30 wherein the venturi shroud has an upper frusto-conical portion and is free of any bottom frusto-conical portion below the bottom constricted region.

39. The apparatus of claim 30 further comprising a buoy, and the flexible connection connecting the venturi shroud to the buoy.

40. The apparatus of claim 30 further comprising a generator powered by the turbine, and the flexible connection including an electrical cord from the generator.

41. The apparatus of claim 30 further comprising a rigid central support attached to the venturi shroud to provide orientation stability thereto.

42. The apparatus of claim 30 wherein the venturi shroud when in the closed position and not in the operative position is configured to fit in an elongate storage canister.

43. The apparatus of claim 30 further comprising an elongate storage canister in which the venturi shroud is positionable when in the closed position but not in the open position.

44. The apparatus of claim 30 wherein the venturi shroud includes pivotal ribs and flexible material connected to the ribs to define the open position.

45. The apparatus of claim 44 wherein the venturi shroud includes a cylindrical portion to which the ribs are pivotally attached and which forms at least a portion of the constricted region.

46. The apparatus of claim 30 further comprising a generator powered by the turbine, and the flexible connection including an electrical cord from the generator.

47. The apparatus of claim 46 wherein the generator is disposed in the venturi channel.

48. The apparatus of claim 46 wherein the generator is disposed entirely within the venturi shroud.

49. The apparatus of claim 30 wherein the venturi shroud has an upper frusto-conical portion that includes the top mouth and a lower cylindrical portion that is defined by the bottom constricted region.

50. The apparatus of claim 49 wherein the upper frusto-conical portion is longer than the lower cylindrical portion.

51. The apparatus of claim 49 wherein the turbine is disposed in the lower cylindrical portion, and further comprising a generator powered by the turbine and disposed in the upper frusto-conical portion.

52. A wave energy apparatus, comprising:
a venturi shroud which when the apparatus is in an operative position in a body of water is positioned in the body of water a distance below a surface of the body of water;
the venturi shroud being configured to form a venturi channel having a top mouth and a bottom constricted region;
a turbine attached to the venturi shroud and positioned in the bottom constricted region so as to be powered by water accelerated by the venturi channel as the venturi shroud moves upwardly due to wave action in the body of water when the apparatus is in the operative position;
a rigid central portion to which the venturi shroud is attached;
a generator powered by the turbine and attached to the rigid central portion;
a flexible electrical cable from the generator;
the rigid central portion and the generator attached thereto hanging via a flexible connection from a buoy, boat or ship floating in the body of water when the apparatus is in the operative position; and
the flexible electrical cable being the flexible connection.

53. The apparatus of claim 52 wherein the venturi shroud is positionable in an open position and an alternative closed position due to the wave action.

54. The apparatus of claim 52 wherein the venturi shroud is flexible and collapsible.

55. The apparatus of claim 52 wherein the venturi shroud is rigid and non-collapsible.

56. The apparatus of claim 52 wherein the generator is positioned in the venturi shroud.

57. A wave energy apparatus, comprising:
a venturi shroud which when the apparatus is in an operative position in a body of water is positioned in the body of water a distance below a surface of the body of water;
the venturi shroud being configured to form a venturi channel having a top mouth and a bottom constricted region;
a turbine attached to the venturi shroud and positioned in the bottom constricted region so as to be powered by water accelerated by the venturi channel as the venturi shroud moves upwardly due to wave action in the body of water when the apparatus is in the operative position;
a rigid central portion to which the venturi shroud is attached;
a generator powered by the turbine and attached to the rigid central portion;
a flexible electrical cable from the generator;
the rigid central portion and the generator attached thereto hanging via a flexible connection from a buoy, boat or ship floating in the body of water when the apparatus is in the operative position; and
the venturi shroud being positionable in an open position and an alternative closed position due to the wave action.

58. A wave energy apparatus, comprising:
a venturi shroud which when the apparatus is in an operative position in a body of water is positioned in the body of water a distance below a surface of the body of water;
the venturi shroud being configured to form a venturi channel having a top mouth and a bottom constricted region;
a turbine attached to the venturi shroud and positioned in the bottom constricted region so as to be powered by water accelerated by the venturi channel as the venturi shroud moves upwardly due to wave action in the body of water when the apparatus is in the operative position;
a rigid central portion to which the venturi shroud is attached;
a generator powered by the turbine and attached to the rigid central portion;
a flexible electrical cable from the generator;
the rigid central portion and the generator attached hanging via a flexible connection from a buoy, boat or ship floating in the body of water when the apparatus is in the operative position; and
the venturi shroud being flexible and collapsible.

59. An apparatus that converts wave energy to electrical energy, comprising:
a buoy adapted to float on a water surface;
a shroud having a first end and a second end; the first end adapted to open by water flow through the shroud in a first direction;
the shroud forming a conical shape when the first end is opened by water flow in the first direction;
a rigid central support disposed in interconnecting relation between the buoy and the shroud;
a rigid collar at the second end of the shroud;

a plurality of rigid frame members having a first end pivotally connected to the rigid collar in circumferentially spaced relation to one another;

the shroud adapted to interconnect the rigid frame members to one another;

a turbine concentrically positioned within a space surrounded by the rigid collar;

the turbine adapted to be connected to a generator;

the shroud adapted to funnel water toward the turbine when the first end of the shroud is held open by the water flow in the first direction; and the rigid frame members adapted to pivot toward the rigid central support by water flow through the shroud in a second direction opposite to the first direction.

60. The apparatus of claim 59 wherein the shroud is flexible and collapsible.

\* \* \* \* \*